US008277664B2

(12) United States Patent
Frechet et al.

(10) Patent No.: US 8,277,664 B2
(45) Date of Patent: Oct. 2, 2012

(54) EXTRACTION OF ANIONS FROM SOLUTIONS AND MIXTURES USING HYPERBRANCHED MACROMOLECULES

(75) Inventors: Jean Frechet, Oakland, CA (US); Emine Boz, Los Angeles, CA (US); Mamadou Diallo, Pasadena, CA (US); Yonggui Chi, Singapore (SG)

(73) Assignees: California Institute of Technology, Pasadena, CA (US); The Regents of the University of California, Oakland, CA (US)

( * ) Notice: Subject to any disclaimer, the term of this patent is extended or adjusted under 35 U.S.C. 154(b) by 347 days.

(21) Appl. No.: 12/573,708

(22) Filed: Oct. 5, 2009

(65) Prior Publication Data

US 2010/0181257 A1      Jul. 22, 2010

Related U.S. Application Data

(60) Provisional application No. 61/102,792, filed on Oct. 3, 2008.

(51) Int. Cl.
*C02F 1/42* (2006.01)
*C08G 73/04* (2006.01)
*C08G 73/02* (2006.01)
*B01D 39/16* (2006.01)

(52) U.S. Cl. ........ 210/683; 528/266; 528/423; 528/424; 525/417; 525/540

(58) Field of Classification Search ............... 210/683; 528/423, 424, 266; 525/417, 540
See application file for complete search history.

(56) References Cited

U.S. PATENT DOCUMENTS

| | | | |
|---|---|---|---|
| 4,029,733 A | 6/1977 | Faugeras et al. | |
| 4,599,400 A | 7/1986 | Tomalia et al. | |
| 5,041,516 A * | 8/1991 | Frechet et al. | 528/44 |
| 5,667,694 A | 9/1997 | Cody et al. | |
| 6,464,971 B1 | 10/2002 | Matthews et al. | |
| 7,101,937 B1 * | 9/2006 | Frechet et al. | 525/258 |
| 7,470,369 B2 | 12/2008 | Diallo | |

(Continued)

FOREIGN PATENT DOCUMENTS

GB          2338958          1/2000

(Continued)

OTHER PUBLICATIONS

Chen, Y. et al., "Supramolecular Thermotropic Liquid Crystalline Materials with Nematic Mesophase Based on Methylated Hyperbranched Polyethylenimine and Mesogenic Carboxylic Acid," Macromolecular Rapid Communications, vol. 27, 2006, pp. 69-75.

(Continued)

*Primary Examiner* — Randy Gulakowski
*Assistant Examiner* — Rachel Kahn
(74) *Attorney, Agent, or Firm* — Nixon Peabody LLP

(57) ABSTRACT

Hyperbranched macromolecules and methods are described for selectively filtering contaminants such as anions from water and non-aqueous solutions, particularly in the presence of competing contaminants including other anions. The hyperbranched macromolecules may contain alkyl, 2-hydroxyalkyl, 2-methyl-2-hydroxylalkyl, 2-hydroxy-2-phenylalkyl, and other groups, which may be hydrophilic or hydrophobic. The molecules may preferentially bind to the contaminant at interest at low pH, and release the contaminant at a pH of about 9. The molecules may be used to filter contaminants including perchlorate and nitrate even in the presence of high sulfate concentrations.

21 Claims, 48 Drawing Sheets

U.S. PATENT DOCUMENTS

| | | |
|---|---|---|
| 2004/0048754 A1 | 3/2004 | Herrmann et al. |
| 2005/0040109 A1 | 2/2005 | Smith et al. |
| 2006/0205920 A1 | 9/2006 | Dozol et al. |
| 2008/0206183 A1 | 8/2008 | Commeyras et al. |
| 2009/0001802 A1 | 1/2009 | Diallo et al. |

FOREIGN PATENT DOCUMENTS

| | | |
|---|---|---|
| KR | 10-2008-0025157 | 3/2008 |
| WO | 0053649 | 9/2000 |
| WO | 2004076509 | 9/2004 |
| WO | 2006114528 | 11/2006 |
| WO | 2006114738 | 11/2006 |

OTHER PUBLICATIONS

Pastor-Perez, L. et al., "Unprecedented Blue Intrinsic Photoluminescence from Hyperbranched and Linear Polyethylenimines: Polymer Architectures and pH-Effects," Macromolecular Rapid Communications, vol. 28, 2007, pp. 1404-1409.

Arkas, M. et al., "Organic/Inorganic Hybrid Filters Based on Dendritic and Cyclodextrin "Nanosponges" for the Removal of Organic Pollutants from Water," Environmental Science & Technology, vol. 40, No. 8, 2006, pp. 2771-2777.

Hawker, C. J. et al., "One-Step Synthesis of Hyperbranched Dendritic Polyesters," J. Am. Chem. Soc., vol. 113, No. 12, 1991, pp. 4583-4588.

Moyer, B. A. et al., "Physical Factors in Anion Separations," Chapter 1 in Supramolecular Chemistry of Anions, edited by Bianchi, A. et al., Wiley-VCH, 1997, pp. 1-44.

Kee, R. A. et al., "Semi-Controlled Dendritic Structure Synthesis,"0 Chapter 9 in Dendrimers and Other Dendritic Polymers, edited by J. M. J. Fréchet et al., John Wiley & Sons Ltd, 2001, pp. 209-236.

Krämer, M. et al., "pH-Responsive Molecular Nanocarriers Based on Dendritic Core-Shell Architectures," Angew. Chem. Int. Ed., vol. 41, No. 22, 2002, pp. 4252-4256.

Chi, Y. et al., "Practical Synthesis of Enantiomerically Pure B2-Amino Acids via Proline-Catalyzed Diastereoselective Aminomethylation of Aldehydes," J. Am. Chem. Soc., vol. 129, 2007, pp. 6050-6055.

Roovers, J. et al., "Dendrimers and Dendrimer-Polymer Hybrids," Advances in Polymer Science, vol. 142, 1999, pp. 179-228.

Martinez, V. et al., "Dendritic Core-Shell Macromolecules Soluble in Supercritical Carbon Dioxide," Macromolecules, vol. 39, 2006, pp. 3978-3979.

Stevelmans, S. et al., "Synthesis, Characterization, and Guest-Host Properties of Inverted Unimolecular Dendritic Micelles," J. Am. Chem. Soc., vol. 118, 1996, pp. 7398-7399.

Baek, K. Y. et al., "Core-Functionalized Star Polymers by Transition Metal-Catalyzed Living Radical Polymerization. 1. Synthesis and Characterization of Star Polymers with PMMA Arms and Amide Cores," Macromolecules, vol. 34, 2001, pp. 7629-7635.

Yam, C. M. et al., "Preparation, Characterization, Resistance to Protein Adsorption, and Specific Avidin-Biotin Binding of Poly(amidoamine) Dendrimers Functionalized with Oligo(ethylene glycol) on Gold," Journal of Colloid and Interface Science, vol. 296, 2006, pp. 118-130.

Vogtle, F. et al., "Functional Dendrimers," Prog. Polym. Sci., vol. 25, 2000, pp. 987-1041.

Yang, H. et al., "Polyethylene Glycol-Polyamidoamine Dendritic Micelle as Solubility Enhancer and the Effect of the Length of Polyethylene Glycol Arms on the Solubility of Pyrene in Water," Journal of Colloid and Interface Science, vol. 273, 2004, pp. 148-154.

International Search Report and Written Opinion in International Application No. PCT/US2008/06578, dated Feb. 4, 2009.

International Search Report and Written Opinion in International Application No. PCT/US2009/059464, dated May 4, 2010.

Office Action in U.S. Appl. No. 12/124,952, mailed Apr. 1, 2011.

Office Action in U.S. Appl. No. 12/124,952, mailed Nov. 2, 2010.

Office Action in U.S. Appl. No. 12/124,952, mailed Sep. 13, 2010.

* cited by examiner

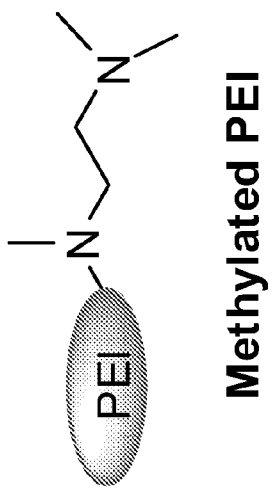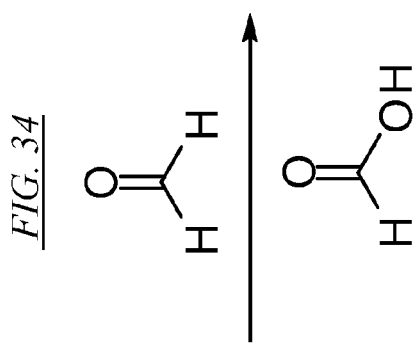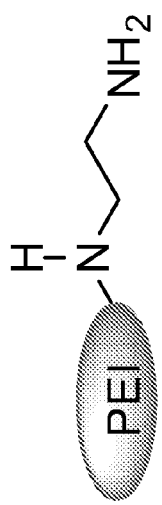
FIG. 34

EXTRACTION OF ANIONS FROM SOLUTIONS AND MIXTURES USING HYPERBRANCHED MACROMOLECULES

CLAIM OF BENEFIT OF PRIORITY

This application claims priority to U.S. Provisional Application No. 61/102,792, filed Oct. 3, 2008, the entire disclosure of which is incorporated by reference herein.

GOVERNMENT RIGHTS

The United States Government has certain rights in this invention pursuant to Grant CBET #0506951 awarded by the National Science Foundation.

TECHNICAL FIELD

This subject matter relates generally to methods of and apparatuses for using dendritic polymers, such as hyperbranched macromolecules, to extract anions from aqueous solutions.

BACKGROUND

Anions are major contaminants in water treatment, desalination and related environmental remediation processes. Anions such as nitrate ($NO_3^-$), perchlorate ($ClO_4^-$), and sulfate ($SO_4^{2-}$) are having a major impact on water quality throughout the world. $NO_3^-$ is an acute water contaminant that reduces the ability of red blood cells to carry oxygen when ingested. It is often found in agricultural run-off, in industrial or municipal wastewater, and in lakes, rivers and coastal water systems, where it may cause hypoxia (i.e., oxygen deficiency). $ClO_4^-$ is a water-soluble anion that has been widely used in the manufacturing of explosives, mines and solid propellants for pyrotechnic devices, rockets and missiles. Sulfate is a product of burning coal, and sudden exposure to high doses may cause diarrhea in animals and infants. Both nitrate and sulfate are also commonly found in fertilizers, manure, and waste discharged from septic tanks.

Anion removal is a key component of water treatment processes. Membrane separation technologies such as reverse osmosis (RO), nanofiltration (NF) and electrodialysis (ED) may not be cost-effective at recovering anions from aqueous solutions. Although bioreactors can effectively reduce $NO_3^-$ to $N_2$ gas under anaerobic conditions, regulatory and public acceptance may limit their utilization in drinking water treatment.

Ion exchange (IX) may be used in the art for treating water contaminated by a variety of anions including $ClO_4^-$ and $NO_3^-$. However, drawbacks of IX include limited selectivity, low efficiency and environmental impact (e.g., brine management and disposal). In general, IX is a heterogeneous solid-liquid process that involves ion diffusion through the resin pores followed by an exchange reaction; therefore, $ClO_4^-$ and $NO_3^-$ binding to IX resins generally require longer equilibration time. There are many types of IX resins; as an example, the perchlorate binding capacity of one brand, the commercially used disposable AMBERLITE PWA2 IX resin from Purolite, is 65 mg/g.

Two commonly used IX resins for perchlorate and nitrate removal are: (i) non-selective polyacrylic anion-exchange resins and (ii) selective polystyrenic anion-exchange resins. Both resins contain $Cl^-$ exchange sites. The non-selective resins preferentially sorb divalent anions such as $SO_4^{2-}$; whereas the anion-selective resins have much higher affinity for poorly hydrated anions such as $ClO_4^-$. Resin regeneration/reuse and brine management/disposal are two issues that have a significant impact on the effectiveness, cost and environmental acceptability of IX systems used to treat water contaminated by $ClO_4^-$ and $NO_3^-$. In the case of perchlorate, the non-selective resins require frequent regenerations with brine (~6-12 wt % NaCl solution) due to their low $ClO_4^-$ capacity/selectivity. This generates a significant amount of wastes (e.g., brine and $ClO_4^-$) that need to be treated prior to disposal. Conversely, the $ClO_4^-$ selective IX resins generally do not require frequent regenerations. However, even concentrated brine solutions (~12 wt %) are not generally effective at regenerating the resins in this case because of their typically strong binding affinity for $ClO_4^-$. Because of this, spent $ClO_4^-$ selective resins generally cannot be cost-effectively regenerated and are incinerated in most cases following a single use.

Given the drawbacks of present technology, better methods are needed for filtering water, or for separating various ions, particularly anions, from aqueous solutions.

BRIEF SUMMARY

The present disclosure relates to the creation and use of hyperbranched macromolecules useful for filtering contaminants from water and non-aqueous solutions, particularly in the presence of competing contaminants including sulfate. Various embodiments are possible, a number of which are exemplified here.

The present disclosure describes hyperbranched macromolecule (A) having tertiary amines or optionally secondary amines. In one embodiment, the molecule A may comprise a plurality of branch points and a plurality of functional groups. It will have a plurality of branches, wherein each branch comprises an N-substituted or N,N-substituted n-aminoalkyl moiety (B). The substituents to moiety (b) may comprise either another branch, or one of the terminal functional groups. Preferably, A will contain less than about 10% of primary amine moieties as a percentage of total primary, secondary, and tertiary amine moieties in A. Most preferably, A will have no primary amines at all. Preferably, A will be substituted at least to some extent with hydrophobic functional groups, and possibly entirely with hydrophobic functional groups. In various embodiments, the terminal functional groups may be selected from the group consisting of alkyl, 2-hydroxyalkyl, 2-methyl-2-hydroxyalkyl, 2-hydroxy-2-phenylalkyl, and —$CH_2C(CH_3)_2CH_2NR^1$, $R^2$, wherein $R^1$ and $R^2$ are hydrophobic functional groups.

In another embodiment of the present disclosure, a filtration method is described which includes providing a solution containing a first quantity of a contaminant; contacting the solution with a first quantity of a hyperbranched macromolecule under conditions such that the first quantity of the contaminant is bound to the first quantity of the hyperbranched macromolecule to produce: (a) a composition comprising a contaminant-bound hyperbranched macromolecule, and (b) a composition comprising a relatively contaminant-depleted solution; and separating the quantity of contaminant-bound hyperbranched macromolecules from the quantity of relatively contaminant-deleted solution. In this method, the hyperbranched macromolecule may be the hyperbranched molecule described above, or any similar hyperbranched molecule. In various embodiments, the contaminant may be an anion or organic molecule, the solution may be an aqueous or non-aqueous solution, and the hyperbranched macromolecule may be water soluble or insoluble.

BRIEF DESCRIPTION OF THE DRAWINGS

The accompanying drawings, which are incorporated into this specification, illustrate one or more exemplary embodiments of the inventions disclosed herein and, together with the detailed description, serve to explain the principles and exemplary implementations of these inventions. One of skill in the art will understand that the drawings are illustrative only, and that what is depicted therein may be adapted based on the text of the specification or the common knowledge within this field.

In the drawings:

FIG. 34 shows an example of synthesis of methylated PEI.

DETAILED DESCRIPTION

Figure 1:
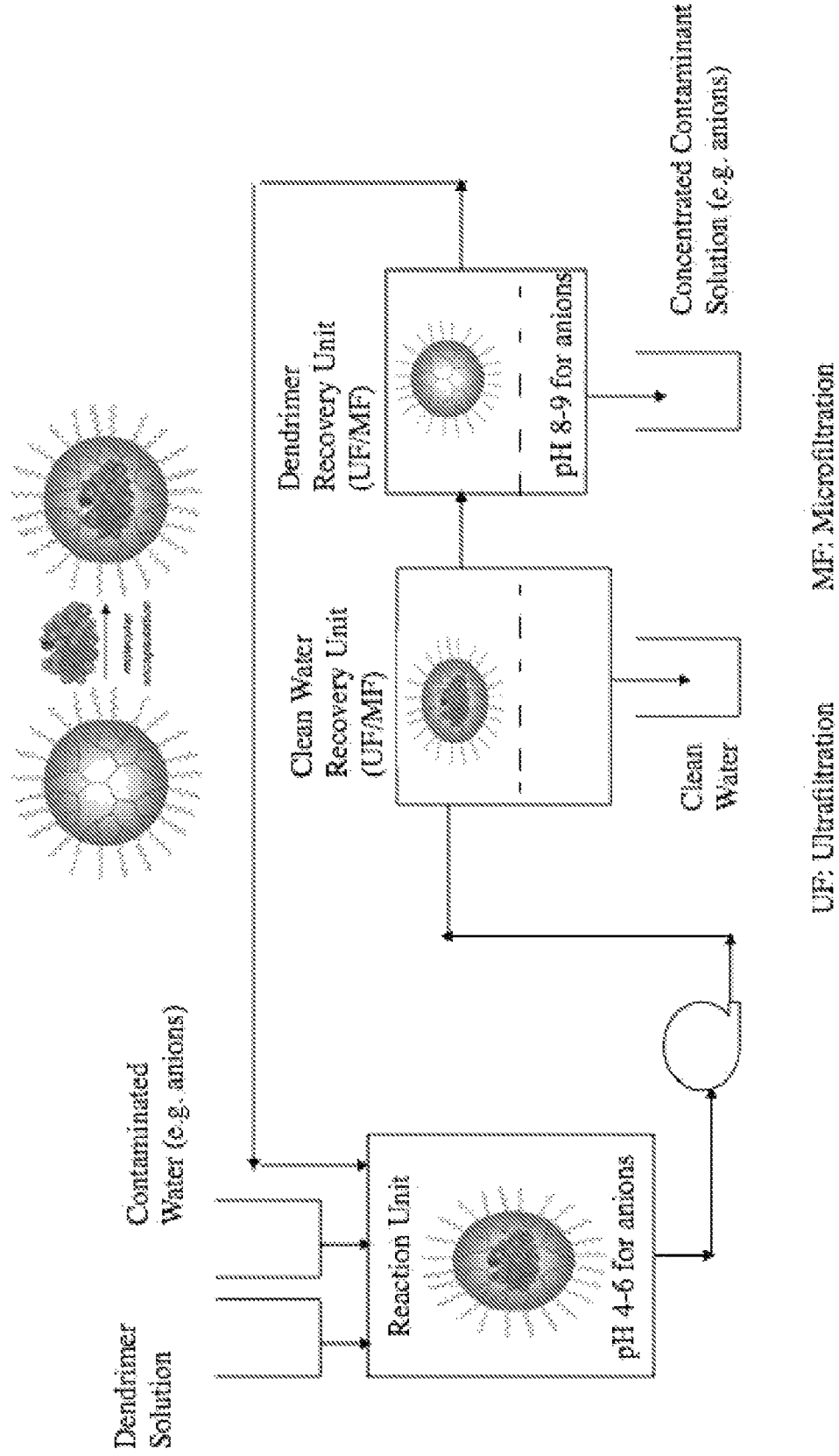
FIG. 1 shows an example of anion recovery from aqueous solutions by dendrimer enhanced filtration.

Various example embodiments of the present inventions are described herein in the context of filtering or separating aqueous solutions.

Those of ordinary skill in the art will understand that the following detailed description is illustrative only and is not intended to be in any way limiting. Other embodiments of the present inventions will readily suggest themselves to such skilled persons having the benefit of this disclosure, in light of what is known in the relevant arts, the provision and operation of information systems for such use, and other related areas. Reference will now be made in detail to exemplary implementations of the present inventions as illustrated in the accompanying drawings.

In the interest of clarity, not all of the routine features of the exemplary implementations described herein are shown and described. It will of course, be appreciated that in the development of any such actual implementation, numerous implementation-specific decisions must be made in order to achieve the specific goals of the developer, such as compliance with regulatory, safety, social, and business-related constraints, and that these specific goals will vary from one implementation to another and from one developer to another. Moreover, it will be appreciated that such a developmental effort might be complex and time-consuming, but would nevertheless be a routine undertaking of engineering for those of ordinary skill in the art having the benefit of this disclosure.

Throughout the present disclosure, relevant terms are to be understood consistently with their typical meanings established in the relevant art. However, without limiting the scope of the present disclosure, further clarifications and descriptions are provided for relevant terms and concepts as set forth below:

The terms dendrimer and dendritic macromolecule are interchangeable, and refer to branched macromolecules that may have three covalently bonded components: a core, interior branch cells and terminal branch cells. Dendritic macromolecules may include globular dendrimers, dendrons, hyperbranched polymers, dendrigraft polymers, tecto-dendrimers, core-shell (tecto) dendrimers, hybrid linear-dendritic copolymers, dendronized polymers, dendrimer-based supramolecular assemblies and dendrimer-functionalized solid particles.

The term dendritic agent refers to a chemical composition comprising dendritic macromolecules. The dendritic agent may, as an illustrative example, comprise a single dendritic macromolecule with a single functionality, a single dendritic macromolecule with multiple functionalities, a mixture of dendritic macromolecules, dendritic macromolecules that have been cross-linked to other dendritic macromolecules, dendritic macromolecules that have been covalently linked to other macromolecules or dendritic macromolecules that have been attached to a solid support or substrate. Referring to something as a dendritic agent does not limit what materials or substances, other than the dendritic macromolecule, that can be part of the agent, or its physical form. For example, a dendritic agent may also include buffers, salts, stabilizers or inert ingredients, and may be provided in a number of forms, including but not limited to solids, solutions, suspensions, gels, semi-liquids, and slurries. As will be recognized by one of skill in the art, there are a variety of different dendritic agent compositions that would be suitable for the system and would therefore fall within the scope of the present invention.

The term extent of binding (FOB) has its normal meaning in the field, and refers to the number of moles or grams of bound ions per mole or gram of dendritic macromolecule. It is used to quantify the cation/anion uptake by dendritic macromolecules in aqueous solutions. If the dendritic macromolecule is very large, polydisperse or highly cross-linked, it is more convenient to express the EOB on a mass basis.

The terms hyperbranched polymer and hyperbranched as used herein refer to their definitions as known to those of skill in the art. A hyperbranched polymer comprises polydisperse dendritic macromolecules which are generally prepared in a single synthetic polymerization step that forms imperfect branches, generally in a non-deterministic way. However, there are many synthetic strategies known in the art to prepare hyperbranched polymers with lower polydispersity. They are typically characterized by their degree of branching (DB). An amine-based hyperbranched polymer may comprise tertiary, secondary, and primary amines, unless it has been modified, in which case the primary amines might as an example be converted to secondary and/or tertiary amines and secondary amines might, for example, be converted to tertiary amines, leading the same imperfect branched structure.

The term hyperbranched polyethyleneimine (PEI) polymer refers to a class of hyperbranched polymers known in the art. Generally, PEI polymers have a degree of branching (DB) of approximately 65-70%, consisting of primary, secondary, and tertiary amines, the amines being linking by $C_2$ alkyl chains. PEI with various molecular weights (MW) ranging from about 1,000 to several million Daltons are commercially available. Among many ways known in the art for preparing hyperbranched PEI, one way of creating PEI is through ring opening polymerization of aziridine also known as ethylene imine.

The term degree of branching (DB) has a meaning known in the field of dendritic macromolecules, and use herein is consistent with that meaning A definition is provided, for example, in C. J. Hawker, R. Lee, and J. M. J. Fréchet (1991), *The One-Step Synthesis of Hyperbranched Dendritic Polyesters*, J. Am. Chem. Coc., 113: 4583, which is incorporated herein by reference in its entirety.

The terms anion and oxyanion as used herein have their ordinary meanings as known in the art.

The term moiety as used herein refers to any part of an organic molecule, and may include, without limitation, a functional group, an alkyl chain, a branch of a branched molecule, or a continuation of a branched structure.

Dendritic macromolecules are a versatile classes of nanomaterials, and among their uses, they can be used to selectively bind to, or react with, a particular element, ion, or molecule of choice. Dendritic macromolecules are very large, yet soluble macroligands, and well defined sizes and shapes can be made, with hundreds or even thousands of complexing sites and reactive chain-ends. They can also be covalently linked to each other or to other macromolecules to form supramolecular assemblies of various size, shape and topologies. They can be used in a number of ways to filter or separate ions in aqueous solution. For example, dendrimer-enhanced filtration (DEF) (See U.S. Pat. No. 7,470,369, which is incorporated herein in its entirety) may be used, using a two-step filtration process, as shown in FIG. 1. In a Treatment Unit, process water may be mixed with water-soluble dendritic macromolecules that bind the target anions at low pH (e.g. 4-5). The complexes of macromolecules and bound anions may then be filtered using ultrafiltration (UF) or microfiltration (MF). The resulting concentrated solution of dendritic macromolecules and bound anions may subsequently be sent to a Recovery Unit. This system consists of an UF/MF unit in which the bound target anions are released by increasing solution pH (e.g. 9-10). Finally, the recovered concentrated solution of target substance is collected for disposal or subsequent processing while the macromolecules are recycled.

Among the inventions described herein are low-cost hyperbranched macromolecules that can selectively bind and release anions (e.g., $Cl^-$ and $Br^-$) and oxyanions (e.g., $ClO_4^-$ and $NO_3^-$) in aqueous solutions within the pH range 4-11. The design of selective hosts for anions is a very challenging undertaking. Unlike cations, anions have filled orbitals and thus cannot covalently bind to ligands in most cases. Anion binding to supramolecular hosts may depend on a variety of factors including: 1) electrostatic interactions (e.g., ion-pairing); 2) hydrophobic interactions; 3) hydrogen bonding; 4) van der Waals interactions, 5) solution pH and background electrolyte concentration; 6) solvent polarity; 7) host shape and 8) guest size.

TABLE 1

Physicochemical properties of selected anions of interest to water and wastewater treatment, as known in the art.

| Anion | [a]Radius (nm) | [a]Hydration Free Energy (KJ/mol) | [b]Charge-to-Size Ratio | [d]Shape |
|---|---|---|---|---|
| $Cl^-$ | 0.172 | −340 | 5.81 | Spherical |
| $F^-$ | 0.126 | −465 | 7.94 | Spherical |
| $Br^-$ | 0.188 | −315 | 5.32 | Spherical |
| $BrO_3^-$ | 0.191 | −330 | 5.23 | Trigonal Planar |
| $NO_3^-$ | 0.196 | −300 | 5.10 | Trigonal Planar |
| $ClO_4^-$ | 0.240 | −205 | 4.17 | Tetragonal |
| $H_2PO_4^-$ | 0.200 | −465 | 5.00 | Tetragonal |
| $SO_4^{2-}$ | 0.230 | −1080 | 8.69 | Tetragonal |

[a]Data compiled by Moyer, B. A. and Bonnese, P. V. Physical factors in anion separations. In Supramolecular Chemistry of Anions. Bianchi, A.; Bowman-James, K. and Garcia-Espana, E. Ed.; Wiley-VCH, New York, 1997, pp 1-44.
[b]Equal to the ratio of the charge of the anion to its ionic radius.
[d]Geometrical arrangements of anions taken from Gloe, K.; Stephan, H. and Grotjahn, M. Where is the anion extraction going? Chem. Eng. Technol. 2003, 26, 1107-1117.

By controlling the chemistry and length of the N bearing groups of amine-based dendritic macromolecules, one may generate branched macromolecules with differing hydrophobicity, micropolarity and selectivity for the target anions that can protonated and deprotonated in aqueous solutions with pH 4-11. Note that there are significant differences in the free energies of hydration ($\Delta G_h^\circ$) for common target anions. Table 1 lists selected properties, including $\Delta G_h^\circ$, of common target anions in water treatment. Note also that the charge-to-size ratio (CSR) of monovalent anions with similar shape (e.g. $NO_3^-$ and $BrO_3^-$) are comparable. In the case of nitrate and bromide, the difference between their $\Delta G_h^\circ$ is small (it is known in the art to be approximately 30 KJ/mol). Among anions, $ClO_4^-$ has among the highest (i.e. less negative) $\Delta G_h^\circ$ (known in the art to be approximately −205 KJ/mol), whereas divalent $SO_4^{2-}$ anion has among the most favorable (i.e., most negative) $\Delta G_h^\circ$ (known in the art to be −1080 Kcal/mol). Thus, one may exploit the difference between the hydration free energies of the target anions to develop high molar mass and water-soluble branched macromolecules with ionizable N groups that can selectively bind and release anions in aqueous solutions within the pH range 4-11.

Figure 2:
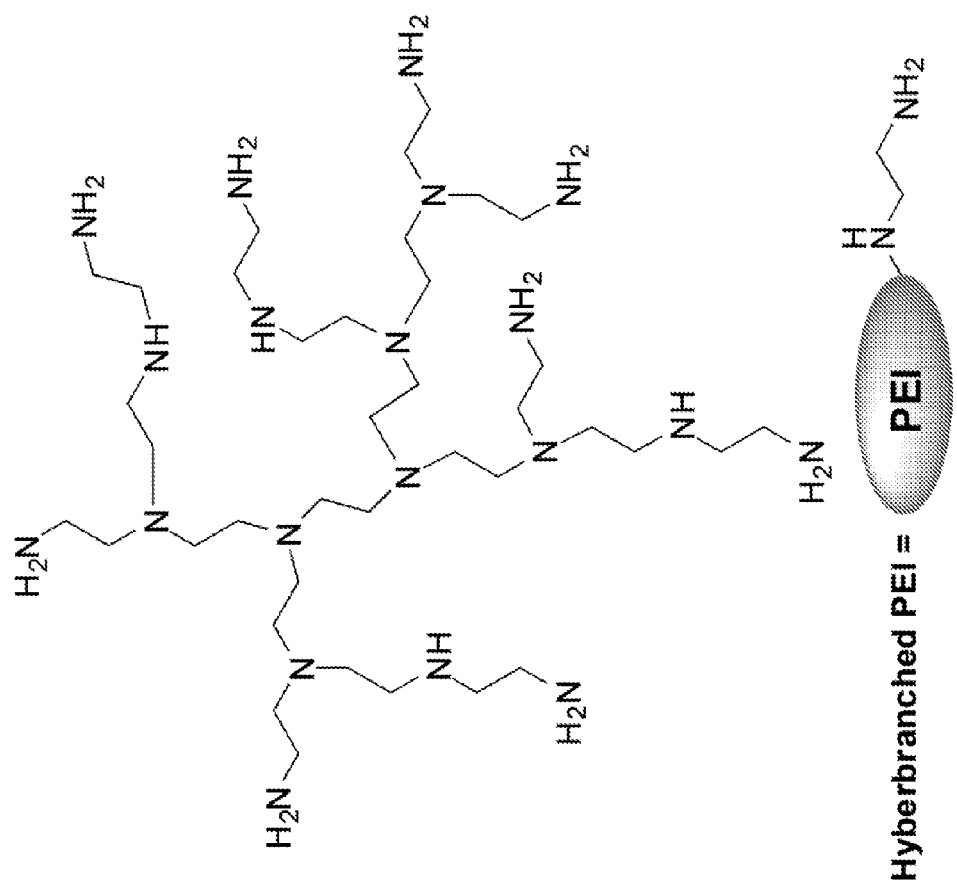
FIG. 2 shows an example of hyperbranched poly(ethyleneimine) polymers as building blocks for the synthesis of anion-selective branched macromolecules.
Figure 3A:
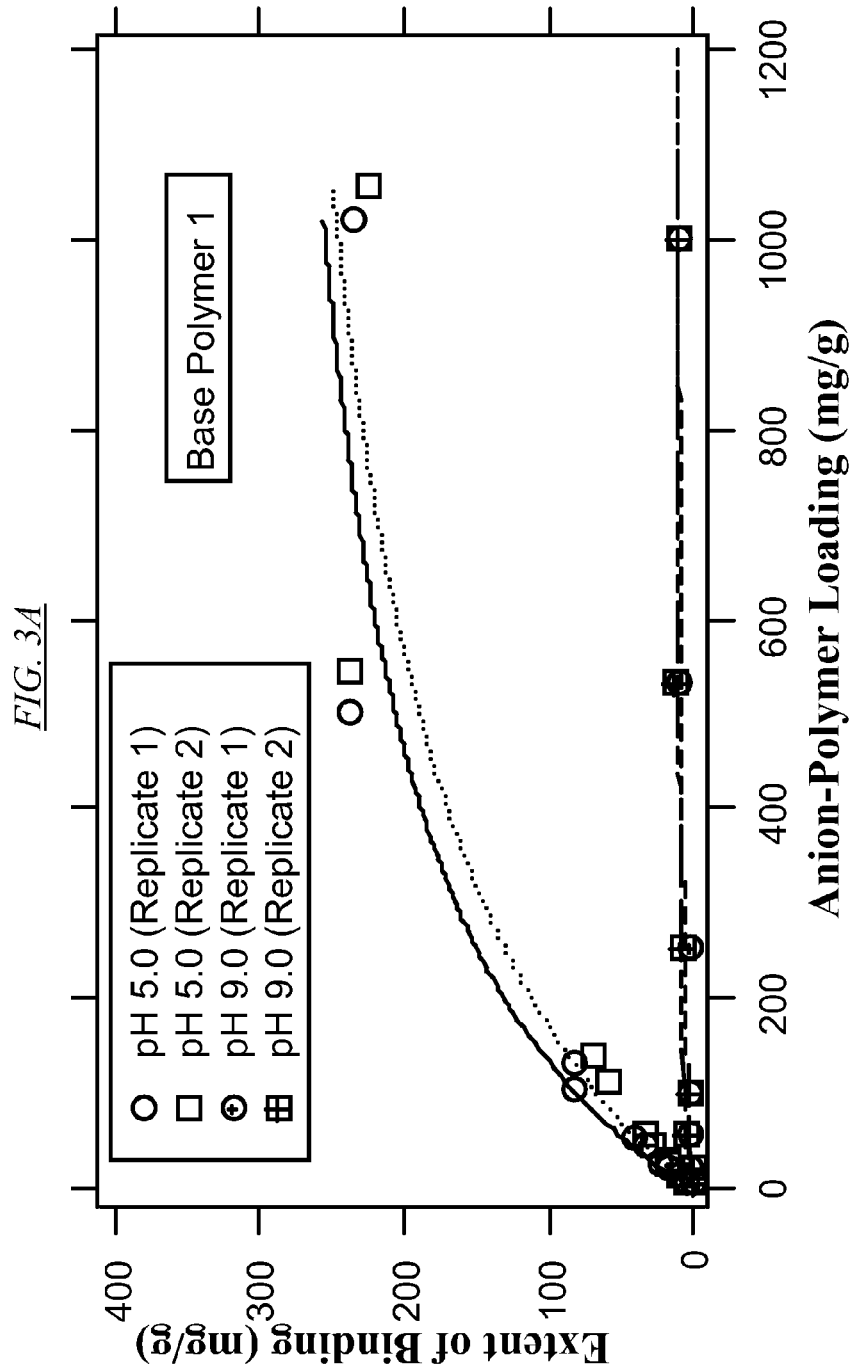
FIG. 3A shows an example of the extent of binding of perchlorate to Base Polymer 1 in deionized water at room temperature.
Figure 3B:
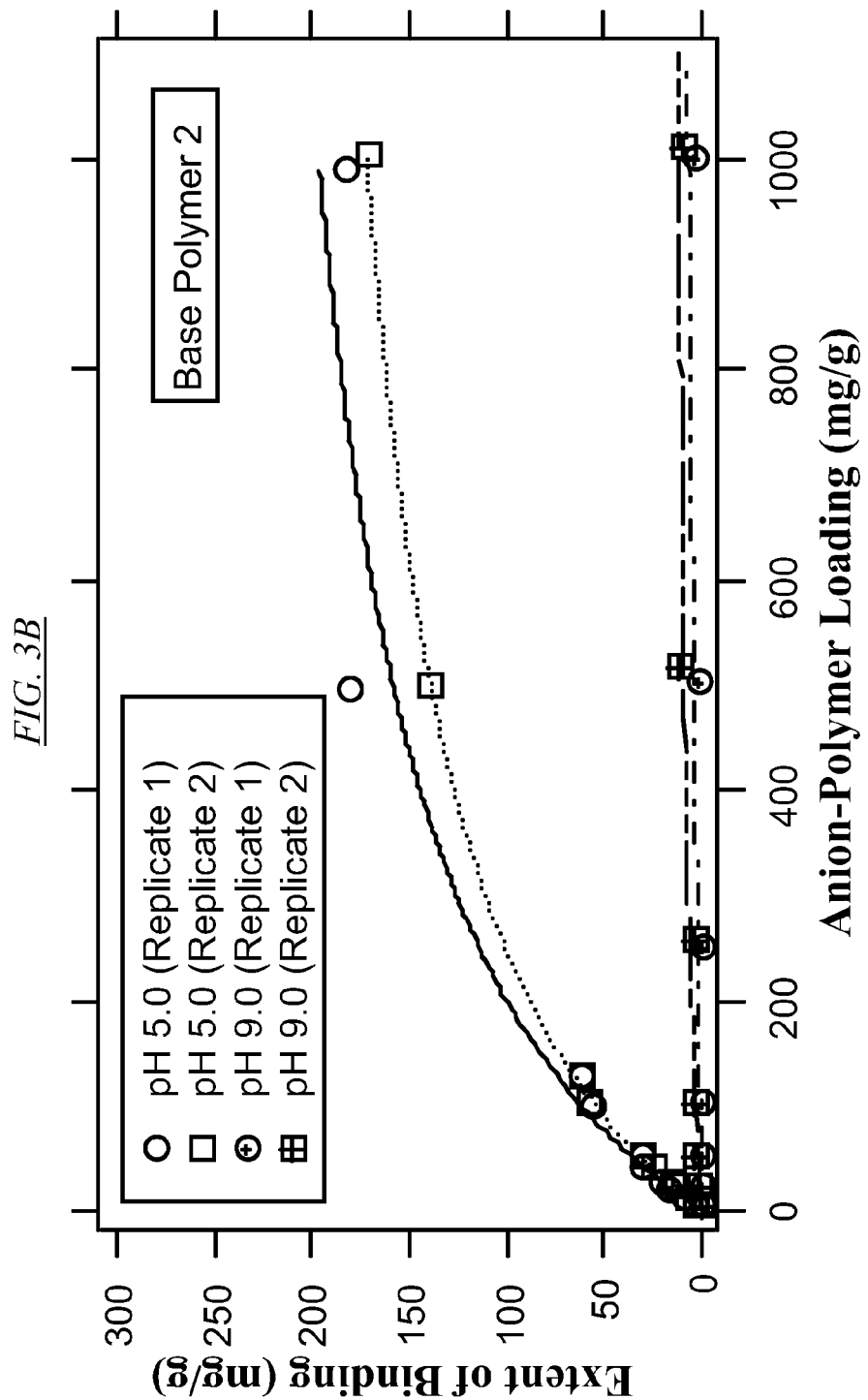
FIG. 3B shows an example of the extent of binding of perchlorate to Base Polymer 2 in deionized water at room temperature.
Figure 4A:
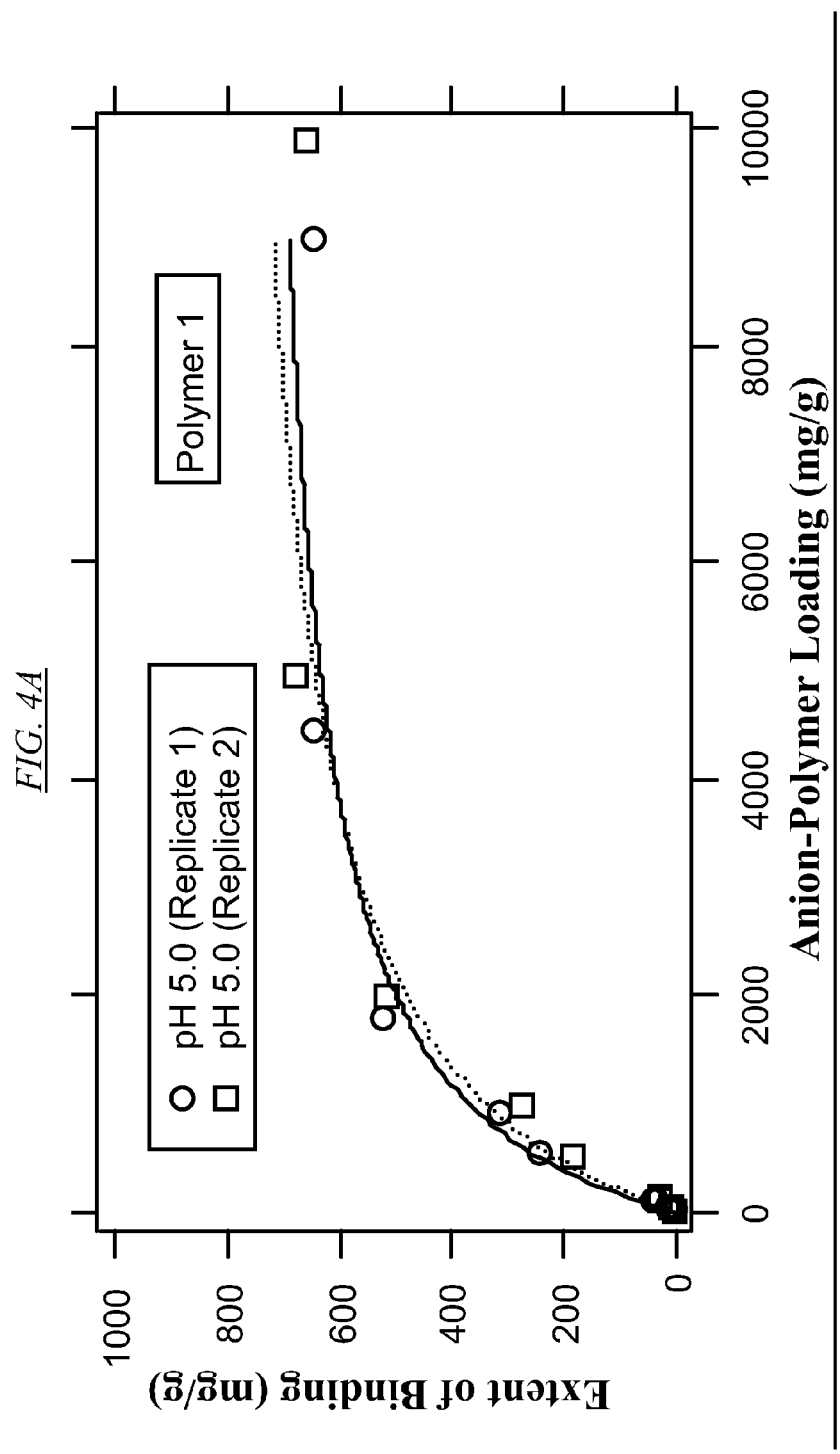
FIG. 4A shows an example of the extent of binding of perchlorate to Polymer 1 in deionized water at room temperature and pH 5.0.
Figure 4B:
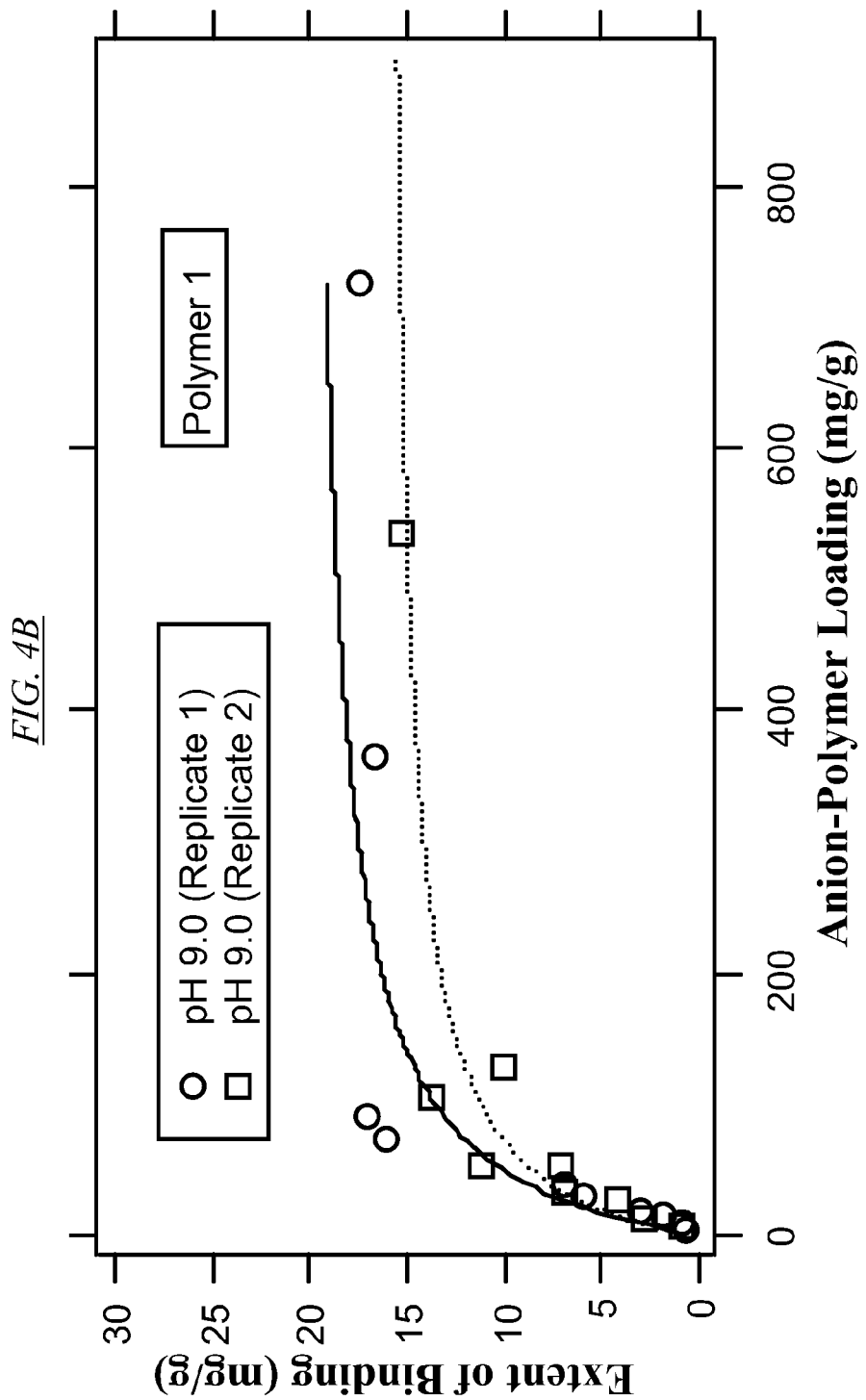
FIG. 4B shows an example of the extent of binding of perchlorate to Polymer 1 in deionized water at room temperature and pH 9.0.
Figure 4C:
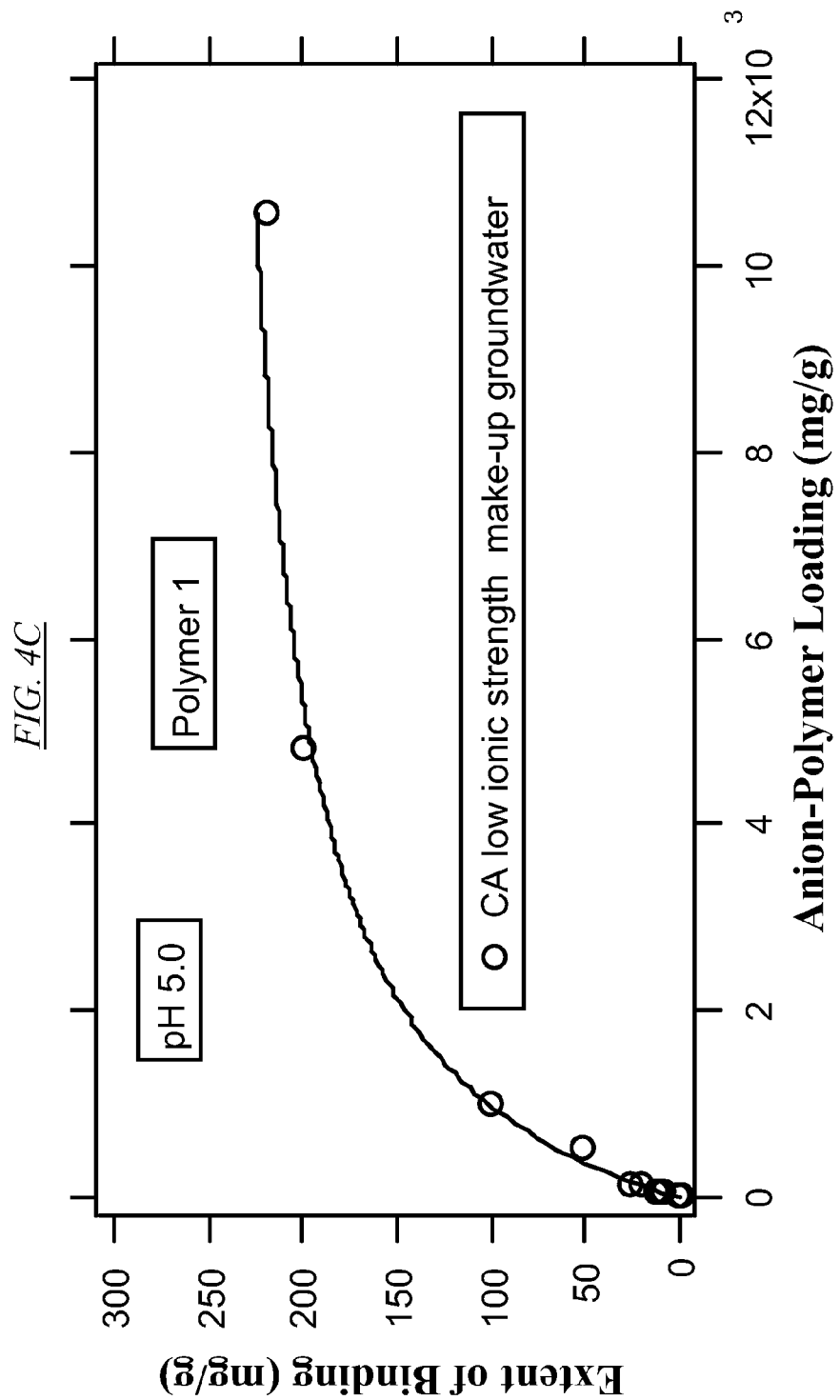
FIG. 4C shows an example of the extent of binding of perchlorate to Polymer 1 in low-ionic strength water at room temperature and pH 5.0.
Figure 4D:
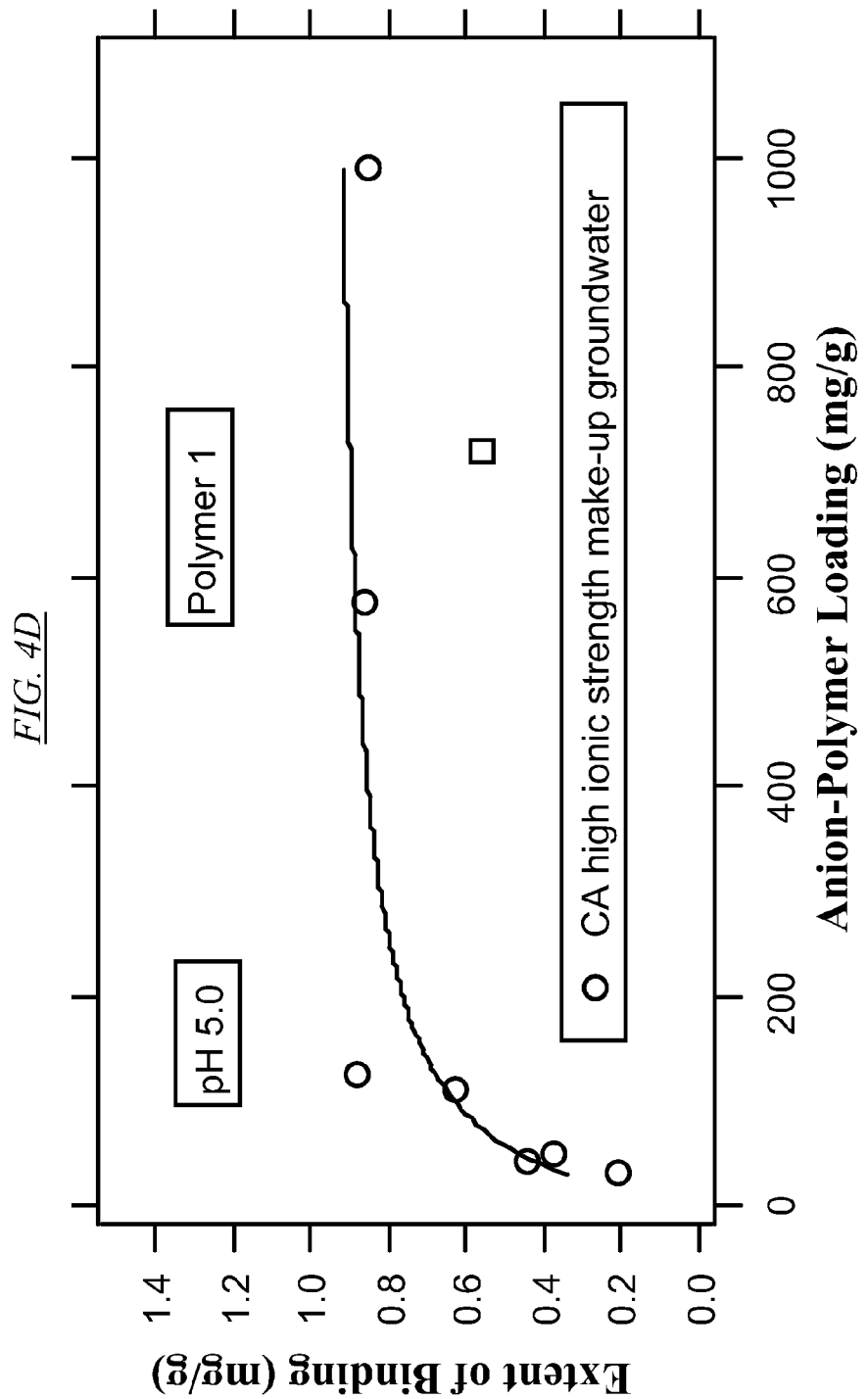
FIG. 4D shows an example of the extent of binding of perchlorate to Polymer 1 in high-ionic strength water at room temperature and pH 5.0
Figure 5A:
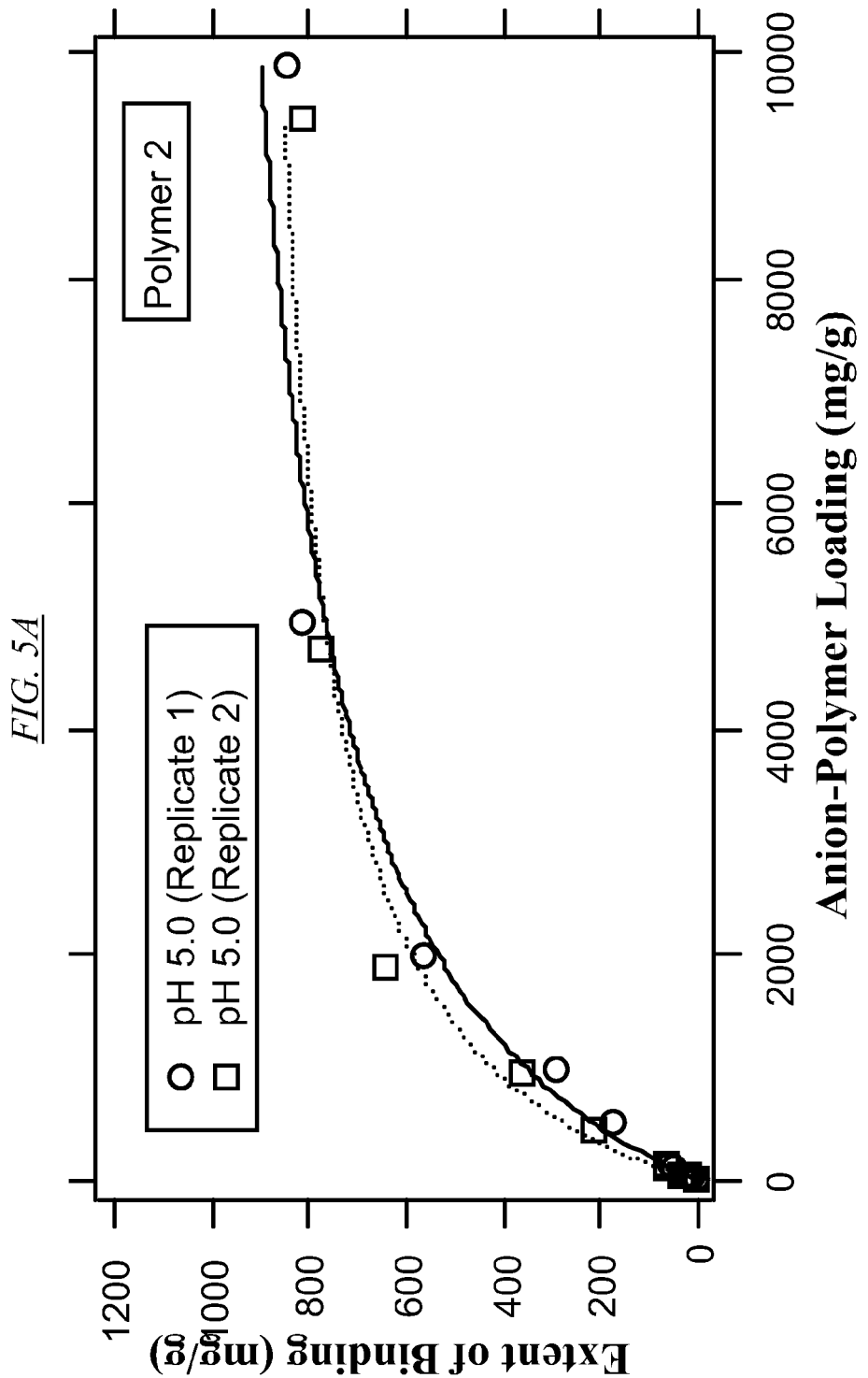
FIG. 5A shows an example of the extent of binding of perchlorate to Polymer 2 in deionized water at room temperature and pH 5.0.
Figure 5B:
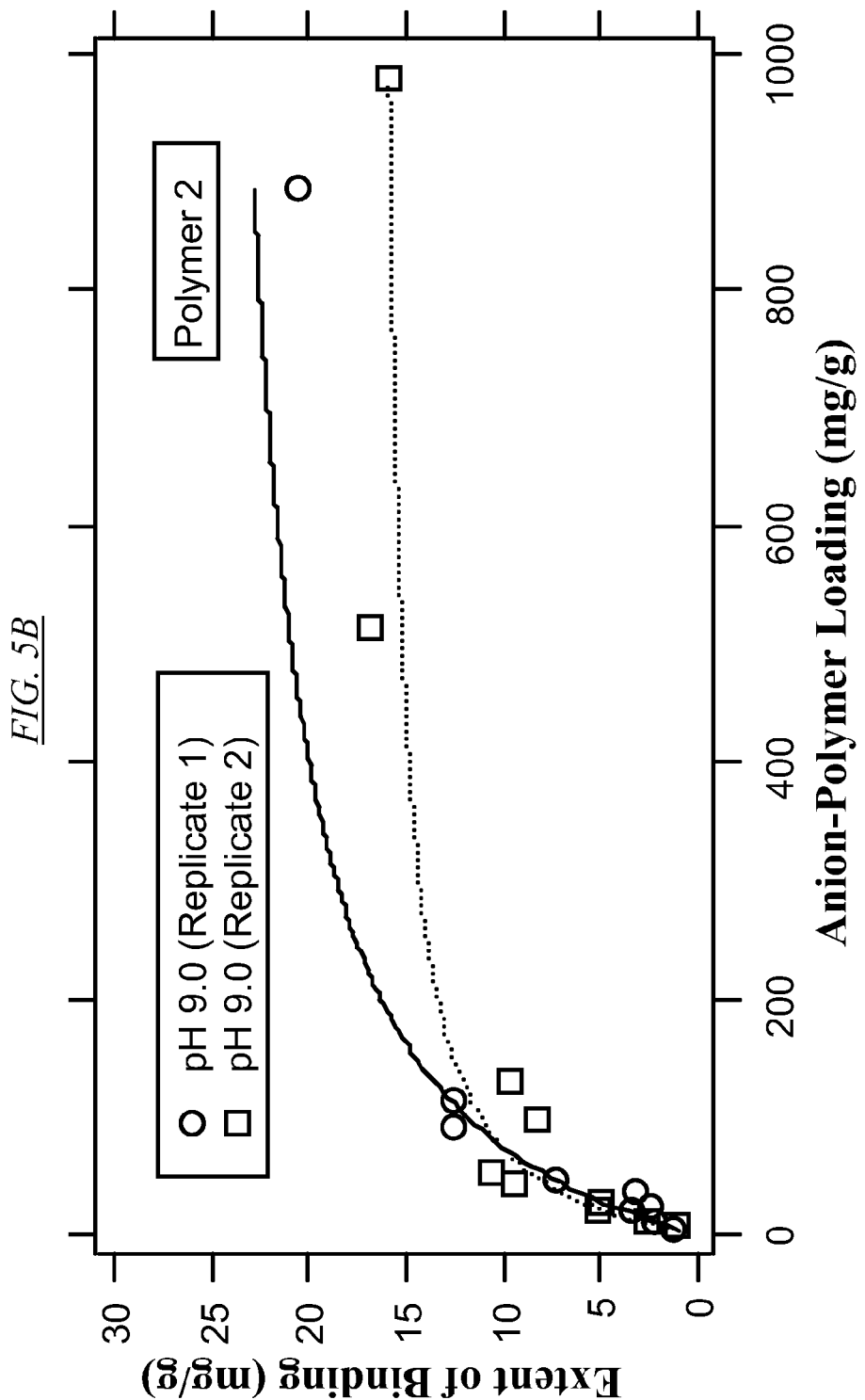
FIG. 5B shows an example of the extent of binding of perchlorate to Polymer 2 in deionized water at room temperature and pH 9.0.
Figure 6A:
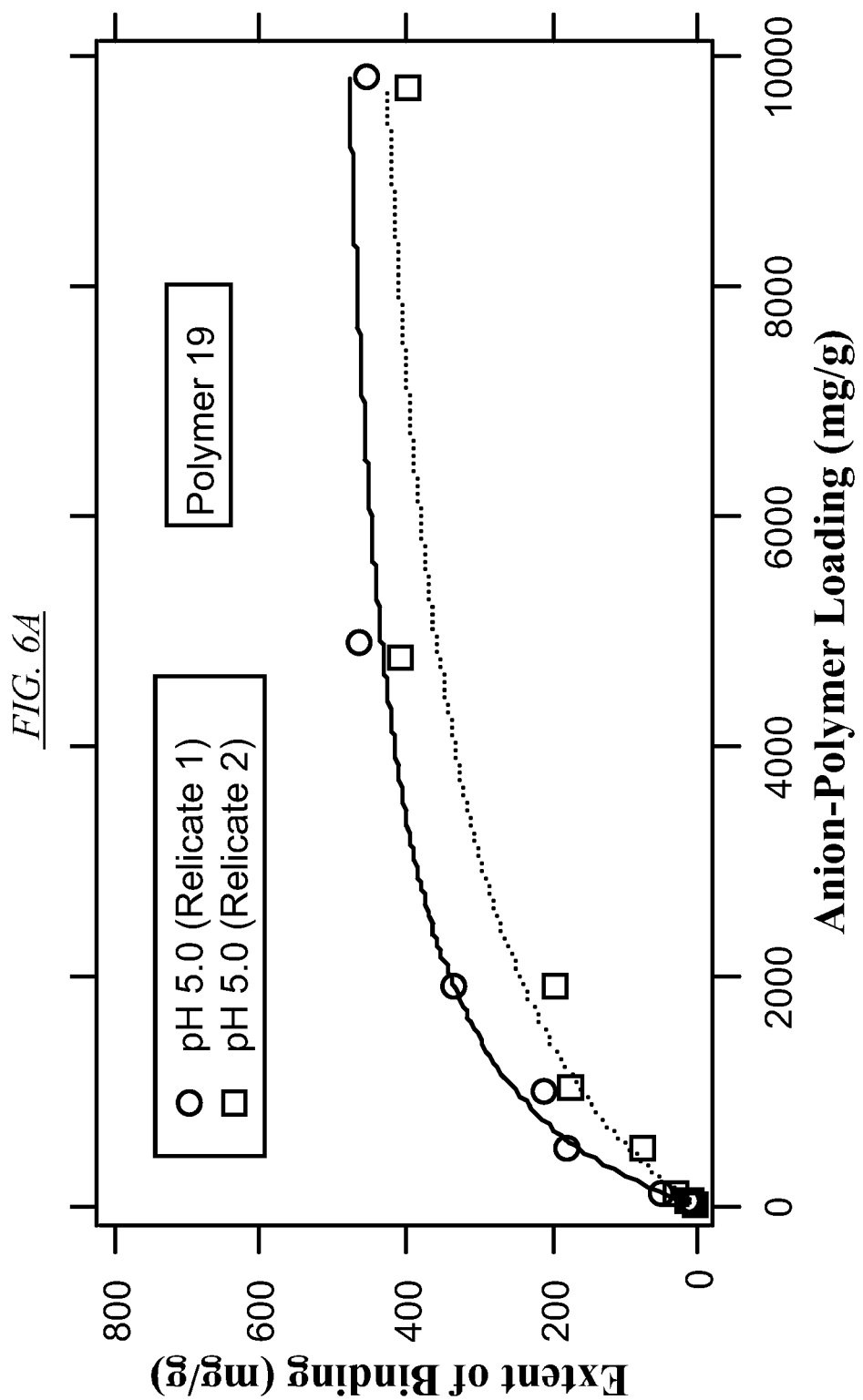
FIG. 6A shows an example of the extent of binding of perchlorate to Polymer 19 in deionized water at room temperature and pH 5.0.
Figure 6B:
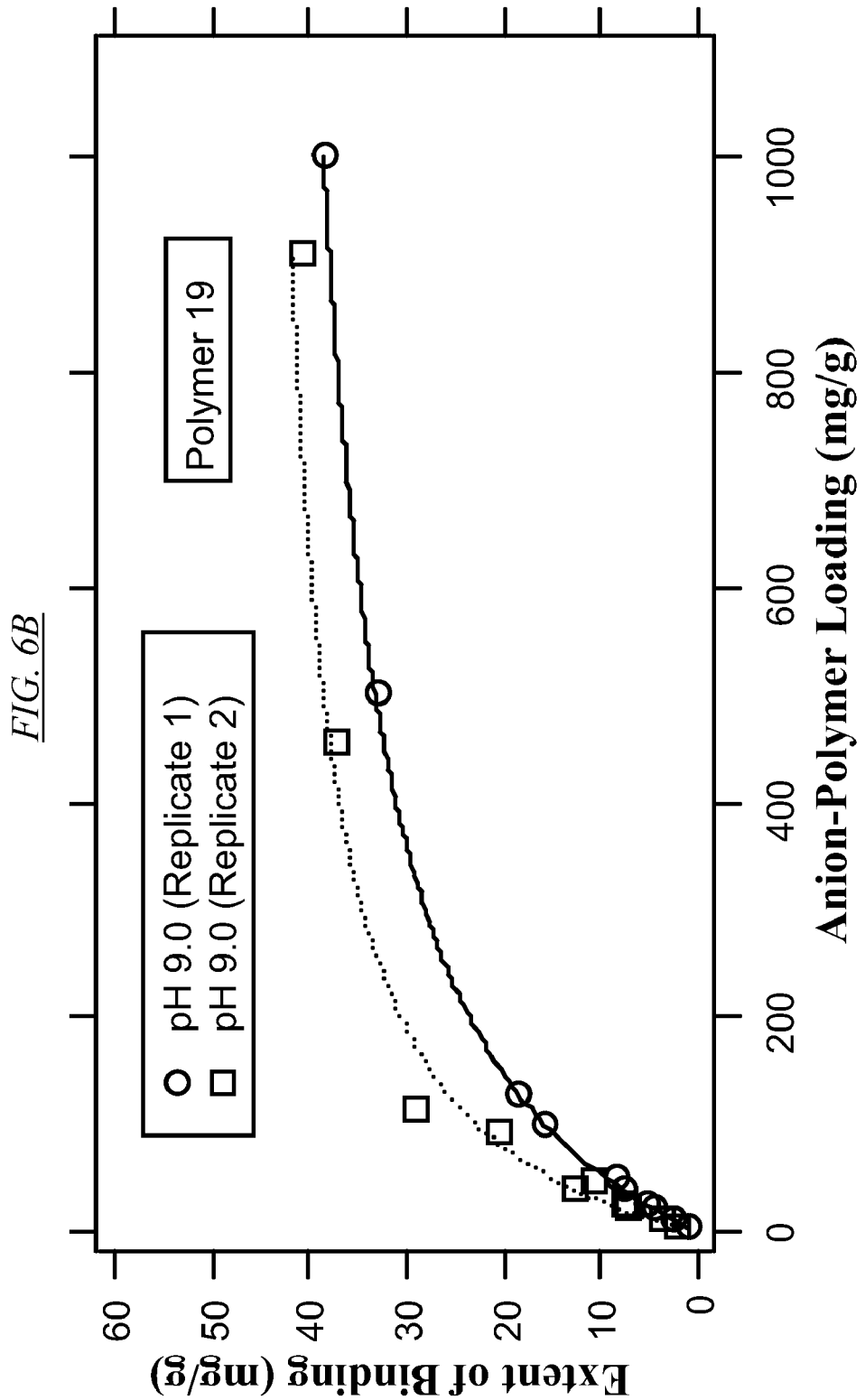
FIG. 6B shows an example of the extent of binding of perchlorate to Polymer 19 in deionized water at room temperature and pH 9.0.
Figure 6C:
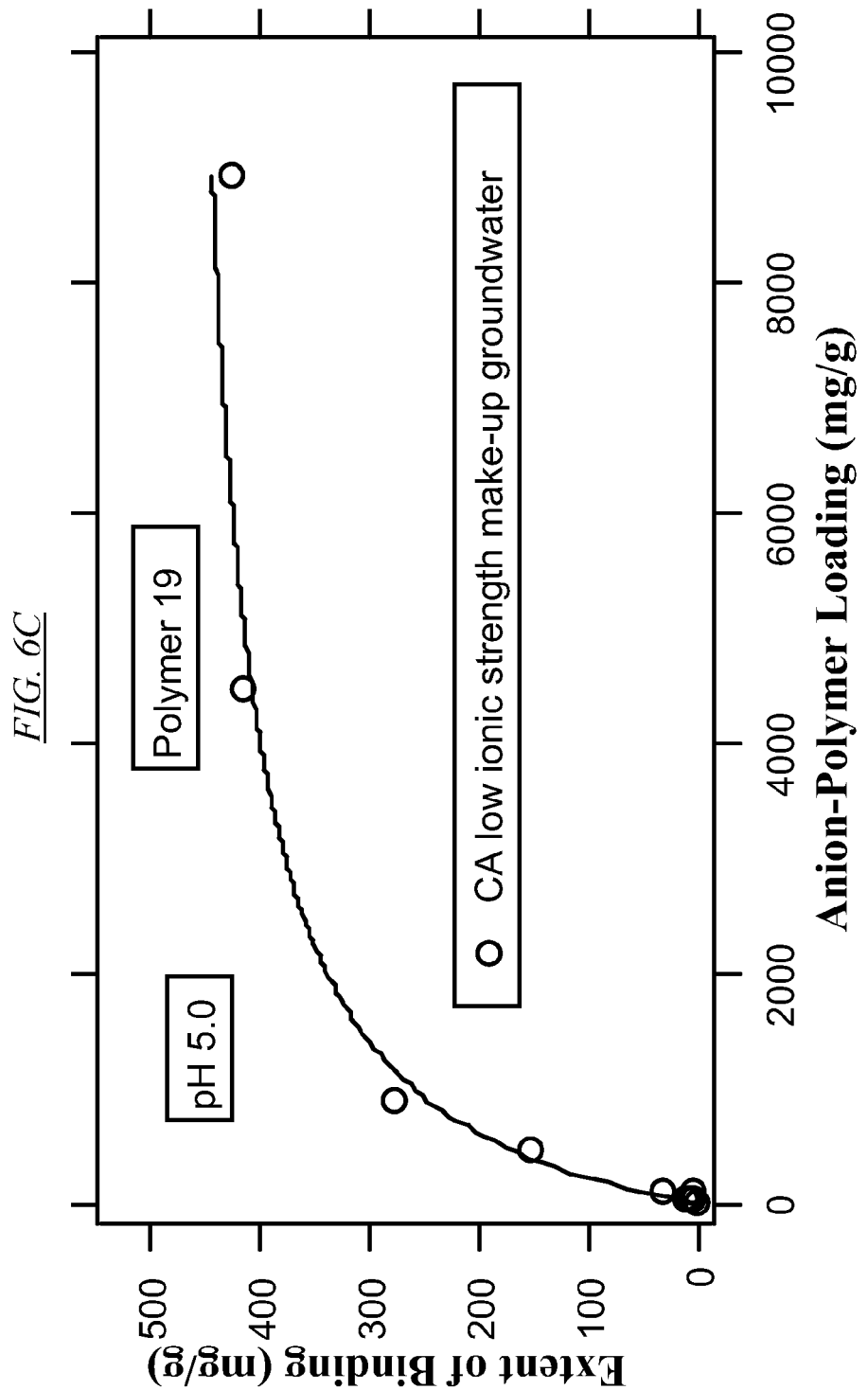
FIG. 6C shows an example of the extent of binding of perchlorate to Polymer 19 in low ionic-strength CA make-up groundwater at room temperature and pH 5.0.
Figure 6D:
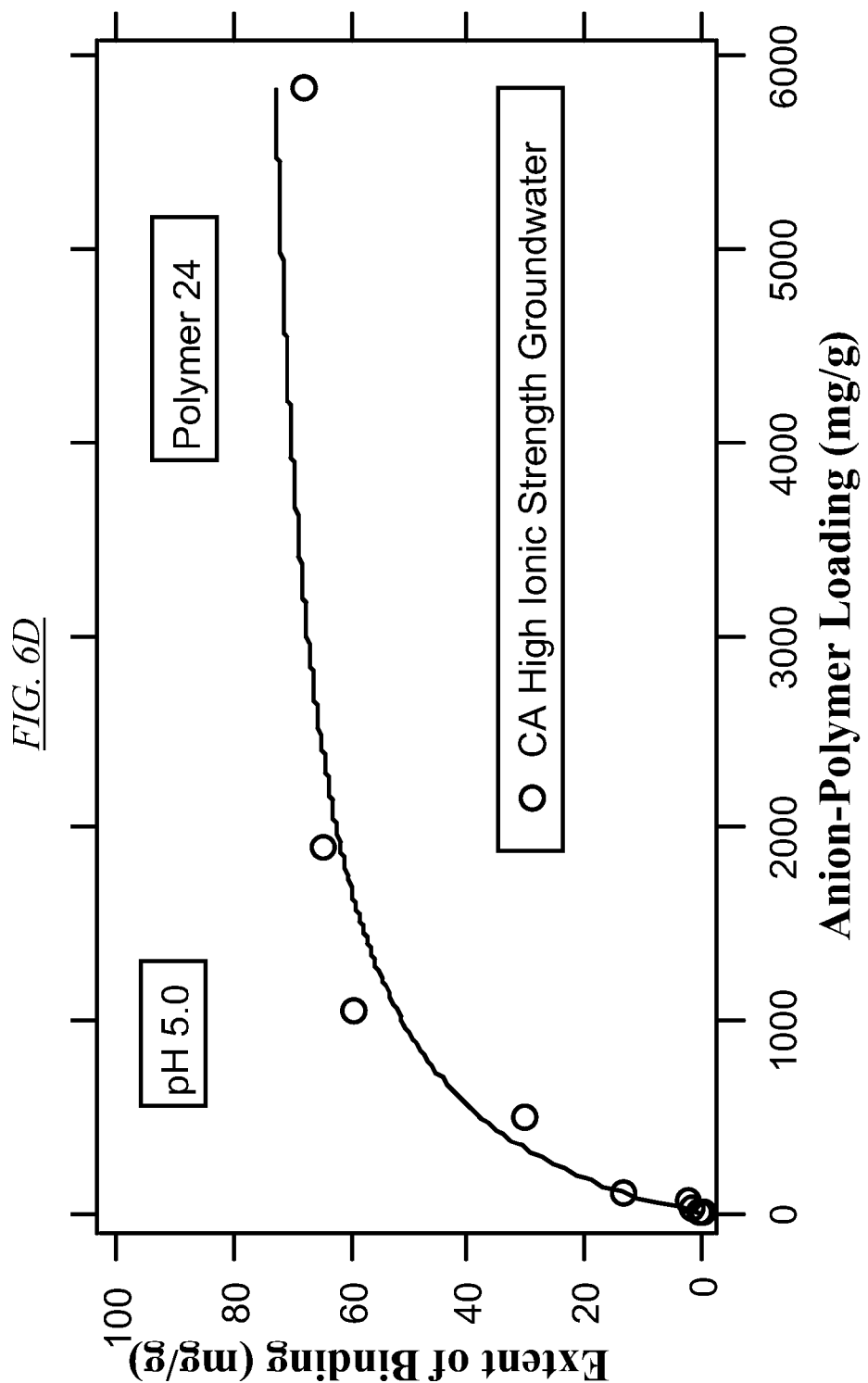
FIG. 6D shows an example of the extent of binding of perchlorate to Polymer 24 in high ionic-strength CA make-up groundwater at room temperature and pH 5.0.
Figure 7A:
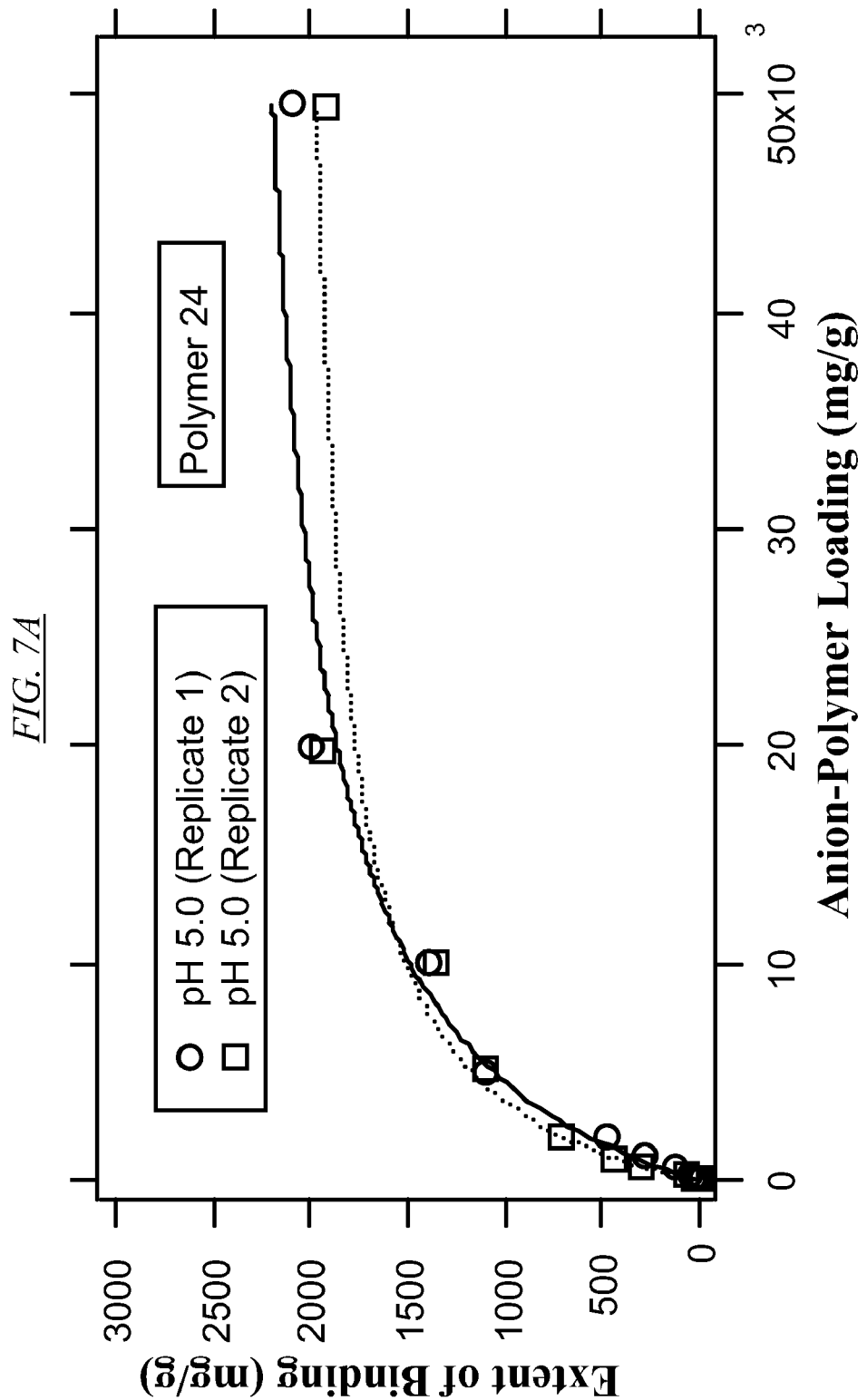
FIG. 7A shows an example of the extent of binding of perchlorate to Polymer 24 in deionized water at room temperature and pH 5.0.
Figure 7B:
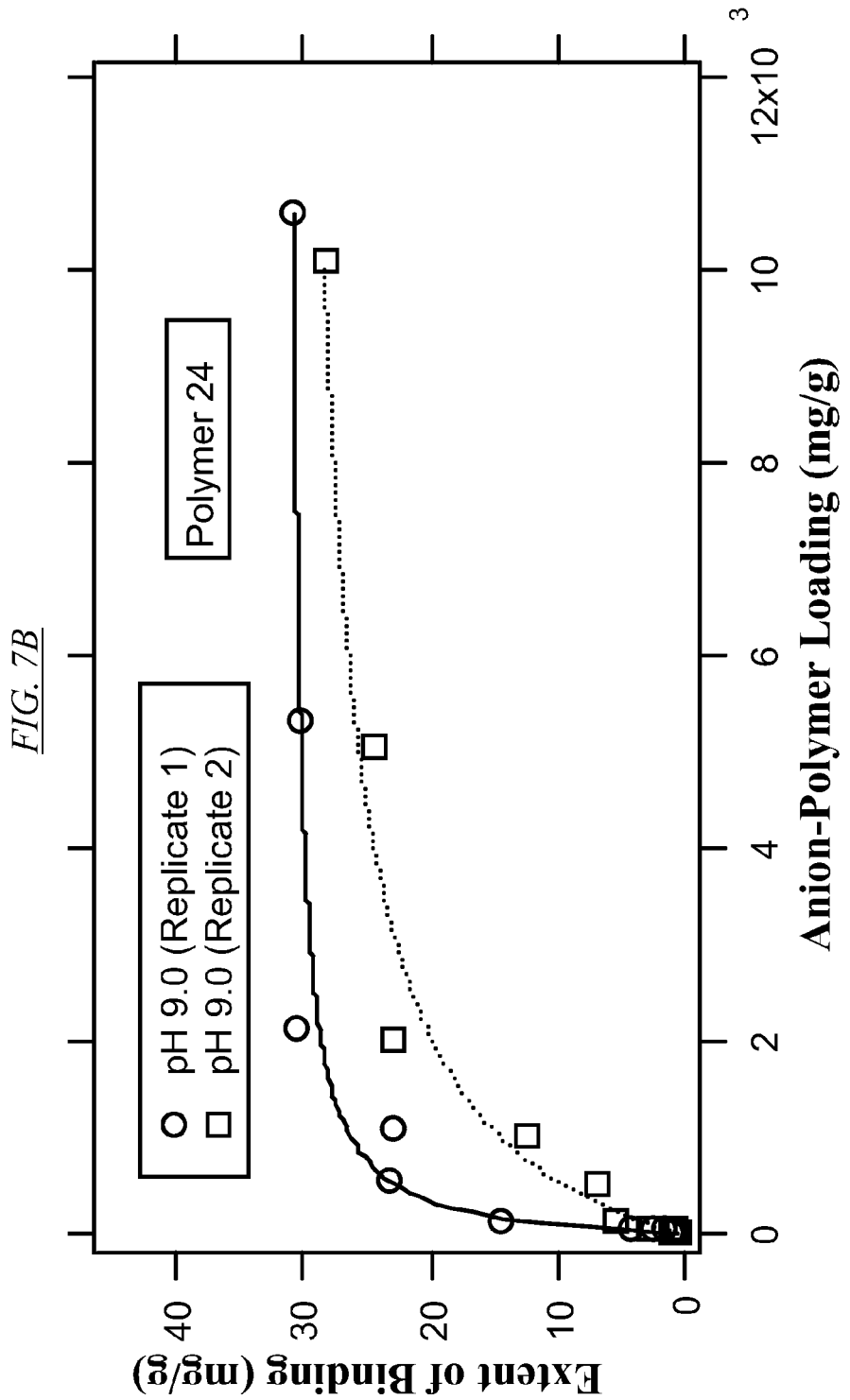
FIG. 7B shows an example of the extent of binding of perchlorate to Polymer 24 in deionized water at room temperature and pH 9.0.
Figure 7C:
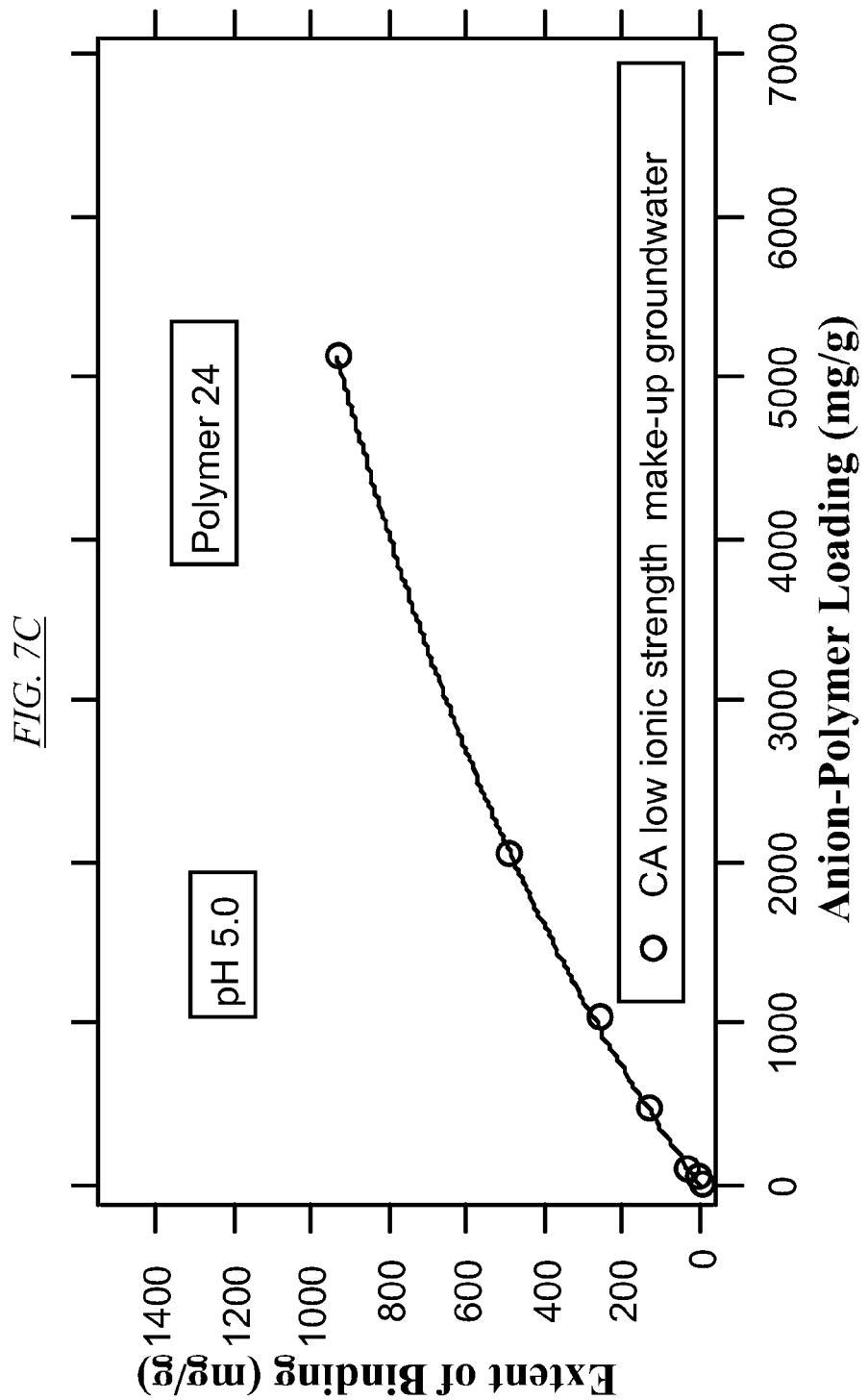
FIG. 7C shows an example of the extent of binding of perchlorate to Polymer 24 in low ionic-strength CA make-up groundwater at room temperature and pH 5.0.
Figure 7D:
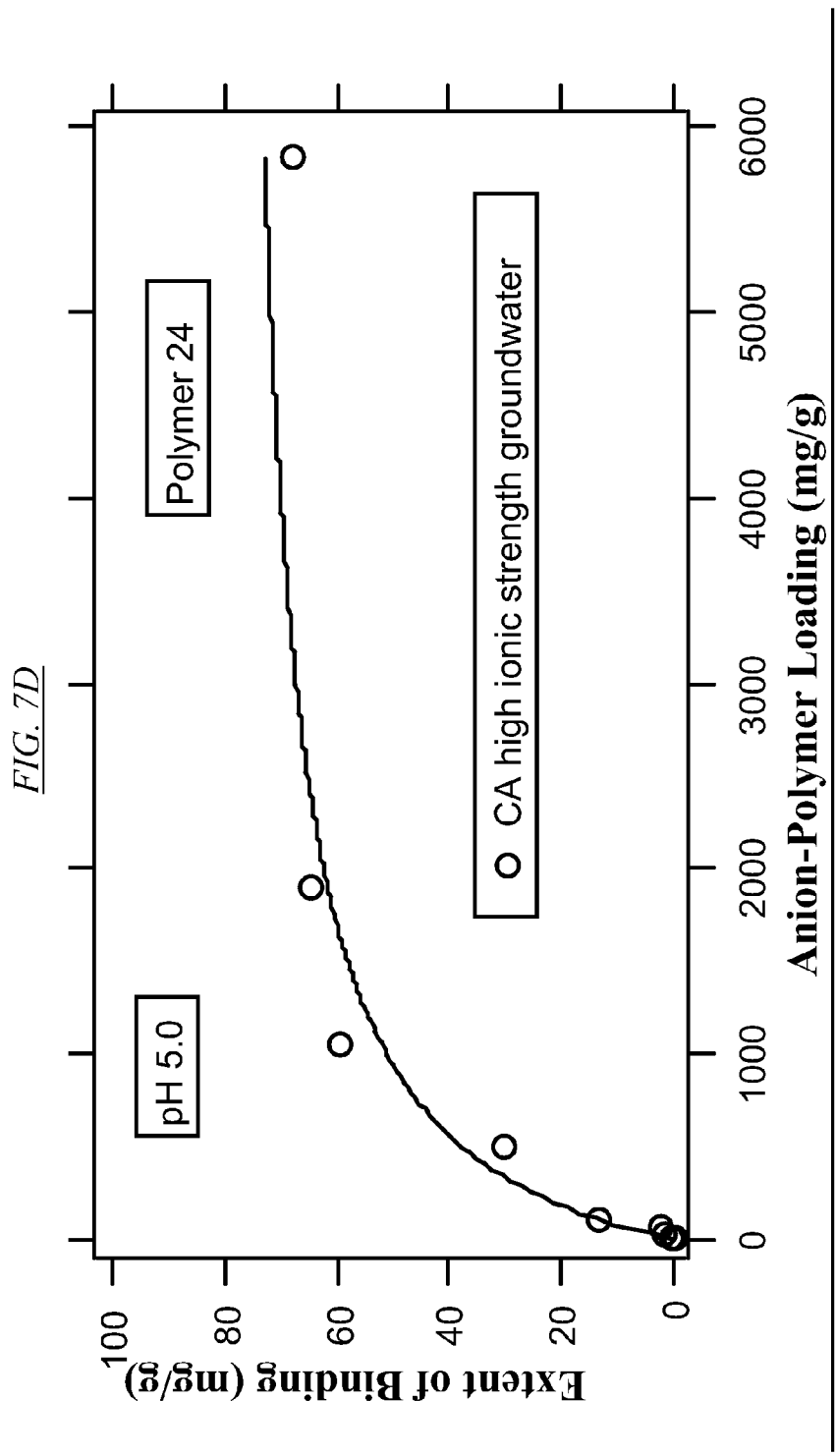
FIG. 7D shows an example of the extent of binding of perchlorate to Polymer 24 in high ionic-strength CA make-up groundwater at room temperature and pH 5.0.
Figure 8A:
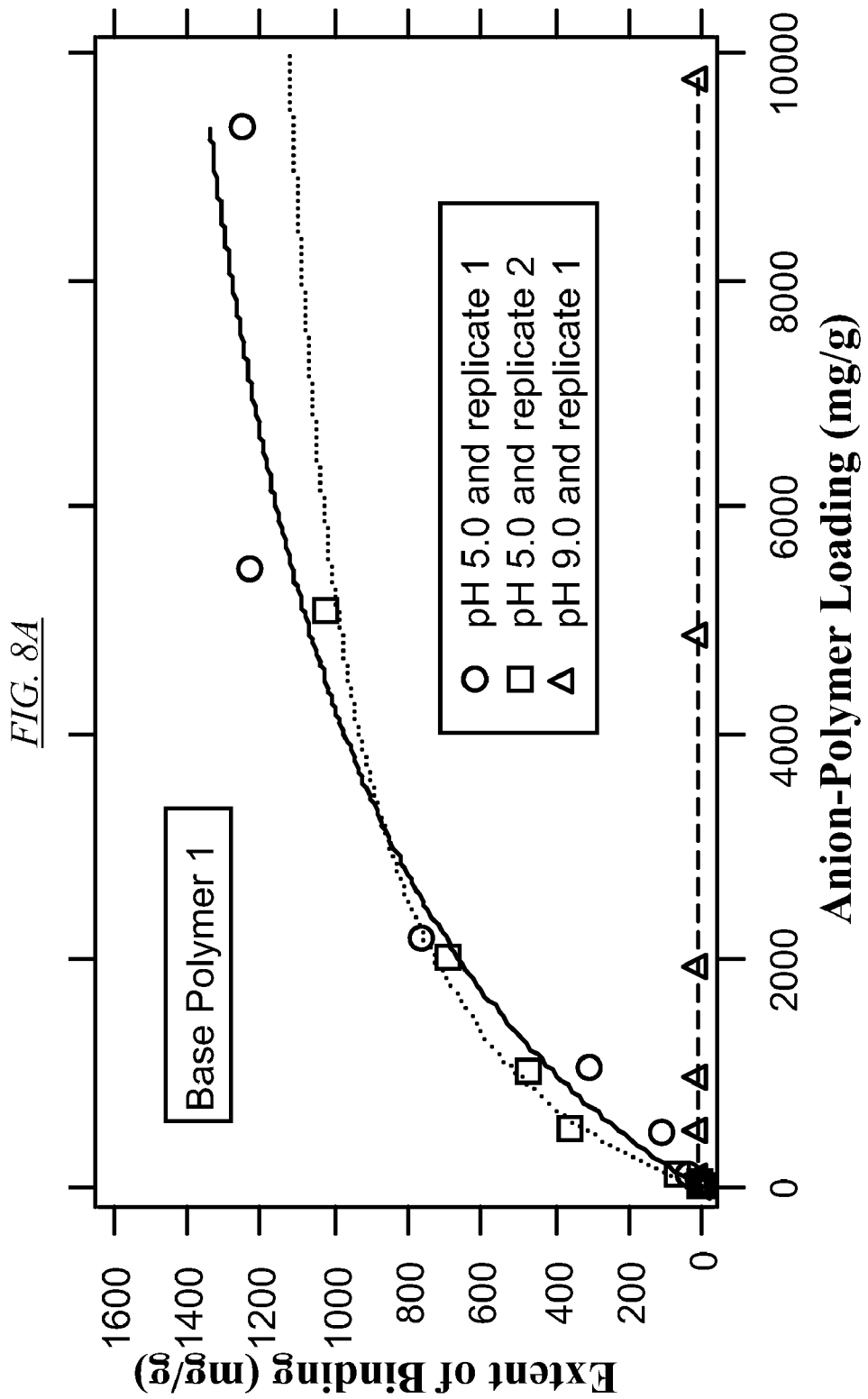
FIG. 8A shows an example of the extent of binding of nitrate to Base Polymer 1 in deionized water.
Figure 8B:
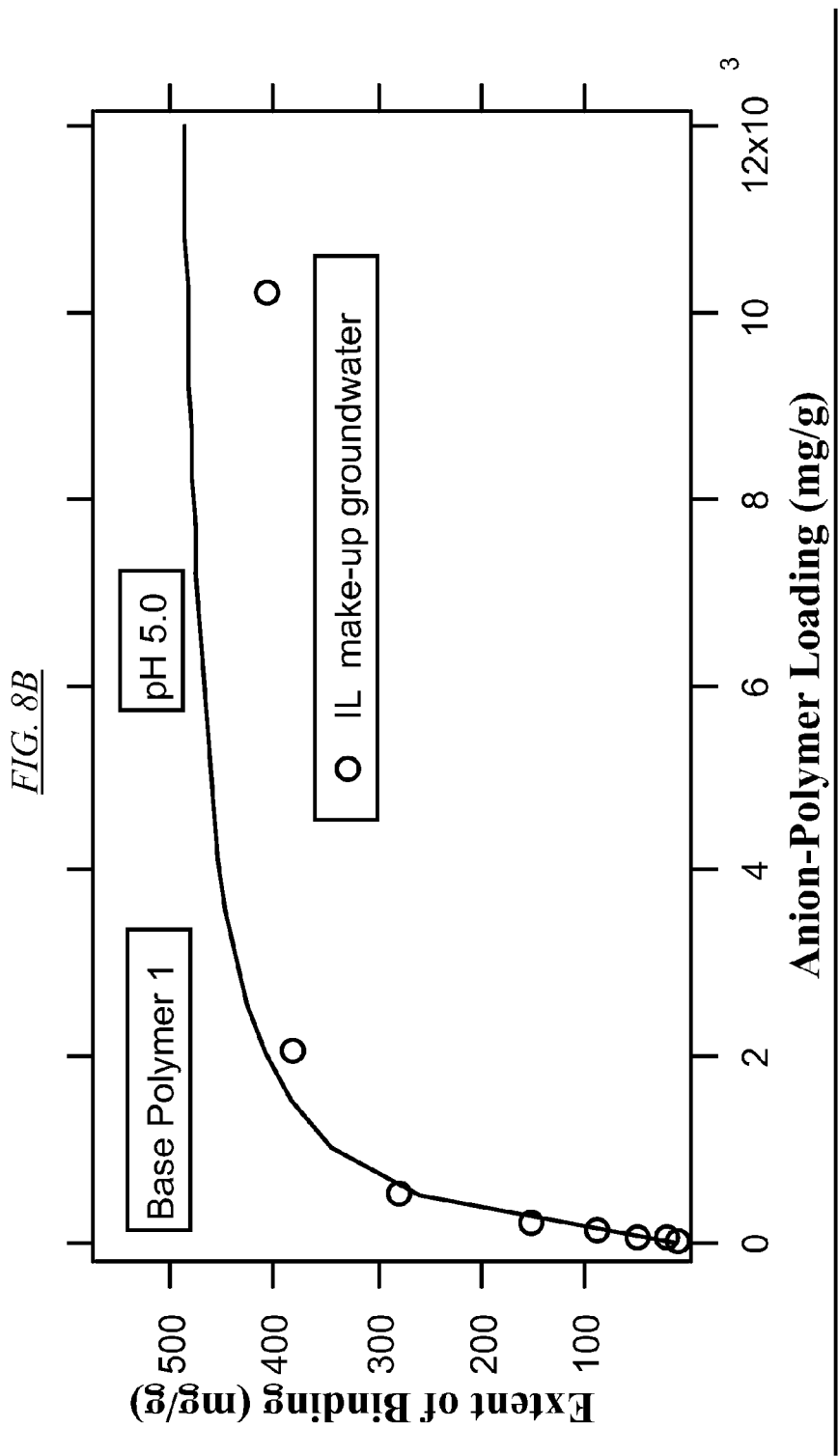
FIG. 8B shows an example of the extent of binding of nitrate to Base Polymer 1 in IL make-up groundwater.
Figure 9:
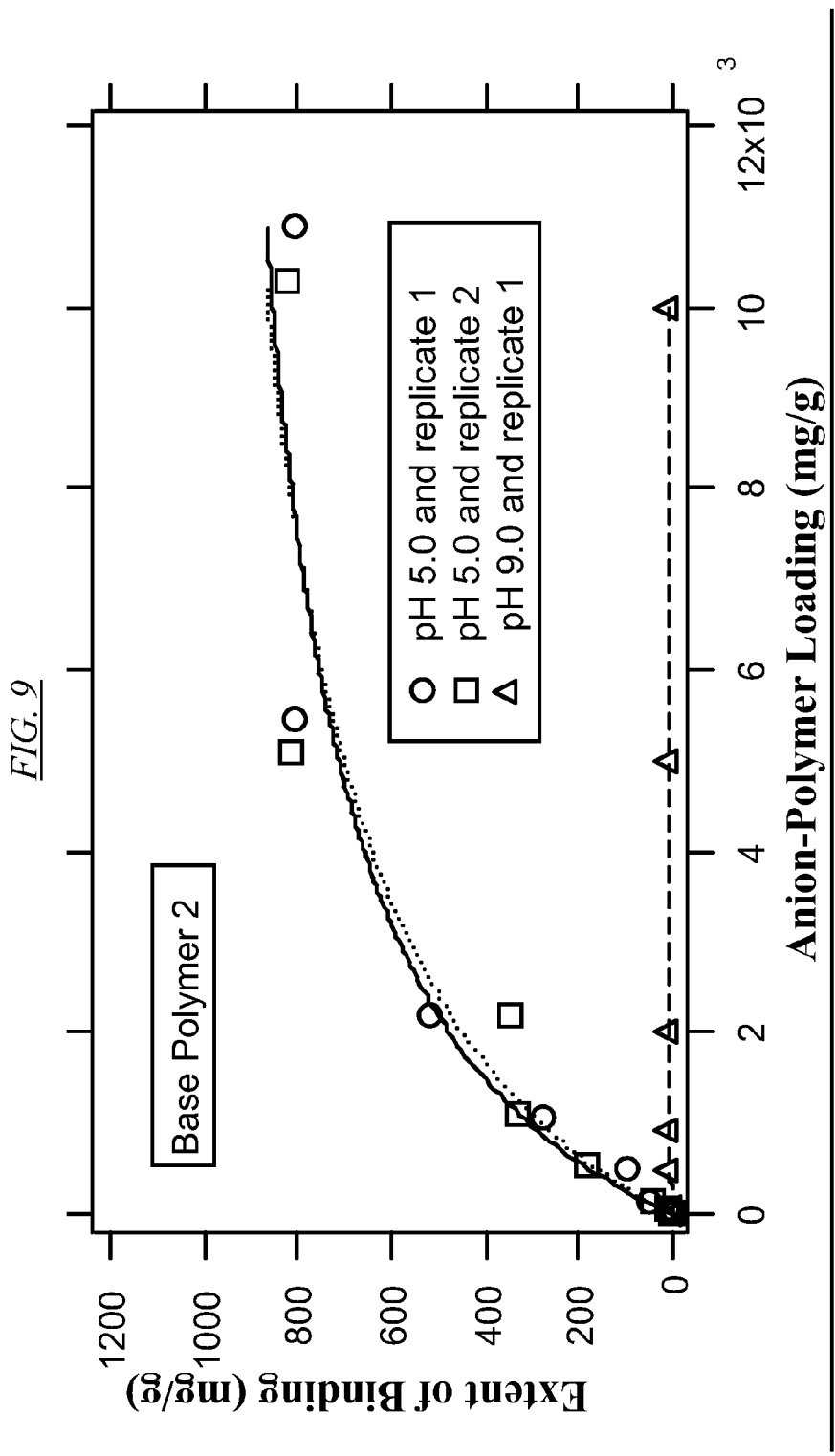
FIG. 9 shows an example of the extent of binding of nitrate to Base Polymer 2 in deionized water.
Figure 10:
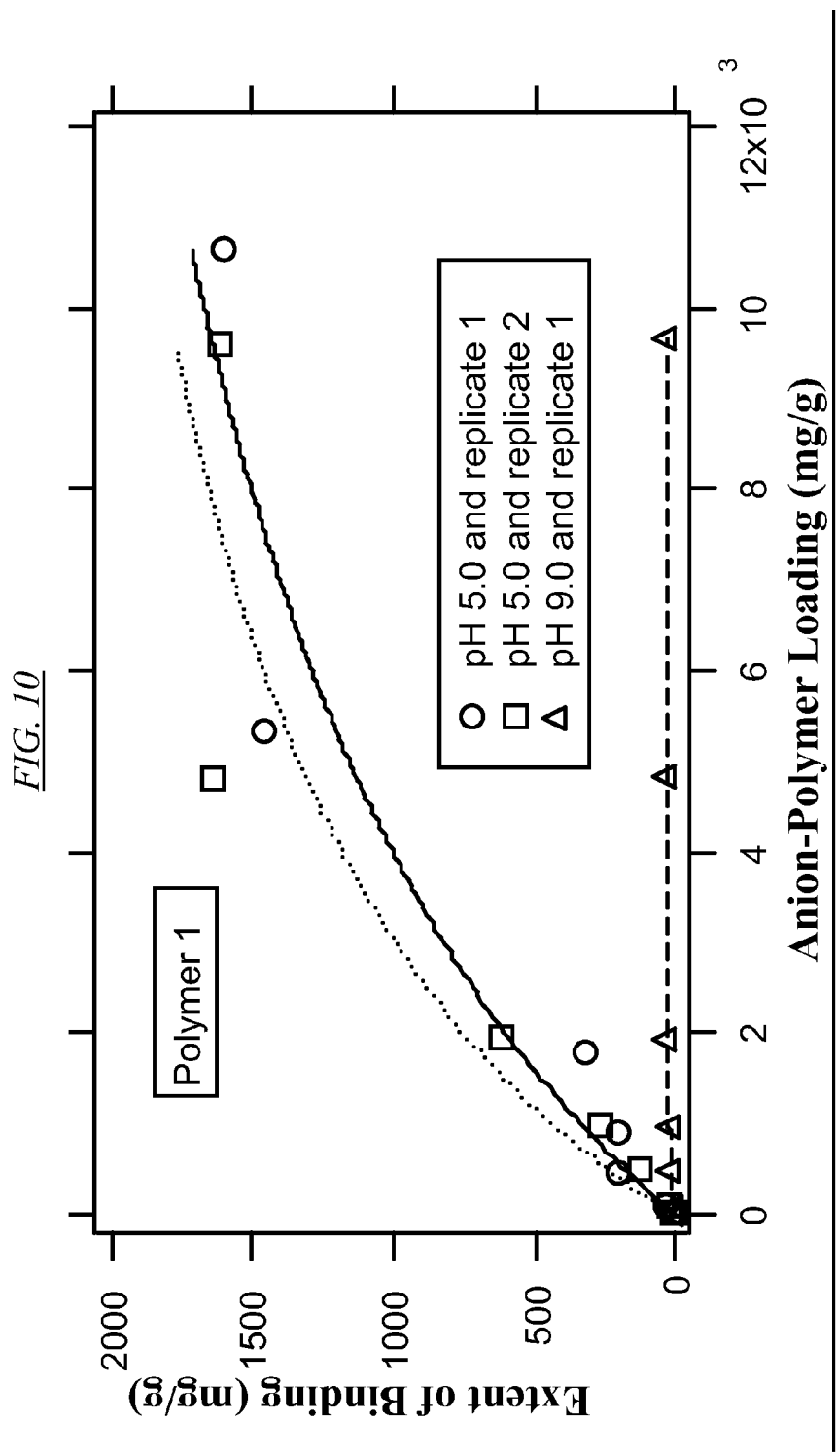
FIG. 10 shows an example of the extent of binding of nitrate to Polymer 1 in deionized water.

One may also exploit the rich chemistry, controlled molecular architecture and unique physicochemical properties of branched macromolecules to develop anion-selective hosts. Hyperbranched polyethyleneimine (PEI) polymers (FIG. 2) provide versatile building blocks for developing water-soluble, high capacity, selective and recyclable anion-selective macroligands for water treatment. For example, these macroligands and their mixtures can be used in a filtration process such as that depicted in FIG. 1 to recover anions and oxyanions such as, without limitations, $Cl^-$, $F^-$, $Br^-$, $NO_3^-$, $H_2PO_4^-$, $BrO_3^-$, $ClO_4^-$ and $SO_4^{2-}$.

In one embodiment, the high amine content and branched structure of a hyperbranched macromolecule such as PEI may make them highly attractive as building blocks for supramolecular anion-hosts. One useful feature of hyperbranched PEI polymers is the ease of chemical functionalization of their primary and secondary amine groups, which may enable the incorporation of functional groups that may enhance their anion binding capacity and selectivity.

As an example, a hyperbranched macromolecule (A) may be described as having a plurality of branches and a plurality of functional groups. The molecule also has a plurality of tertiary, and optionally secondary amine moieties. Each of the branches can comprise an N-substituted or N,N-substituted n-aminoalkyl moiety (B). Each substituent may either be (a) another branch, or (b) a terminal functional group. These branches are arranged in a hyperbranched structure, and the branches radiate from tertiary amines, and sometimes secondary amines. They will typically have a molecular weight of at least 1500 grams per mole, which makes them useful in ultrafiltration, since it is possible to design filters having pores large enough to allow solute to pass through at a useful flowrate, while blocking the hyperbranched molecules.

For each of the tertiary and secondary amines described above, each of the substituents, if any, which is not a branch of A as described above may, in one embodiment, be a functional group. Any number of functional groups might be included, such as, without limitation, hydrophobic groups and hydrophilic groups. In various non-limiting embodiments, a functional group might be alkyl, 2-hydroxyalkyl, 2-methyl-2-hydroxyalkyl, 2-hydroxy-2-phenylalkyl, or analogous groups. In another embodiment, a functional group may have the structure $-CH_2C(CH_3)_2CH_2NR^1R^2$, where $R^1$ and $R^2$ are preferably hydrophobic functional groups. Preferably, in this latter embodiment, the hyperbranched molecule contains no primary amine moieties and is water soluble. However, it can also be water insoluble. One of skill in the art will understand that one or more of the methyl groups in the above formula may be replaced by ethyl or analogous alkyl or similar groups.

The branched structure of a hyperbranched molecule useful in this disclosure, such as the molecule described above, may take many forms. In one embodiment, the hyperbranched macromolecule might contain no primary amine moieties. In another embodiment, the macromolecule might contain no secondary amine moieties. In another embodiment, each of the functional groups is a substituent to a branch point which comprises a secondary amine moiety. By "secondary amine moiety" is meant a moiety such as —NH—. It is not meant to include a —$NH_2$ moiety (which is a "primary amine moiety"). Preferably, the hyperbranched macromolecule useful in the present disclosure will preferably contain less than about 10% of primary amine moieties as a percentage of total primary, secondary, and tertiary amine moieties in the hyperbranched molecule. Less preferably, that percentage may be less than 5%, less than 8%, less than 15%, or less than 20%. Similarly, the hyperbranched macromolecule useful in the present disclosure will preferably contain less than about 10% of secondary amine moieties as a percentage of total primary, secondary, and tertiary amine moieties in the hyperbranched molecule. Less preferably, that percentage may be less than 5%, less than 8%, less than 15%, or less than 20%.

A hyperbranched macromolecule may be described by its degree of branching. In one embodiment of the present disclosure, the degree of branching may be in the range of about 65% to about 70%. Such a molecule may also be described by whether or not it is soluble or insoluble in water. In one embodiment, a hyperbranched macromolecule useful in the present disclosure may be water soluble at standard temperature and pressure, which is typically defined as 1 atmosphere and 20 degrees Celsius.

A hyperbranched macromolecule for use in the present disclosure may also be characterized by its binding properties to anion. In one preferred embodiment, a hyperbranched macromolecule may have an acidic binding capacity X that is at least twice (and preferably three times, more preferably five times, and most preferably ten times) the basic binding capacity Y with respect to an anion. The acidic binding capacity X is measured for this purpose by placing the hyperbranched macromolecule in an excess amount of the anion in water at pH 7.0 (preferably deionized water) at room temperature (20 degrees Celsius), and adding a sufficient amount of acid to achieve a pH of 5.0. Y is measured for this purpose by placing the hyperbranched macromolecule in an excess amount of the anion in water at pH 7.0 (preferably deionized water) at room temperature (20 degrees Celsius), and adding a sufficient amount of base to achieve a pH of 9.0. The reaction time should be sufficient for the reaction to go essentially to completion. Generally, 10 minutes should be sufficient. One of skill in the art will be able to select an appropriate acid or base for these measurements. They should preferably be acids and bases that simply alter the pH of the solution and do not otherwise react or interfere with the hyperbranched molecule or the anion, or cause unwanted precipitation or other side-reactions. In appropriate circumstances, examples might be, without limitation, hydrochloric acid or sodium hydroxide. The above method of characterizing hyperbranched molecules might be used on any ion, but preferable ions include perchlorate and nitrate. In the case of perchlorate, a suitable acid might preferably include perchloric acid. In the case of nitrate, a suitable acid might preferably include nitric acid.

The above measurements of X and Y is preferably carried out in deionized water. However, in another embodiment, a related measurement may be made in water (such as deionized water) to which a competing anion has been added. In one embodiment, the measurement of X and Y may take place in deionized water in which may also be carried out in water that contains 175.0 parts per million of sulfate ions. In one embodiment, a hyperbranched macromolecule is preferred if it has an acidic binding capacity X that is at least twice (and preferably three times, more preferably five times, and most preferably ten times) the basic binding capacity Y with respect to an anion, when measured in the presence of such competing sulfate ions.

In another embodiment of the present disclosure, a filtration method is described which includes providing a solution containing a first quantity of a contaminant; contacting the solution with a first quantity of a hyperbranched macromolecule under conditions such that the first quantity of the contaminant is bound to the first quantity of the hyperbranched macromolecule to produce: (a) a composition comprising a contaminant-bound hyperbranched macromolecule, and (b) a composition comprising a relatively contaminant-depleted solution; and separating the quantity of contaminant-bound hyperbranched macromolecules from the quantity of relatively contaminant-deleted solution. In this method, the hyperbranched macromolecule may be any of the hyperbranched molecules described above, any hyperbranched macromolecules described in the Examples of this disclosure, or any similar hyperbranched molecule.

The solution according to this method is preferably an aqueous solution, such that the solvent is water plus some optional other components such as salts, other contaminants, organic compounds, or other components of an aqueous solution known in the art. If the solution is an aqueous solution, the hyperbranched macromolecule might preferably be water soluble. In another embodiment, the hyperbranched macromolecule can also be water insoluble, and may be used in the above method in solid form which can make contact with the aqueous solution and absorb the contaminant of interest. Methods are well known in the art for contacting a liquid with a solid. Preferably, the solid, insoluble hyperbranched macromolecule is in the form of a powder. In other embodiments, the hyperbranched macromolecule may be in the form of pellets or a porous surface. In one embodiment, the insoluble hyperbranched macromolecule may be mixed or bound with another component such as a binder, filler, catalyst, or substrate. Examples of useful water insoluble hyperbranched macromolecules include epoxypentane-PEI, epoxyhexane-PEI, and styrene oxide-PEI, which are described below. Water insoluble hyperbranched macromolecules may be used to extract organic compounds from the water, which may be absorbed into the macromolecules.

The solution may also be a non-aqueous solution, such that the method might be useful for the purification of non-aqueous solutions such as organic chemical wastes, nuclear wastes in non-aqueous solvents, or other non-aqueous solutions containing a contaminant. A hyperbranched macromolecule that is soluble in the non-aqueous solution may, in one embodiment, be used to recover anions in the non-aqueous solution.

After a hyperbranched macromolecule becomes bound to a contaminant in any of the embodiments described in this disclosure, the macromolecules may, in one embodiment, be discarded while still bound with the contaminant. In another embodiment, the contaminant may be made to disassociate with the hyperbranched macromolecule. There are several reasons why this may be desirable. For example, one may wish to recycle the hyperbranched macromolecule. Alternatively, one may wish to further concentrate the contaminant prior to discarding, or perform further processing of the contaminant. Thus, it may be desirable to dissociate the contaminant from the hyperbranched macromolecule. One embodiment for doing this involves introducing the contaminant-bound hyperbranched macromolecules into an aqueous environment where the pH is greater than the pH of the aqueous environment, and wherein conditions are such that the contaminant separates from the hyperbranched macromolecules.

The separation of the contaminant from the hyperbranched macromolecules can occur in many ways. In one embodiment, the separation can occur through cross-flow filtration. In one example of this, a fraction of polydispersed hyperbranched macromolecules may be retained completely by a polymer membrane (in cross-flow filtration) of specific molecular weight cut-off by using diafiltration. Cross-flow filtration is particularly value for recovering hyperbranched macromolecules, because it reduces the incidence of membrane fouling.

A her comprising the step of providing a cross-flow filter wherein the mixture of said portion of molecules of the contaminant and said portion of the hyperbranched macromolecules pass transversely across the cross-flow filter while a portion of the contaminant passes through the filter.

Example 1

The following example illustrates various embodiments of hyperbranched macromolecules and their binding properties and other properties. This example is illustrative of the disclosed embodiments, but does not limit them in any way:

The Examples herein describe various embodiments of the synthesis and characterization of a broad range of anion-selective branched macromolecules via functionalization of the primary and secondary amine groups of PEI hyperbranched macromolecules (Base Polymer 1 with $M_w$=750 KDalton and Base Polymer 2 with $M_w$=25 KDalton). In each of the illustrative examples described herein, the primary and secondary amine groups of hyperbranched PEI are converted to tertiary amines. However, in alternative embodiments, the primary amines may be converted to secondary amines or tertiary amines, and the secondary amines may or may not be converted to tertiary amines. It is known in the art that tertiary amines have acidity constants ranging from about pKa=6.0-7.0; whereas the pKa of secondary and primary amines are, respectively, in the approximate range of 8.0-9.0 and 9.2-10.5. This means that at pH 5.0 and pH 9.0 or thereabouts, the primary and secondary amines of the unmodified PEI hyperbranched macromolecules (Base Polymer 1 and Base Polymer 2) are likely to be predominantly protonated. Conversely, the modified hyperbranched PEI macromolecules with tertiary amine groups described in this disclosure are expected to be (i) fully protonated at pH 5.0 and (ii) unprotonated at pH 9.0. Thus, for example, we expect the conversion of the primary or secondary amine groups of Base Polymer 1 and Base Polymer 2 to tertiary amines to facilitate the binding and release of anions within a moderate pH range of about 5.0 to 9.0. FIG. 3A, FIG. 3B, FIG. 4A, FIG. 4B, FIG. 4C, FIG. 4D, FIG. 5A, FIG. 5B, FIG. 6A, FIG. 6B, FIG. 6C, FIG. 6D, FIG. 7A, FIG. 7B, FIG. 7C, FIG. 7D, FIG. 8A, FIG. 8B, FIG. 9, FIG. 10, FIG. 11, FIG. 12, FIG. 13A and FIG. 13B show examples of results one might obtain by measuring the extents of binding of anions to the example functionalized PEI hyperbranched macromolecules listed in Table 2 using $ClO_4^-$ and $NO_3^-$ as model anions. Such anion binding measurements may be used to validate a host design or design strategy according to the present disclosure, through the synthesis of functionalized PEI hyperbranched macromolecules with high binding capacity and selectivity for the target anions. Such anion binding measurements may be obtained by purifying aqueous stock solutions of the macromolecules by removing the fraction that passes through a 3 KDalton polyethersulfone (PES) UF membrane.

TABLE 2

Examples of functionalized PEI hyperbranched polymers.

| Macromolecule | Chemistry |
|---|---|
| Base Polymer 1 | Hyperbranched PEI polymer (molecular weight of approximately 750 KDalton) |
| Base Polymer 2 | Hyperbranched PEI polymer (molecular weight of approximately 25 KDalton) |
| Polymer 1 | Propylene Oxide-Base Polymer 1 |
| Polymer 2 | Ethyl-Base Polymer 1 |
| Polymer 19 | Epoxybutane-Base Polymer 1 |
| Polymer 24 | Methylated-Base Polymer 1 |

The perchlorate binding data may be fitted to the Langmuir model given below:

$$EOB = \frac{C_{max}K[APL]}{1.0 + K[APL]} \qquad \text{Eq. 1}$$

where EOB (mg/g) is the extent of binding, and where $C_{max}$ is the binding capacity (mg/g). K is an "operational" binding constant and APL (mg/g) is the anion-polymer loading (mg/g). Table 3 shows that the functionalization of the example PEI hyperbranched macromolecules correlates with a significant increase of their perchlorate binding capacity, among the examples shown. Preferably, the binding capacity at pH 5.0 is at least double, and most preferably greater than 10 times, the binding capacity at pH 9.0. The binding capacity should also preferably be at least double the binding capacity of Base Polymer 1. In preferred embodiments, such as Polymer 24, there is a 6-7 fold increase of its perchlorate binding capacity [~2400-2100 mg/g] compared to that of Base Polymer 1 [~350-330 mg/g]. In all cases, the perchlorate binding of the functionalized PEI macromolecules are very low at pH 9.0. For Polymer 24, example, its perchlorate binding capacity at pH 9 is approximately equal to 1.5% of its binding capacity at pH 5.0.

TABLE 3

Perchlorate binding capacities of example polymers in deonized water.

| Polymer | pH | $^aC_{max1}$ (mg/g) | $^aC_{max2}$ (mg/g) | $^aK_1$ | $^aK_2$ | $\frac{C_{max1-pH9}}{C_{max1-pH5}}$ (%) | $\frac{C_{max2-pH9}}{C_{max2-pH5}}$ (%) |
|---|---|---|---|---|---|---|---|
| Base Polymer 1 | 5 | 334.09 | 349.78 | 0.003 | 0.002 | | |
| Base Polymer 1 | 9 | 12.13 | 11.44 | 0.003 | 0.009 | 3.63 | 3.27 |
| Base Polymer 2 | 5 | 258.63 | 224.19 | 0.003 | 0.003 | | |
| Base Polymer 2 | 9 | 20.51 | 16.27 | 0.019 | 0.022 | 7.93 | 7.26 |
| Polymer 1 | 5 | 773.65 | 835.44 | 0.0001 | 0.0007 | | |
| Polymer 1 | 9 | 24.10 | 15.89 | 0.0004 | 0.003 | 3.11 | 1.90 |
| Polymer 2 | 5 | 1086.20 | 965.64 | 0.0005 | 0.0008 | | |
| Polymer 2 | 9 | 25.83 | 16.69 | 0.009 | 0.020 | 2.38 | 1.73 |
| Polymer 19 | 5 | 534.50 | 527.48 | 0.0009 | 0.0004 | | |
| Polymer 19 | 9 | 45.90 | 46.62 | 0.0052 | 0.009 | 8.59 | 8.84 |
| Polymer 24 | 5 | 2493.00 | 2127.1 | 0.00015 | 0.00025 | | |
| Polymer 24 | 9 | 31.32 | 32.76 | 0.0052 | 0.00083 | 1.26 | 1.54 |

$^a$Perchlorate binding data were fitted to the Langmuir model (See Eq. 1)

Although Polymer 24 has the highest perchlorate binding capacity in deionized water of the examples shown (Table 3), it may not be the most selective/effective at binding perchlorate in water with high concentration of competing anions such as $SO_4^{2-}$. Table 4 lists the perchlorate binding capacity that might be measured with respect to the example macromolecules (Table 2) in two illustrative California (CA) make-up groundwater samples: a "high" ionic strength sample and a "low" ionic strength sample.

TABLE 4

Perchlorate binding capacities of example polymers in high and low ionic strength water.

| Polymer | pH | [a]Ionic Strength | [b]$C_{max}$ (mg/g) | [b]K |
|---|---|---|---|---|
| Polymer 1 | 5 | High | 1.0 | 0.02 |
| Polymer 1 | 5 | Low | 257.3 | 0.0006 |
| Polymer 19 | 5 | High | 524.6 | 0.0014 |
| Polymer 19 | 5 | Low | 486.61 | 0.001 |
| Polymer 24 | 5 | High | 79.8 | 0.0018 |
| Polymer 24 | 5 | Low | 2373.1 | 0.0001 |

[a]Perchlorate binding data are fitted to the Langmuir model (See Table 3).

The compositions of the make-up groundwater samples are listed in Table 5 and Table 6. For the particular high and low ionic strength samples presented herein, the molar ratios of $SO_4^{2-}$ to $ClO_4^-$ are, respectively, equal to 604 and 310 for the low and high ionic strength make-up groundwater samples. Note that that in this example the perchlorate binding capacity of Polymer 24 (about 2370 mg/g) is equal to that in deionized water [about 2400-2100 mg/g] in the low-ionic strength make-up groundwater. However, in the high-ionic strength make-up groundwater, the binding capacity of perchlorate by Polymer 24 [80 mg/g] is equal to 3% of its binding capacity in deionized water. Conversely, the perchlorate binding capacity of Polymer 19 (525 mg/g) in this example is not affected by the high sulfate content of the high ionic strength make-up CA groundwater sample. Thus, in this example, Polymer 19 is more selective/effective at binding $ClO_4^-$ in aqueous solutions containing high concentration of competing divalent anions such as $SO_4^{2-}$.

TABLE 5

Composition of Low Ionic-Strength CA Make-Up Groundwater

| Anions | Conc (ppm) | Cations | Conc (ppm) |
|---|---|---|---|
| $ClO_4^-$ | 0.10 | $Na^+$ | 31.0 |
| $NO_3^-$ | 3.0 | $Ca^{2+}$ | 50.0 |
| $SO_4^{2-}$ | 30.0 | $Mg^{2+}$ | 20 |
| $Cl^-$ | 35.0 | $K^+$ | 6.9 |

TABLE 6

Composition of High Ionic-Strength California Make-Up Groundwater

| Anions | Conc (ppm) | Cations | Conc (ppm) |
|---|---|---|---|
| $ClO_4^-$ | 0.30 | $Na^+$ | 530.0 |
| $NO_3^-$ | 0.90 | $Ca^{2+}$ | 39.0 |
| $SO_4^{2-}$ | 175.0 | $Mg^{2+}$ | 9.2 |
| $Cl^-$ | 385.0 | $Fe^{3+}$ | 0.01 |
|  |  | $K^+$ | 6.9 |

Table 7 lists the nitrate binding capacity of the example polymers in deionized water and particular illustrative samples of Illinois make-up groundwater at pH 5 and 9. Table 8 gives the composition of the Illinois groundwater. Note that Polymer 19 in this example has the lowest nitrate binding capacity (71 mg/g) at pH 5.0 and highest $$\frac{C_{max1-pH9}}{C_{max1-pH5}}$$

ratio (34%) at pH 9.0. Conversely, Polymer 24 in this example has the highest nitrate binding capacity (about 4400-3600 mg/g at pH 5.0) in deonized water and Illinois make-up groundwater. Its $$\frac{C_{max1-pH9}}{C_{max1-pH5}}$$

ratio is also very low (2.7%) at pH 9.0. This suggests that Polymer 24 is the most effective/selective and recyclable ligand for nitrate in this example.

TABLE 7

Nitrate binding capacities of example polymers in deonized water and Illinois make-up groundwater.

| Polymer | pH | [a]$C_{max1}$ (mg/g) | [a]$C_{max2}$ (mg/g) | [a]$K_1$ | [a]$K_2$ | $\frac{C_{max1-pH9}}{C_{max1-pH5}}$ (%) |
|---|---|---|---|---|---|---|
| Base Polymer 1 | 5 | 1870.0 | 1301.0 | 0.0003 | 0.0006 |  |
| Base Polymer 1 | 9 | 14.72 |  | 0.0193 |  | 0.79 |
| [b]Base Polymer 1 | 5 | 508.5 |  | 0.002 |  |  |
| Base Polymer 2 | 5 | 1064.3 | 1125.1 | 0.0004 | 0.0003 |  |
| Base Polymer 2 | 9 | 9.20 |  | 0.002 |  | 0.86 |
| Polymer 1 | 5 | 3014.4 | 2757.3 | 0.0001 | 0.0002 |  |
| Polymer 1 | 9 | 30.52 |  | 0.002 |  | 1.01 |
| Polymer 2 | 5 | 3615.1 | 3497.4 | 0.0001 | 0.0001 |  |
| Polymer 2 | 9 | 36.05 |  |  | 0.003 | 1.00 |
| Polymer 19 | 5 | 71.21 |  | 0.001 |  |  |
| Polymer 19 | 9 | 24.06 |  | 0.001 |  | 34 |
| Polymer 24 | 5 | 4400.0 | 3598.0 |  |  |  |

TABLE 7-continued

Nitrate binding capacities of example polymers in deonized water and Illinois make-up groundwater.

| Polymer | pH | $^a C_{max1}$ (mg/g) | $^a C_{max2}$ (mg/g) | $^a K_1$ | $^a K_2$ | $\dfrac{C_{max1\text{-}pH9}}{C_{max1\text{-}pH5}}$ (%) |
|---|---|---|---|---|---|---|
| Polymer 24 | 9 | 120.67 | | $3.64 \times 10^{-5}$ | | 2.74 |
| $^b$Polymer 24 | 5 | 3564.4 | | $8.598 \times 10^{-5}$ | | |

$^a$Nitrate binding data are fitted to the Langmuir model (See Eq. 1)
$^b$Nitrate binding capacity in IL make-up groundwater.

TABLE 8

Composition of Illinois Make-Up Groundwater

| Anions | Conc (ppm) | Cations | Conc (ppm) |
|---|---|---|---|
| $NO_3^-$ | 60 | $Na^+$ | 100 |
| $SO_4^{2-}$ | 33 | $Ca^{2+}$ | 59 |
| $Cl^-$ | 3 | $Mg^{2+}$ | 35 |
| $HCO_3^-$ | 40 | $Fe^{3+}$ | 0.6 |
| | | $K^+$ | 10 |

Figure 11:
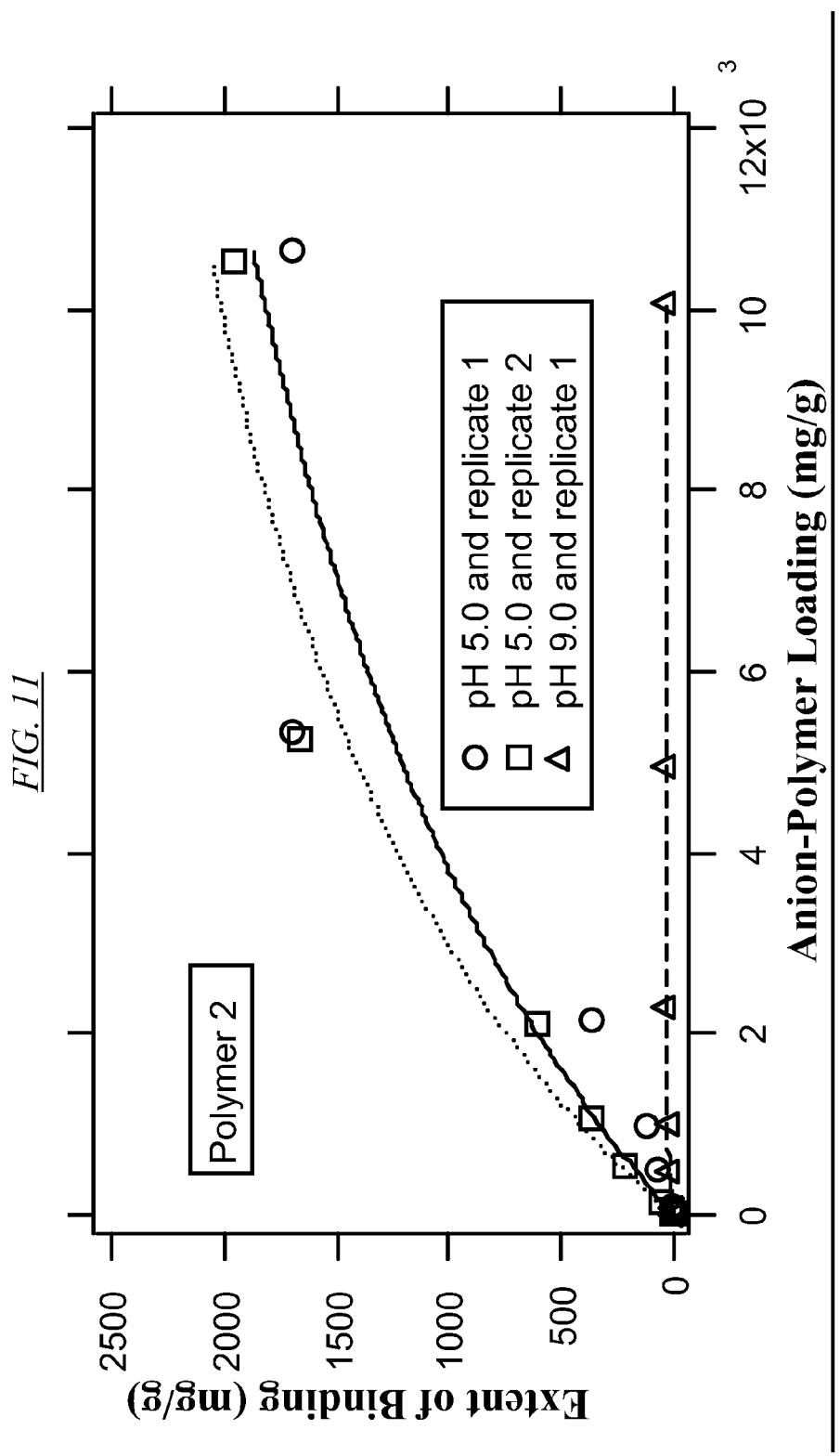
FIG. 11 shows an example of the extent of binding of nitrate to Polymer 2 in deionized water.
Figure 12:
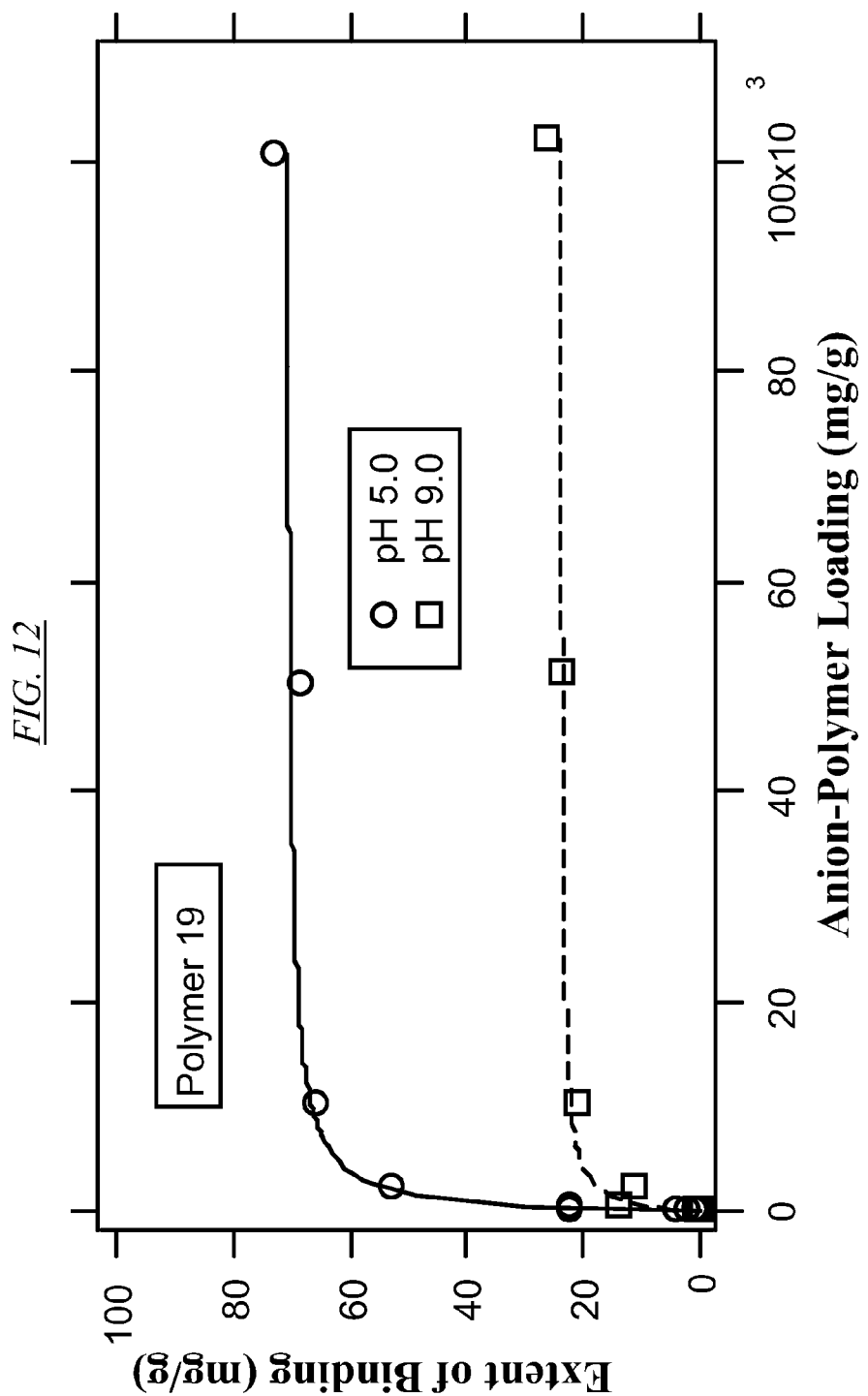
FIG. 12 shows an example of the extent of binding of nitrate to Polymer 19 in deionized water.
Figure 13A:
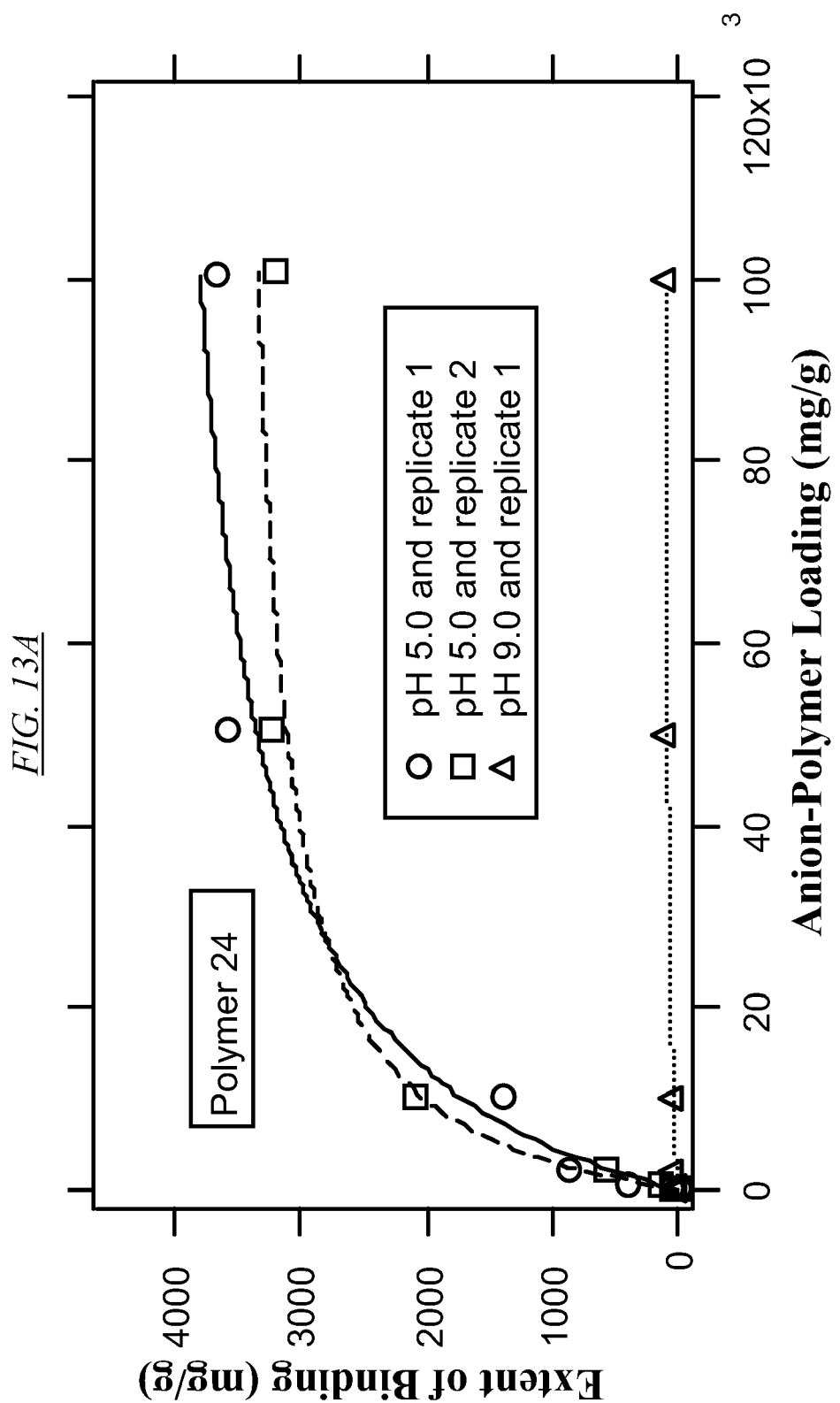
FIG. 13A shows an example of the extent of binding of nitrate to Polymer 24 in deionized water.
Figure 13B:
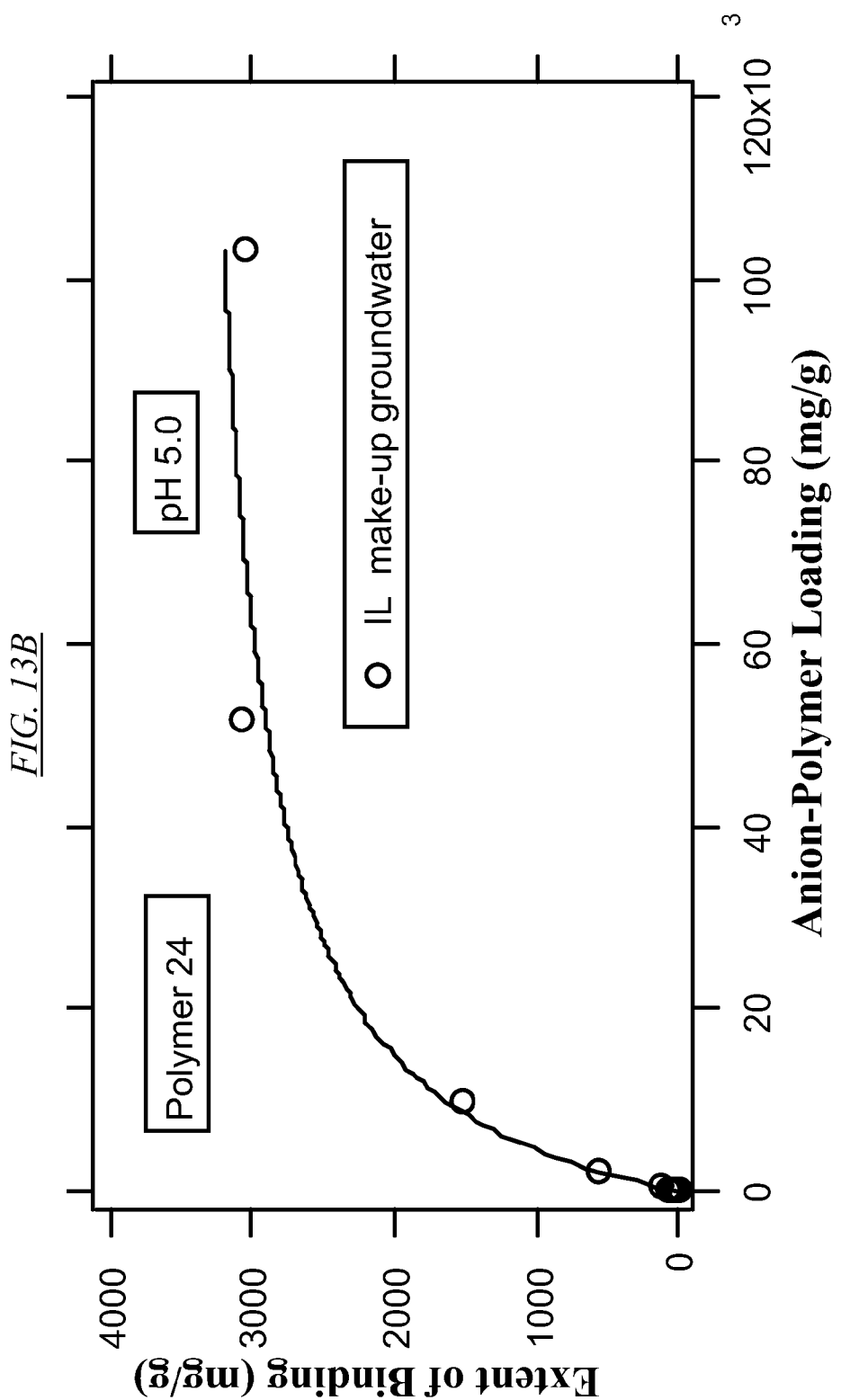
FIG. 13B shows an example of the extent of binding of nitrate to Polymer 24 in IL make-up groundwater.
Figure 16:
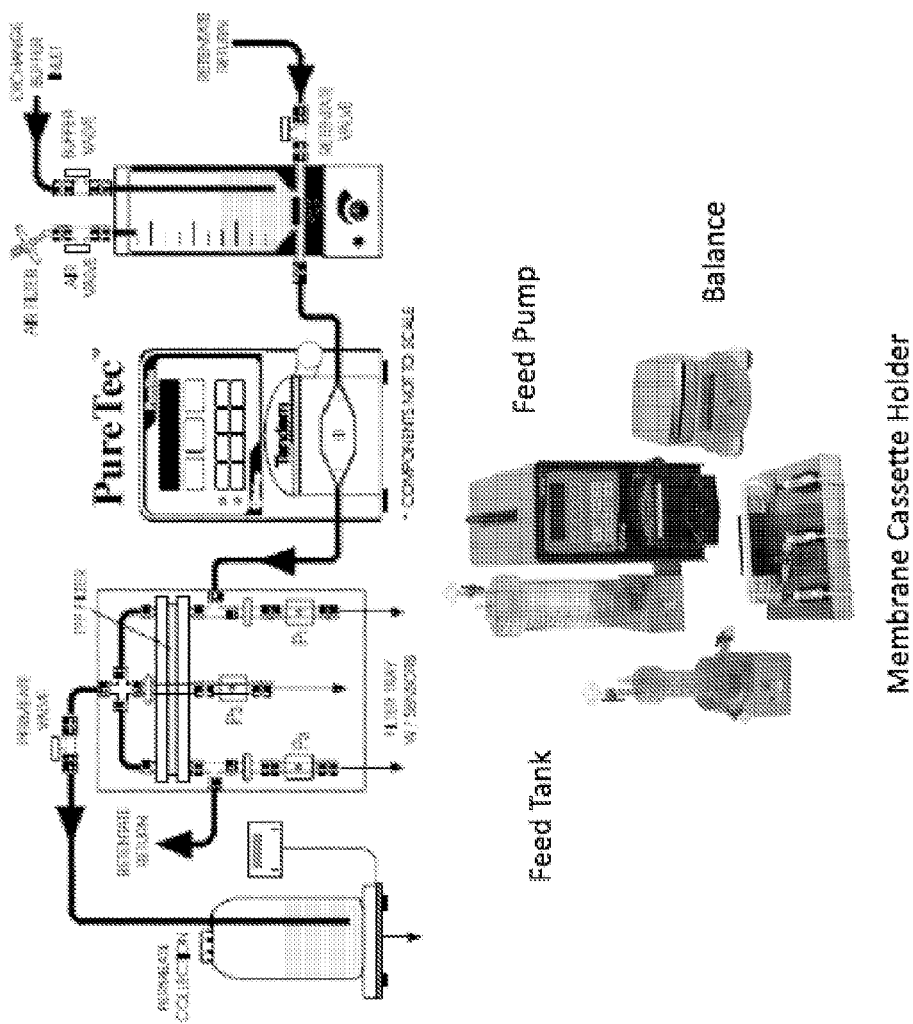
FIG. 16 shows the bench scale PureTec system used to recover perchlorate from in high ionic-strength CA make-up groundwater.
Figure 17:
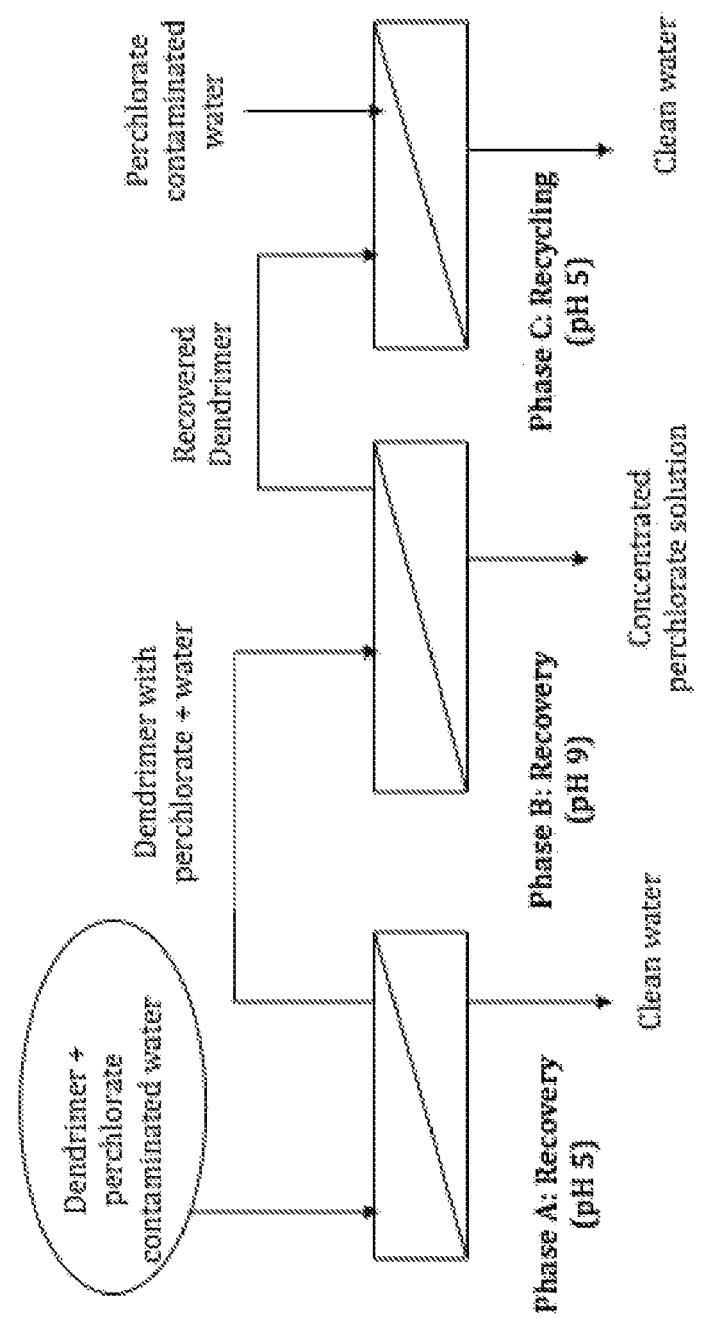
FIG. 17 shows the design of the perchlorate DEF recovery experiments.

In an embodiment of the inventions described herein, one might carry out a proof-of-concept experiment on the application of DEF to perchlorate recovery from contaminated water using Polymer 19. A PureTec™ laboratory UF system (purchased from SciLog) and 3 KDa PES membrane [purchased from the Pall Corporation] may be employed in the filtration studies (FIG. 16). A high ionic-strength CA make-up may be prepared based on the concentrations of anions and cations given in Table 6. The DEF experiments may be carried out in three phases (FIG. 17): recovery (Phase A), release (Phase B) and recycling (Phase C). In phase A, aliquots of stock solutions of Polymer 19, $ClO_4^-$ and 1.0 M HCl may be added to make-up CA groundwater to prepare a 400 mL feed solution containing 300 ppb of perchlorate at pH 5.0. The target anion loading capacity may be set to 300 mg perchlorate per 1 g polymer. Note this value in this example is lower that the perchlorate binding capacity of Polymer 19 (525 mg/g) [Table 4]. The feed solution may be subsequently concentrated to a final volume of 20 mL using the bench scale PureTec™ UF system. In phase B, the perchlorate bound to Polymer 19 may be released at pH 9.0 to enable the subsequent recycling of this polymer. This may be accomplished, for example, by mixing the retentate of phase A with deionized water to increase its volume to a suitable level for processing followed by addition of NaOH. In phase C, the recovered polymer may be used again to treat another batch of perchlorate contaminated water. Table 9, Table 10 and Table 11 list exemplary process conditions and perchlorate/polymer recovery for each phase. The perchlorate concentration may be reduced from 300 ppb in the feed to less than 8 ppb in the permeate at pH 5 in Phase A. This correspond to a perchlorate retention greater than 97% (Table 9). This result might be found to be consistent with independent measurements by UV-Vis spectroscopy that yield polymer retention greater than 97%. The bound perchlorate may be released into the permeate stream at pH 9 in Phase B. In this case, one might measure that 87% of the bound perchlorate is released (Table 10). The polymer may be recovered (~95%) and reused to treat another batch of 300 ppb perchlorate contaminated water in Phase C. In this example, the perchlorate concentration may be reduced to 10 ppb (FIG. 11). The overall results of the example bench scale filtration experiments show that DEF (with Polymer 19) can be used to recover perchlorate from aqueous solutions in the presence of large amounts (greater than 150 ppm) of divalent anions such as sulfate.

TABLE 9

Example Process Conditions and Perchlorate Recovery in Phase A

| Feed volume (mL) | 400 |
|---|---|
| Perchlorate concentration in the feed (ppb) | 300 |
| Amount of polymer added (mg) | 0.4 |
| Membrane area (m$^2$) | 0.005 |
| Flow rate (mL/h) | 40 |
| Transmembrane pressure (psi) | 30 |
| pH | 5 |
| Perchlorate concentration in the permeate (ppb) | <8 |
| Concentration factor | 20 |
| Final retentate volume (mL) | 20 |
| Polymer retention (%) analyzed by UV-Vis | >97% |
| Amount of HCl (0.1 M) acid added (mL) | 1.3 |

TABLE 10

Example Process Conditions and Perchlorate Recovery in Phase B

| Total feed volume (ml) | 96 |
|---|---|
| Concentration factor | 10 |
| Final retentate volume (ml) | 20 |
| pH | 9 |
| Amount of pure NaOH needed (mg) | 16.32 |
| Perchlorate concentration in the permeate (ppb) | 260 |
| % perchlorate released | 88 |

TABLE 11

Example Process Conditions and Perchlorate Recovery in Phase C

| Feed volume (mL) | 400 |
|---|---|
| Perchlorate concentration in the feed (ppb) | 300 |
| Amount of polymer regenerated (mg) (~95%) | 0.38 |
| Membrane area (m$^2$) | 0.005 |
| Flow rate (ml/h) | 40 |
| Transmembrane pressure (psi) | 30 |
| pH | 5 |
| Amount of HCl (~1 M) acid added (μL) | 200 |
| Perchlorate concentration in the permeate (ppb) | 10 |
| Concentration factor | 10 |
| Final retentate volume (ml) | 40 |

Figure 18:
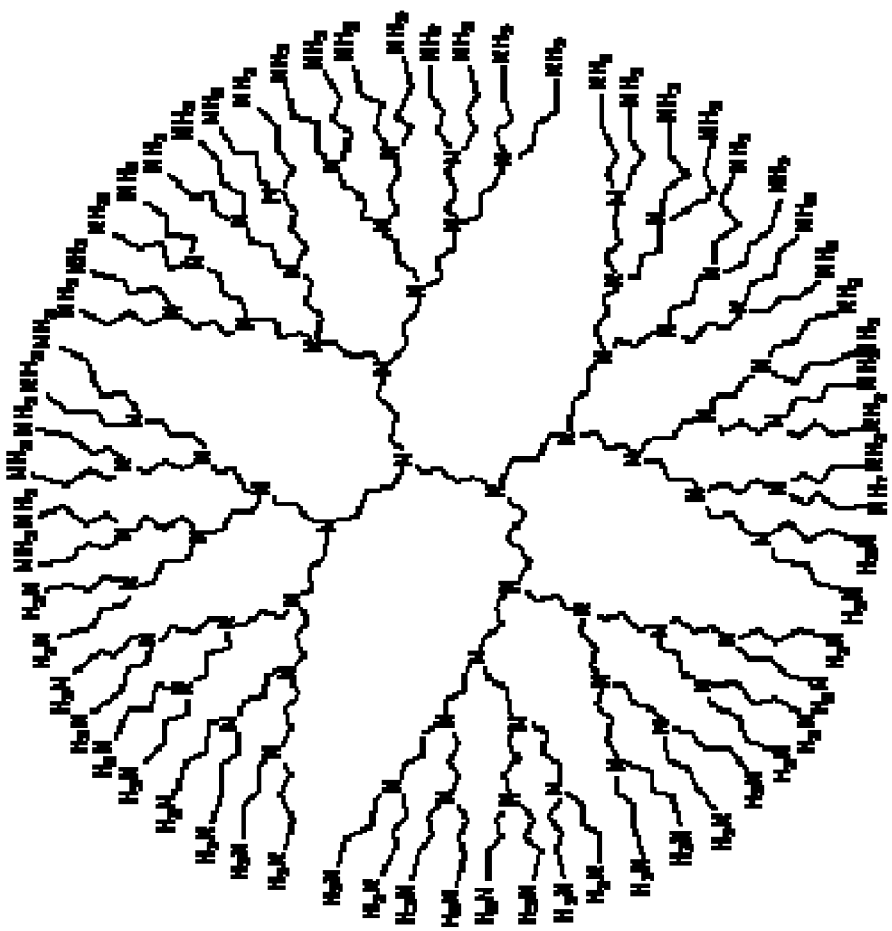
FIG. 18 shows an example of a 2-D structure of a G5-$NH_2$ poly(propyleneimine) (PPI) dendrimer.

The illustrative synthetic methods and procedures disclosed in this application can be applied to most branched macromolecules with internal/terminal secondary and primary groups. In the Examples, there are illustrated embodiments that utilize commercially available PPI dendrimers, as is illustrated in FIG. 18. The poly(2-ethyloxazoline) (PEOX) dendrigraft polymers developed by Tomalia and co-workers (see Kee, R. A., Guathier. M., & Tomalia, D. A. (2001), *Semi-controlled dendritic structure synthesis in Dendrimers and Other Dendritic Polymers*, Frechet, J. M. J. & Tomalia, D.

Figure 19:
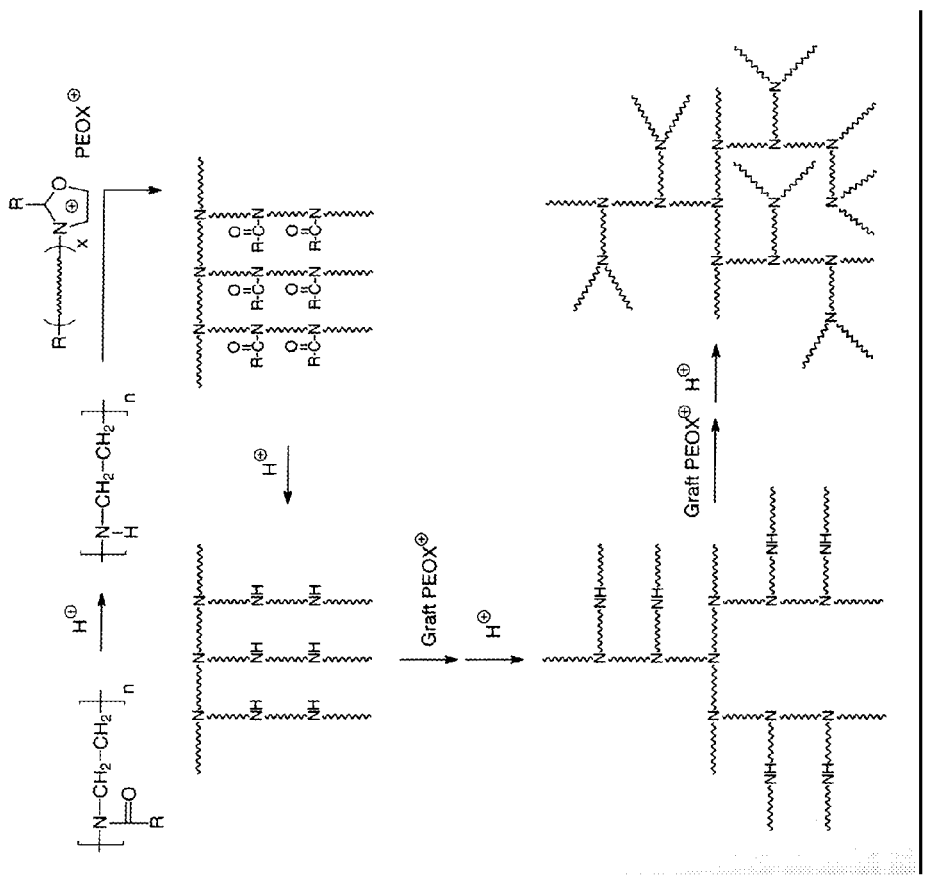
FIG. 19 shows the synthetic scheme for dendrigraft macromolecules through the grafting of poly(2-ethyl-2-oxazoline) [PEOX] onto linear poly(ethyleneimine) [PEI].

A. ed., John Wiley & Sons, Ltd., pp 209-236) may also provide an another starting base polymer with secondary amine groups (FIG. 19) that can be functionalized using the example synthetic procedures disclosed in this application. The high molecular weight and low polydispersity index (PI) PEOX dendrigraft polymers (e.g., for generation 2 (G2) PEOX; Mw=1000,000 and PI=1.47) make them very attractive as building blocks for anion-selective hyperbranched macromolecules.

Example II

Example embodiments are now presented as various functionalized dendritic macromolecules that may be used in the selective filtration or separation of anions. This example is illustrative of the disclosed embodiments, but does not limit them in any way:

For purposes of this example, purified chemicals for use in these inventions may be obtained by means known in the art, preferably through a supplier such as Aldrich and BASF, and preferably without further purification, unless the chemical is insufficiently pure under standards known in the art. Preferably, 3-Dimethylamino-2,2-dimethylpropionaldehyde and 3-Diethylamino-2,2-dimethylpropionaldehyde may be purchased from Frinton Laboratories, Inc and Pfaltz & Bauer, Inc., respectively. Compounds may be characterized using various chemical analysis instruments known in the art, preferably $^1$H NMR (400 MHz) and $^{13}$C NMR (75 MHz) on a Bruker AVQ 400. High-resolution mass spectra and elemental analysis (CHN) are also preferably performed. Polymer $^1$H NMR (500 MHz) and $^{13}$C NMR (75 MHz) is preferably obtained on a Bruker DRX500.

Polymer purification via dialysis may be achieved using methods known in the art, such as, preferably, Spectra/Por Dialysis membranes with a molecular weight cutoff of 3500 g/mol (product number 132592).

Polymer molecular weights may be measured using low and right angle light scattering on a Viscotek TDA 302. a.) Preferably, the mobile phase is doubly distilled water and the columns set are preferably: Polycationic C-MBMMW-3078 and C-MBHMW-3078 in series 7.8 mm 300 mm (Viscotek). b.) Mobile phase: 0.1 M Citric acid and 0.05% sodium azide solution. Calibration curve are preferably based on the series of the Pullulan standards (Polymer Standards Service-USA) in the molecular weight range from 342 to 710,000. In this example, columns are set: TSK gel G2500PW XL and GMPW XL 3078 in series 7.8 mm×300 mm (Tosohaas).

Infrared spectra are preferably collected on a Varian 3100 FT-IR using thin film polymer samples drop cast from chloroform on KBr disks.

Two samples of hyperbranched PEI with different molecular weights (WF Lupasol and PS Lupasol) may be obtained from BASF. The WF Lupasol may be obtained as a water free sample with a reported $M_w$=25 kDa (light scattering) and $M_w$=10 kDa. The PS Lupasol may be obtained as a 33 wt % solution in water with a reported $M_w$=750 kDa (light scattering) and $M_w$=60 kDa. Either example of hyperbranched PEI, or others examples known to one of skill in the art, may be used according the present disclosure.

Figure 21:
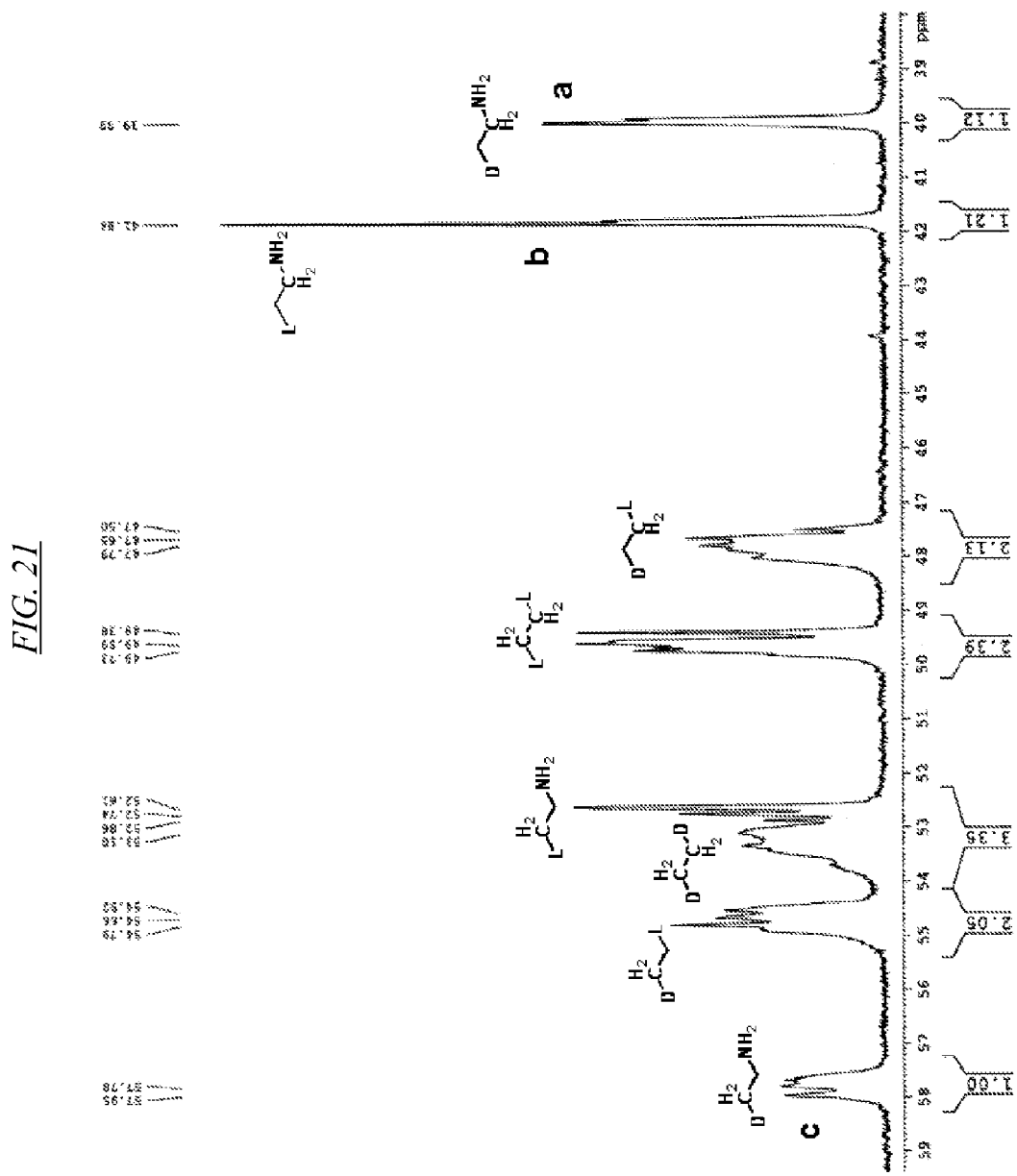
FIG. 21 shows a $^{13}C$ NMR spectrum of an example of WF-PEI in $CDCl_3$.
Figure 22:
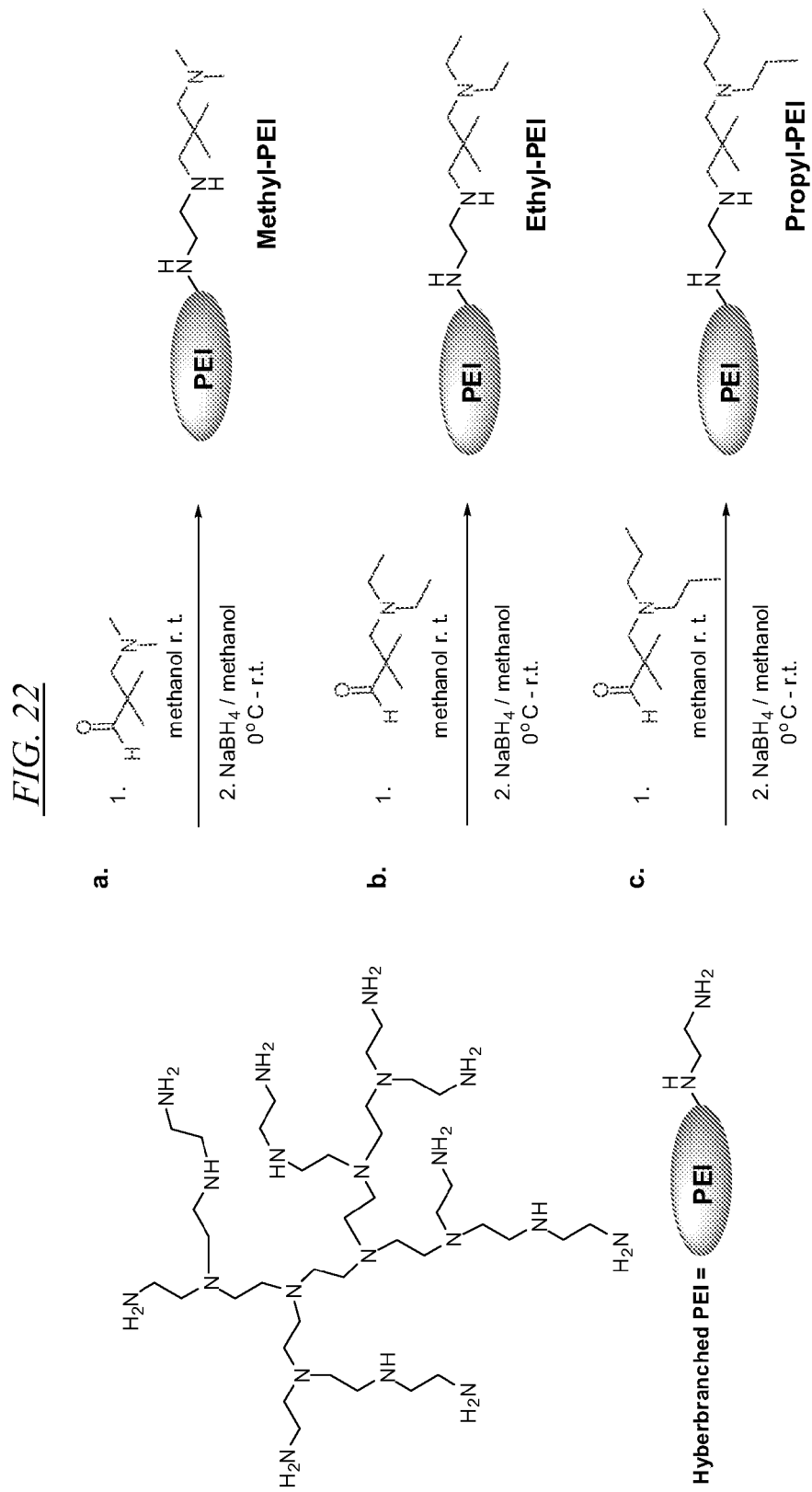
FIG. 22 shows an example of the synthesis of methyl, ethyl, and propyl functionalized hyperbranched PEI.
Figure 23:
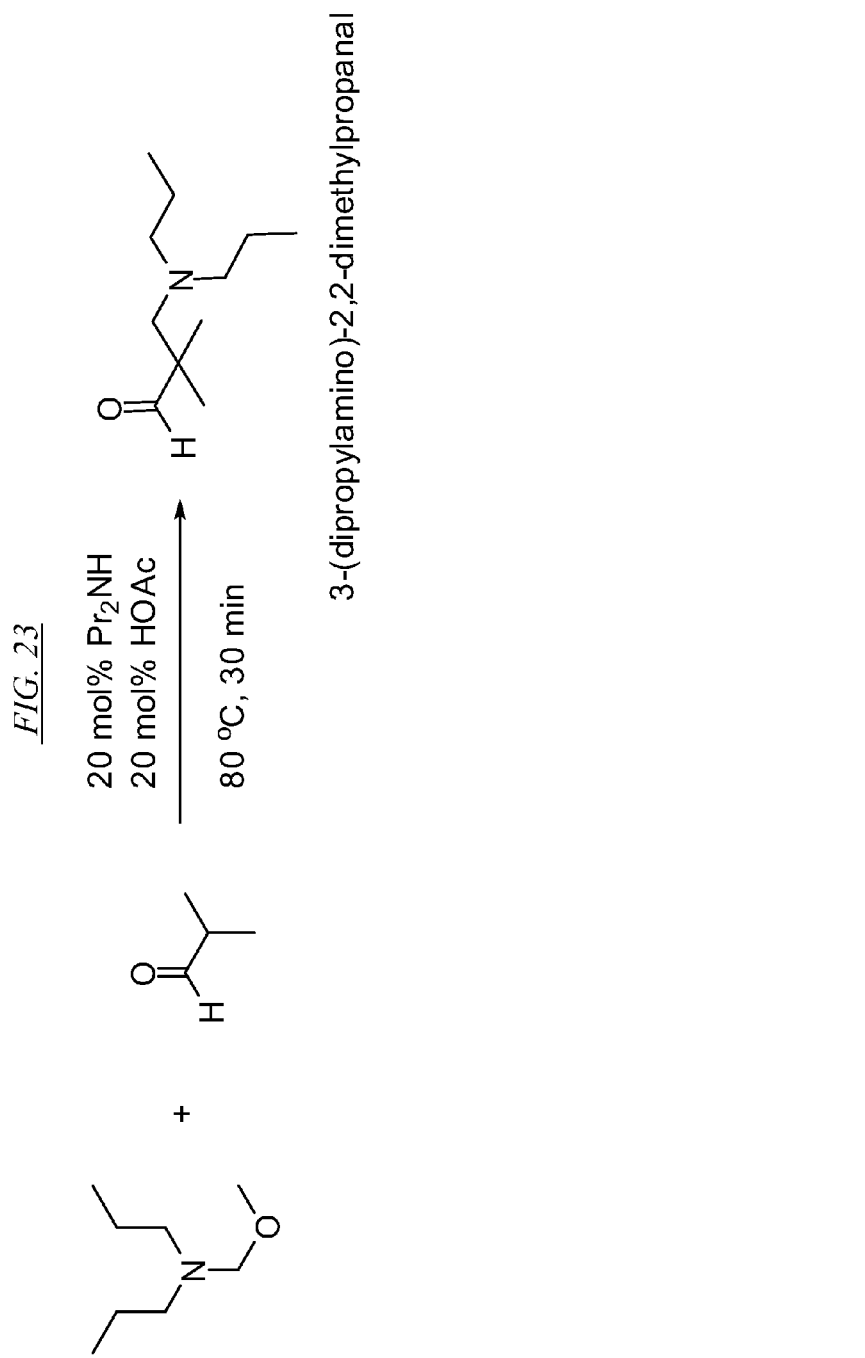
FIG. 23 shows an example of the synthesis of 3-(dipropylamino)-2,2-dimethylpropanal.

The degree of branching and the number of terminal units for the hyperbranched PEI sample (25 kDa) may be calculated based on the integration values of an $^{13}$C NMR spectrum, such as that shown in FIG. 21, preferably using the method of Kramer, M.; Stumbe, J.-F.; Turk, H.; Krause, S.; Komp, A.; Delineau, L.; Prokhorova, S.; Kautz, H.; Haag, R. Angew. Chem. Int. Ed. 2002, 41, 4252-4256. For an approximately 25,000 g/mol molecular weight sample, with a repeat unit molecular weight of 43 g/mol, one might calculate based on this preferred Kramer et al. method that there are 581 repeat units per polymer. One might integrate the peaks a, b, and c of the $^{13}$C NMR spectrum FIG. 21, and determine, using the formula a≈c, T=a+c+2*b, T≈D, that the degree of branching is about 69% and the number of terminal units (T or primary amines) per polymer is 229, the number of linear units (L or secondary amines) is 183, and the number of dendritic units (D or tertiary amines) is 169. The degree of branching (DB) may be calculated according to the following formula:

$$DB = \frac{2 \cdot T}{\sum \text{Integrals}}.$$

The hyperbranched PEI samples may be further characterized by elemental analysis. For the PS-PEI (PS Lupasol), water may be removed in a lyophilizer prior to characterization. For WF-PEI: C, 58.03; H, 12.71; N, 29.78. For PS-PEI: C, 50.17; H, 11.96; N, 28.61.

The chemical 3-(dipropylamino)-2,2-dimethylpropanal may be prepared as follows, without limitation: N-(methoxymethyl)-N-propylpropan-1-amine (48 g, 0.33 mol) may be prepared, preferably according to the procedure of J. Am. Chem. Soc.; (Article); 2007; 129(18); 6050-6055. Isobutyraldehyde (30.4 mL, 0.33 mol) may be mixed with dipropylamine (9.1 mL) and acetic acid (3.8 mL) and heated at 80° C. for 30 minutes. $^1$H NMR of the crude reaction mixture should preferably indicate complete consumption of aldehyde starting materials. The reaction mixture may then be subjected to vacuum distillation to give the desired product in quantitative yield. Analysis by $^1$H NMR (CDCl$_3$ 300 MHz) should preferably yield the following results: δ 9.54 (s, 1H), 2.53 (s, 2H), 2.31 (t, 4H), 1.38 (q, 4H), 1.03 (s, 6H), 0.82 (t, 6H). $^{13}$C NMR (CDCl$_3$ 75 MHz) δ 207.40, 63.25, 57.81, 48.10, 20.76, 20.54, 11.94. High resolution mass spectroscopy (HRMS), calculated for $C_{11}H_{23}NO$ 185.1780; found 185.1776.

Figure 24:
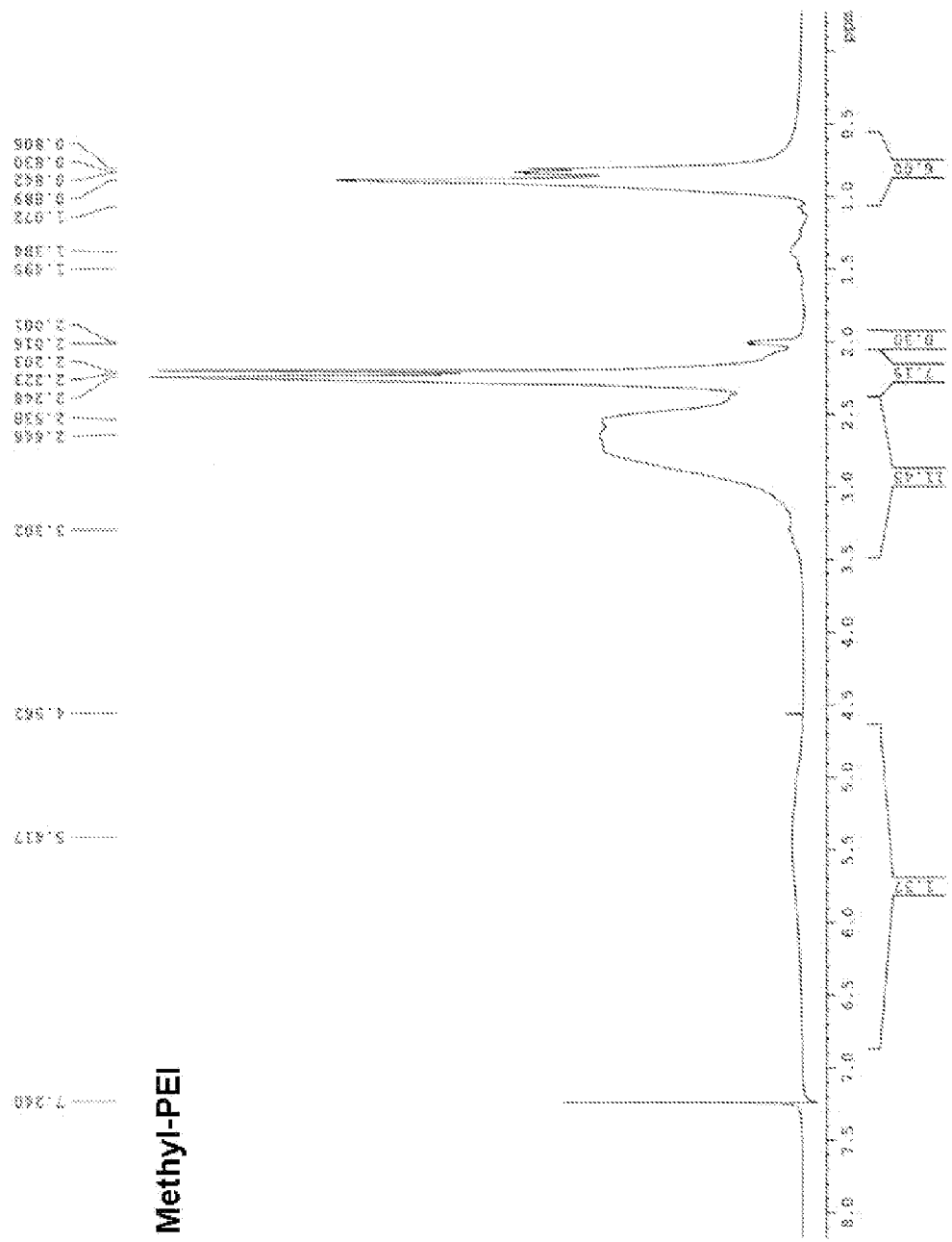
FIG. 24 shows a $^1H$ NMR spectrum of an example of methyl-PEI in $CDCl_3$.
Figure 25:
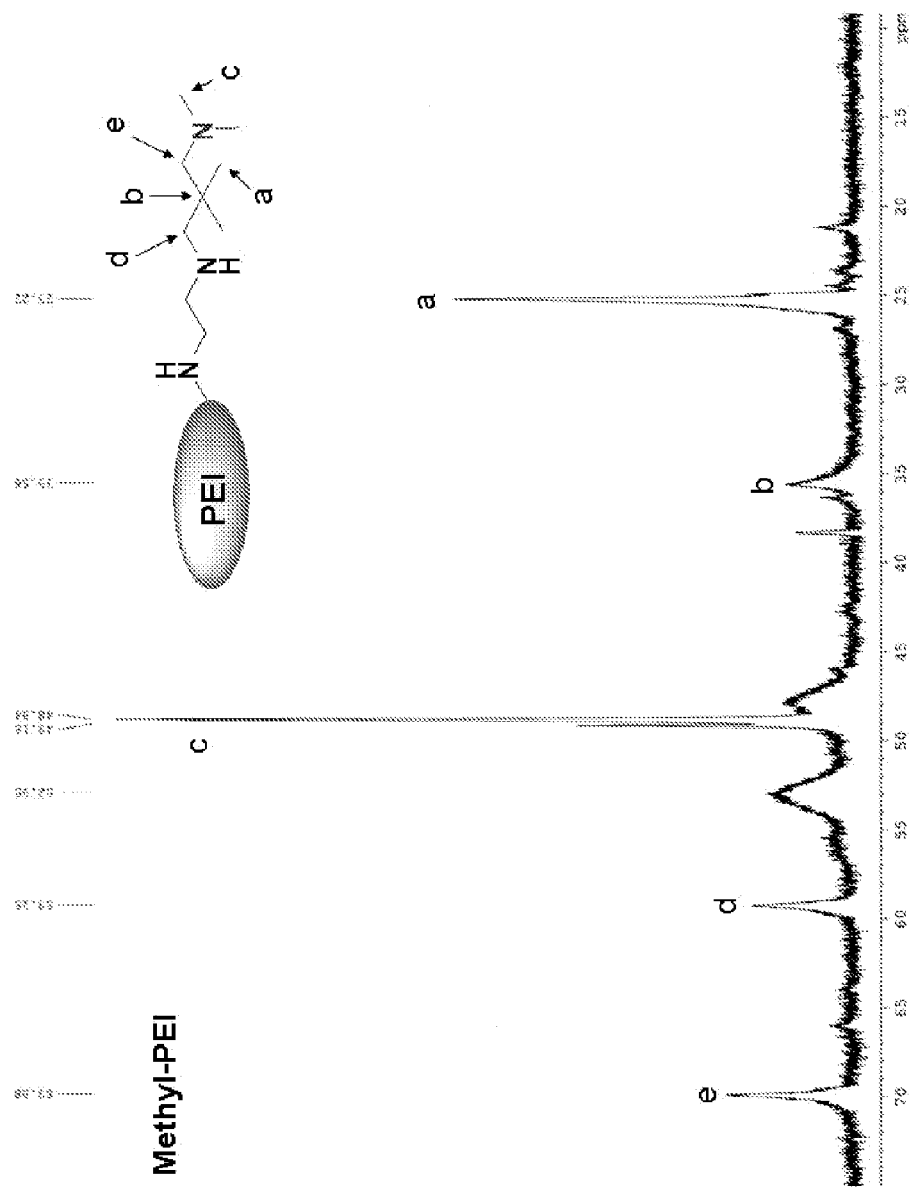
FIG. 25 shows a $^{13}C$ NMR spectrum of an example of methyl-PEI in $CDCl_3$.

In another example, methyl-PEI may be prepared. 3-Dimethylamino-2,2-dimethylpropionaldehyde (2.35 g, 18.2 mmol, 1.5 eq) may be added dropwise in 15 ml of methanol to 1.5 g of hyperbranched WF-PEI (12.2 mmol of primary amine) in 15 ml of methanol and the reaction bay then be stirred at room temperature for two hours. Then, the reaction may be cooled to 0° C. and 1.84 g (48.6 mmol, 4 eq) of sodium borohydride may be added portionwise over 10 minutes. The reaction may then be stirred overnight and allowed to warm to room temperature. The reaction may then be quenched via addition of a saturated aqueous solution of ammonium chloride. Dialysis with 1:10 methanol:water for two hours, may be followed by dialysis with water for two days. Removal of water by freeze-drying should preferably yield the product as a yellow, tacky solid (about 1.70 g). The $^1$H NMR spectrum should preferably be as shown in FIG. 24, and the $^{13}$C NMR should preferably be as shown in FIG. 25. An analysis should preferably show the following composition: C, 51.23; H, 11.72; N, 17.42.

Figure 26:
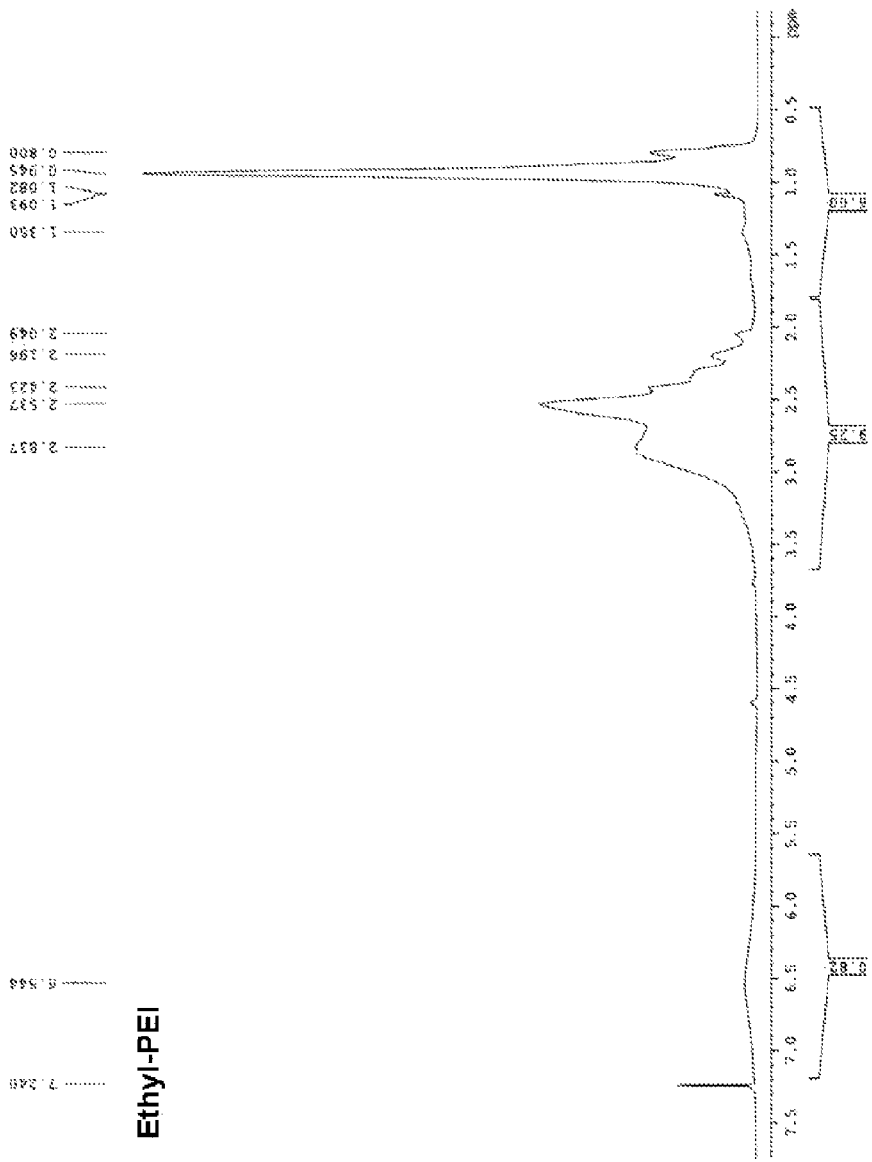
FIG. 26 shows a $^1H$ NMR spectrum of an example of ethyl-PEI in $CDCl_3$.
Figure 27:
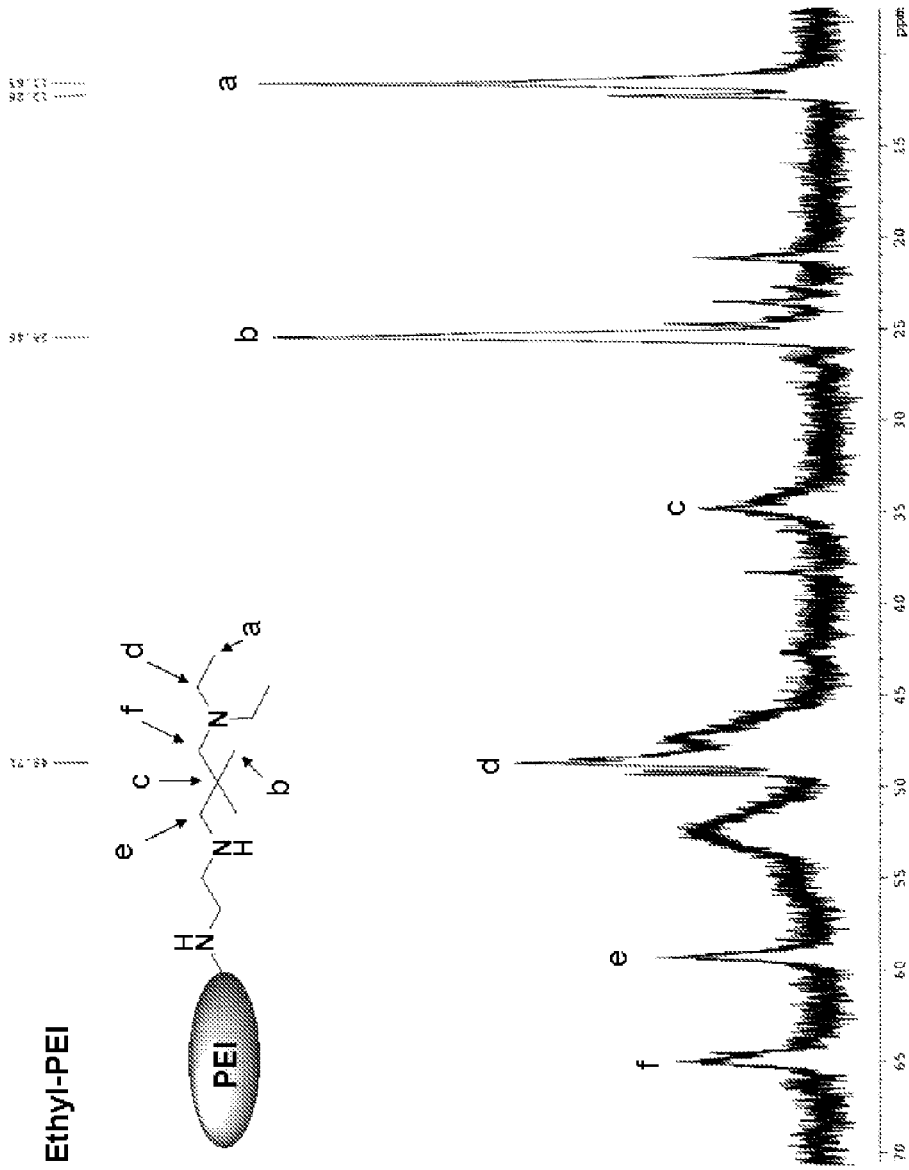
FIG. 27 shows a $^{13}C$ NMR spectrum of an example of ethyl-PEI in $CDCl_3$.
Figure 28:
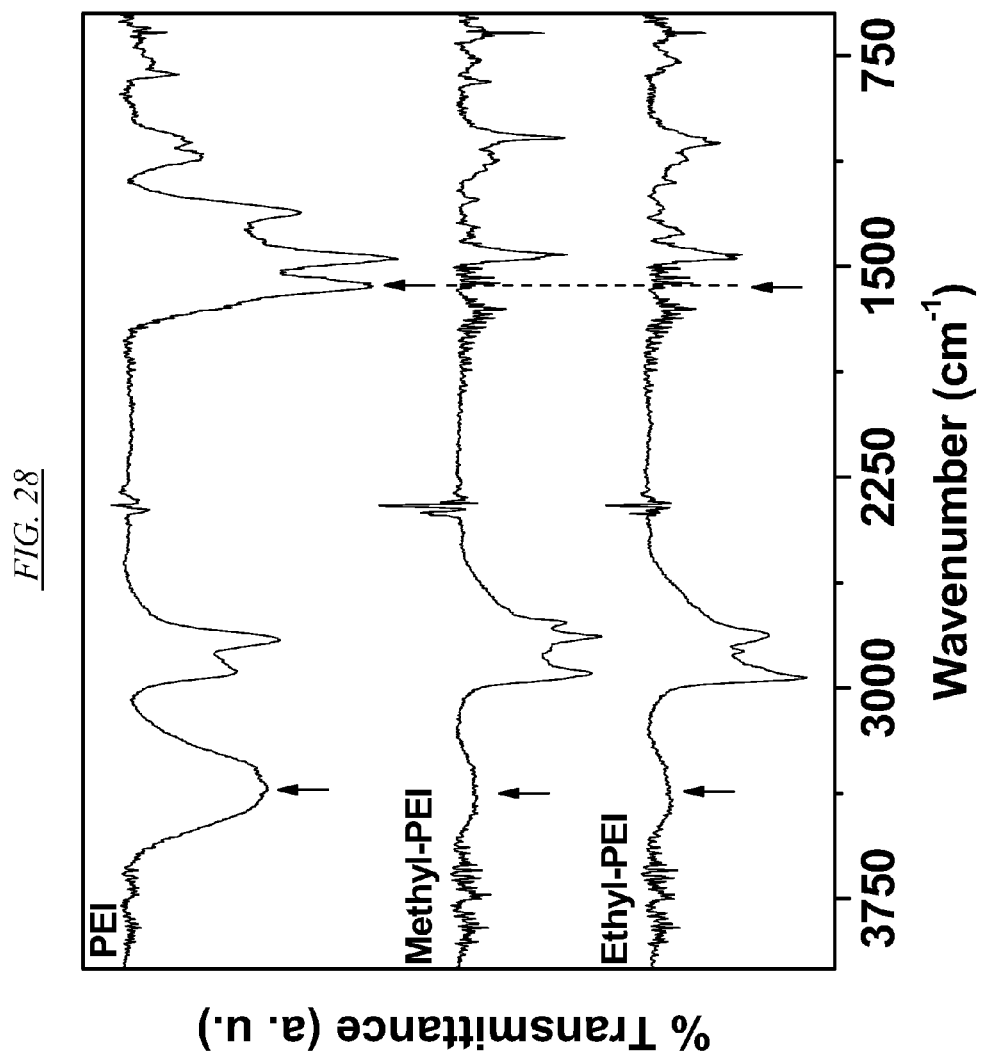
FIG. 28 shows spectra of examples of WF-PEI, methyl-PEI, and ethyl-PEI.

In another embodiment, ethyl-PEI may be created, preferably using the same procedure as above with respect to 3-Diethylamino-2,2-dimethylpropionaldehyde (2.87 g, 18.2 mmol, 1.5 eq) and 1.5 g of hyperbranched PEI to yield 1.3 g of the product as a tacky, yellow solid. The $^1$H NMR spectrum should preferably be as shown in FIG. 26, and the $^{13}$C NMR should preferably be as shown in FIG. 27. An analysis should preferably show the following composition: C, 52.66; H, 12.52; N, 16.52.

In another embodiment, propyl-PEI may be created, preferably using the same procedure as above described with respect to 3-Dipropylamino-2,2-dimethylpropionaldehyde (15.00 g, 80.9 mmol, 1.5 eq) and 6.7 g of hyperbranched PEI to yield 6.5 g of the product as a tacky, yellow solid. Upon acidification with HCl, the compound may be shown to be soluble in water. The $^1$H NMR spectrum (500 MHz CDCl$_3$), should preferably present the following results: δ 5.1-4.3 (br), 3.7-3.5 (br), 2.8-2.1 (br m), 1.5-1.2 (br), 0.9-0.8 (br). The $^{13}$C NMR (75 MHz CDCl$_3$) spectrum should preferably present the following results: δ 71-67, 65-61, 56-51, 38-37, 20-18, 15-14. The composition should preferably be as follows: C, 47.18; H, 10.78; N, 14.75.

Figure 20:
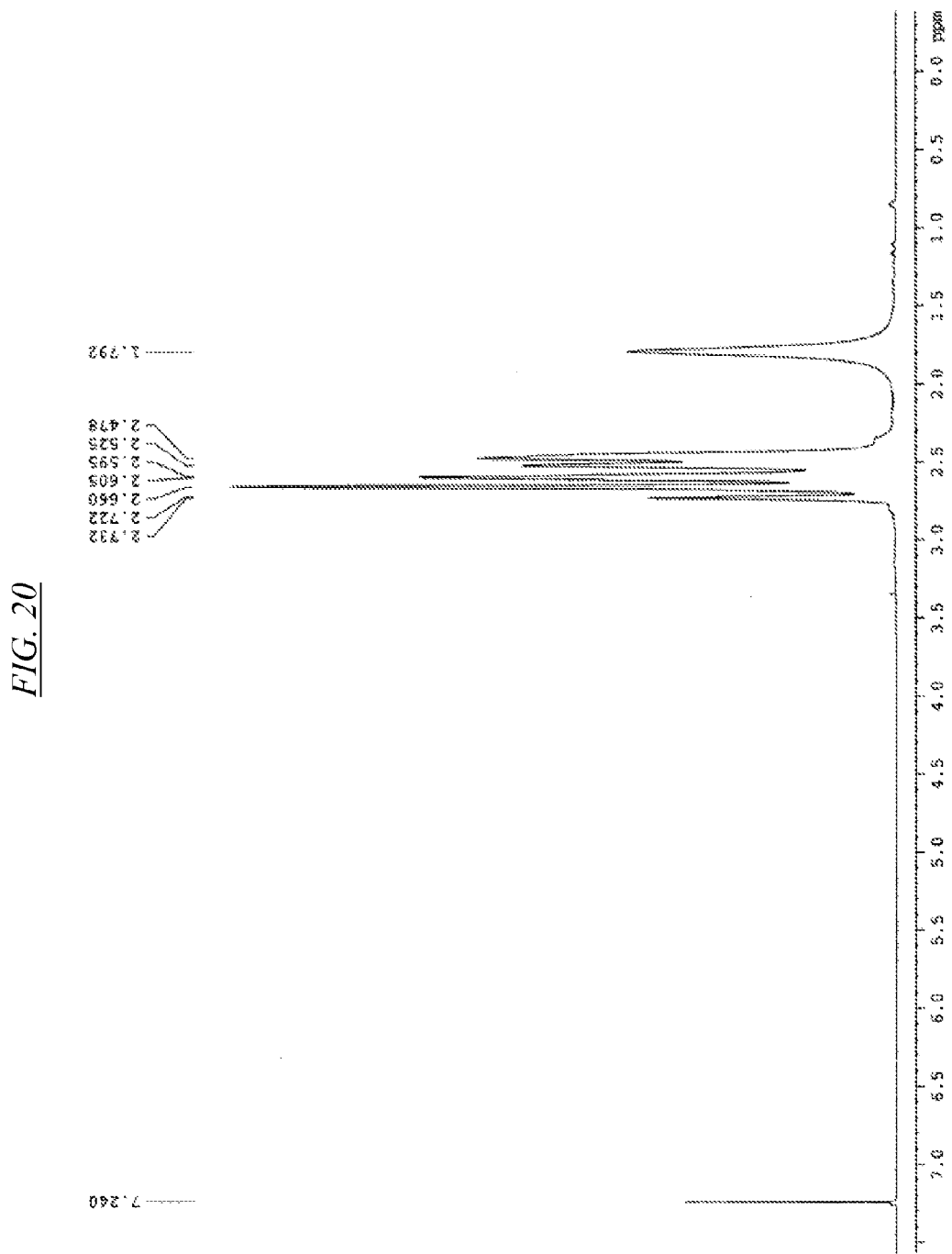
FIG. 20 shows a $^1H$ NMR spectrum of an example of WF-PEI in $CDCl_3$.

Comparison of the $^1$H NMR spectra before and after functionalization may reveal specific changes in chemical makeup, which correspond to the example reaction products. In the example of $^1$H NMR of WF-PEI shown in FIG. 20, only two regions with chemical shifts are observed: a multiplet at 2.7-2.4 ppm, corresponding to the CH resonances, and a broad peak at 1.79 ppm, corresponding to the primary amine NH. After reaction to make Methyl-PEI, as exemplified in FIG. 24, the peak at 1.79 may be observed to disappear and new peaks may be observed at 0.84 ppm (gem dimethyl group), a strong peak at 2.2 ppm (N—CH$_3$), and a broad peak at 6.4 ppm, corresponding to a secondary amine may also be observed. For ethyl-PPI, as exemplified in FIG. 26, the peak at 1.79 ppm may also be observed to disappear, and a new peak at 0.94 ppm may be observed to appear, corresponding to the overlapping signals of the gem-dimethyl group and the terminal methyl groups of the diethylamine. A peak at 6.5 ppm may be interpreted as corresponding to the secondary amine, as is the case for methyl-PEI.

Evaluation of the $^{13}$C NMR spectra also may be interpreted as an indication of the formation of the example products. FIG. 21 shows an example of characteristic carbon shifts for the labeled chemical motifs for WF-PEI. Comparison with FIG. 25 may be interpreted as indicating a number of specific changes that are representative of the proposed reductive amination to yield methyl-PEI. First, the disappearance of the peaks at 39.9, 41.7, and 57.8 ppm, might be interpreted as showing that the primary amines have reacted. New peaks may be observed at 25.0 ppm (carbons a in Figure A4), 35.3 ppm (carbon b), 48.9 ppm (carbons c), 59.0 ppm (carbon d), and 69.7 ppm (carbon e); all of which may be interpreted as indicating the incorporation of the functionality introduced through reductive amination. Similar conclusions can be reached by examination of spectra for ethyl-PEI, as exemplified in FIG. 27. In this case, the peaks at 39.9, 41.7, and 57.8 ppm may also be observed to disappear and new peaks at 11.6 ppm (carbons a), 25.3 ppm (carbons b), 34.5 ppm (carbon c), 48.5 ppm (carbons d), 59.0 ppm (carbon e), and 65.0 ppm (carbon f), may be observed, which might be interpreted as being consistent with the example structure.

Characterization of the samples by IR spectroscopy should preferably reveal two characteristic N—H stretching and bending vibrations that are observed to change before and after reaction of the parent WF-PEI sample. The broad peak at 3500-3200 cm$^{-1}$ in the samples can be interpreted as corresponding to the N—H stretching vibrations of amines. The N—H stretching vibration can be interpreted as becoming less intense relative to the C—H stretching vibrations (2940 and 2830 cm$^{-1}$) after reaction of the parent PEI. Secondly, the sharp peak at 1567 cm$^{-1}$ may be interpreted as corresponding to N—H bending vibrations characteristic of primary amines in PEI and the disappearance of this peak may be observed after reaction. These two changes may be interpreted as indicating that the primary amine content of the samples are significantly reduced after the reductive amination procedure, and may be interpreted as indicating the formation of the example products.

Using light scattering, measuring relative to Pullulan standards, or other means known in the art, increases in the molecular weight upon reductive amination for both methyl-PEI and ethyl-PEI may be interpreted as indicating the formation of the example product structures.

TABLE 12

Example SEC data for PEI, Methyl-PEI, and Ethyl-PEI.

| Sample | $M_w$ (LS)$^a$ | $M_p$ (LS)$^a$ | dn/dc$^a$ | $M_w$ (RI)$^b$ | $M_n$ (RI)$^b$ | PDI (RI)$^b$ | MW (theory)$^c$ |
|---|---|---|---|---|---|---|---|
| WF-PEI | 25,700 | 22,300 | 0.234 | 32,200 | 9,200 | 3.5 | 25,000 |
| Methyl-PEI | 69,200 | 51,000 | 0.181 | 53,400 | 14,100 | 3.8 | 48,000 |
| Ethyl-PEI | 75,300 | 54,000 | 0.188 | 52,400 | 10,700 | 4.9 | 54,000 |

Data relating to the example WF-PEI, methyl-PEI, and ethyl-PEI products are shown in Table 12. This table shows molecular weights, which may be measured using low and right angle light scattering on a Viscotek TDA 302. For $M_W$ (LS), $M_p$ (LS), and dn/dc in these examples, the mobile phase is doubly distilled water and the columns set are: Polycationic C-MBMMW-3078 and C-MBHMW-3078 in series 7.8 mm 300 mm (Viscotek). For $M_w$ (RI), $M_n$ (RI), and PDI (RI), the mobile phase is 0.1 M citric acid and 0.05% sodium azide solution; the calibration curve is based on the series of the Pullulan standards in the molecular weight range from 342 to 710,000; and columns set is: TSK gel G2500PW XL and GMPW XL 3078 in series 7.8 mm×300 mm (Tosohaas). The MW (theory) in these examples is based on the assumption that all (and only) primary amines react.

Figure 29:
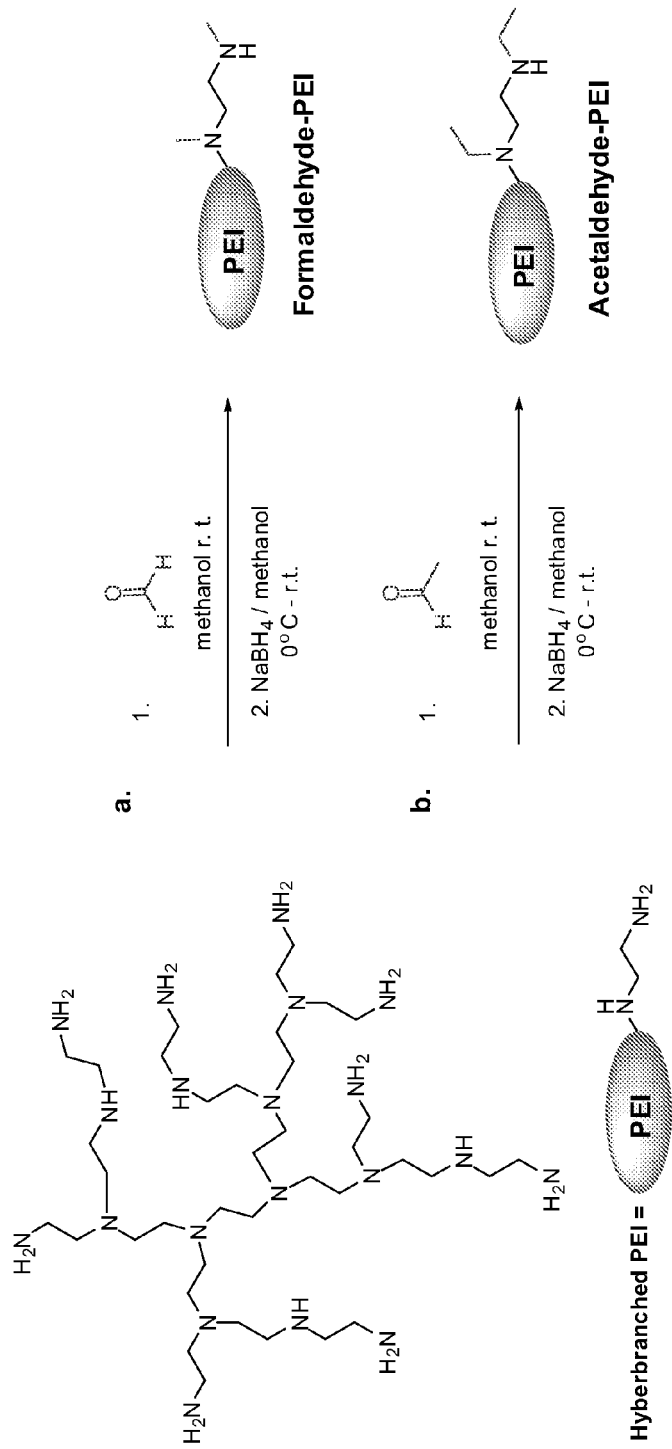
FIG. 29 shows an example of functionalization of hyperbranched PEI via reductive amination with formaldehyde and acetaldehyde.
Figure 30:
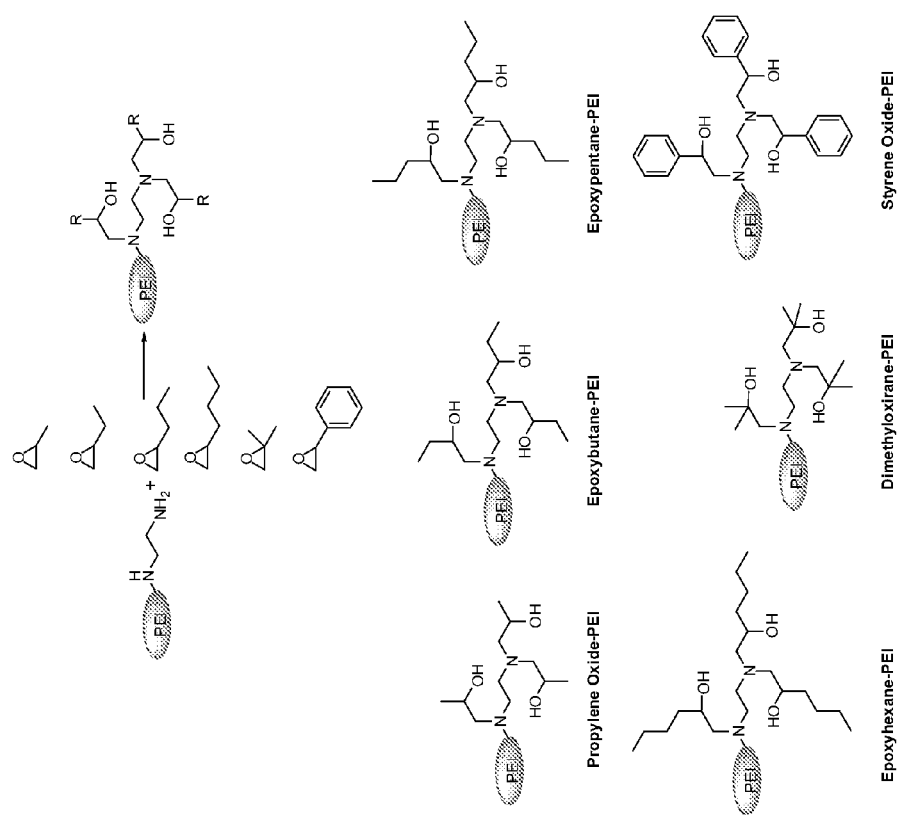
FIG. 30 shows an example of synthesis of functionalized hyperbranched PEI's via reaction with epoxides.

In a further example, formaldehyde-PEI may be created, as shown in FIG. 29. Paraformaldehyde (1.42 g, 47.3 mmol, 3 eq) and 1.0 g of hyperbranched WF-PEI (15.8 mmol of primary and secondary amines) may be stirred in 25 ml of methanol at room temperature for three hours. Then, the reaction may be cooled to 0° C. and 3.60 g (94.6 mmol, 6 eq) of sodium borohydride may be added portion-wise over 10 minutes. The reaction may then be stirred overnight and allowed to warm to room temperature. The reaction may then be quenched via addition of a saturated aqueous solution of ammonium chloride. Dialysis with 1:10 methanol:water for two hours may be followed by dialysis with water for two days. Removal of water by freeze-drying may yield the product as a yellow, tacky solid (0.50 g). $^1$H NMR (500 MHz CDCl$_3$) may indicate the following results: δ 7.2-6.7 (br), 3.2-2.1 (br), 1.7-1.2 (br). $^{13}$C NMR (75 MHz CDCl$_3$) may indicate the following results: δ 62.5-61, 58-55, 55-51, 47-45, 43.5-41.5. IR (cm$^{-1}$) 3427 (N—H stretch), 1470 (CH$_2$ bend). The composition may be determined to be as follows: C, 52.68; H, 12.33; N, 21.37.

In a further example, acetaldehyde-PEI may be created, as shown in FIG. 29. The same procedure as above may be followed with acetaldehyde (20.83 g, 473 mmol, 3 eq) and 10 g of hyperbranched PEI (157.6 mmol of primary and secondary amines), preferably to yield 8.2 g of the product as a tacky, yellow solid. The composition may be determined to be as follows: C, 53.94; H, 11.41; N, 13.62.

Figure 14:
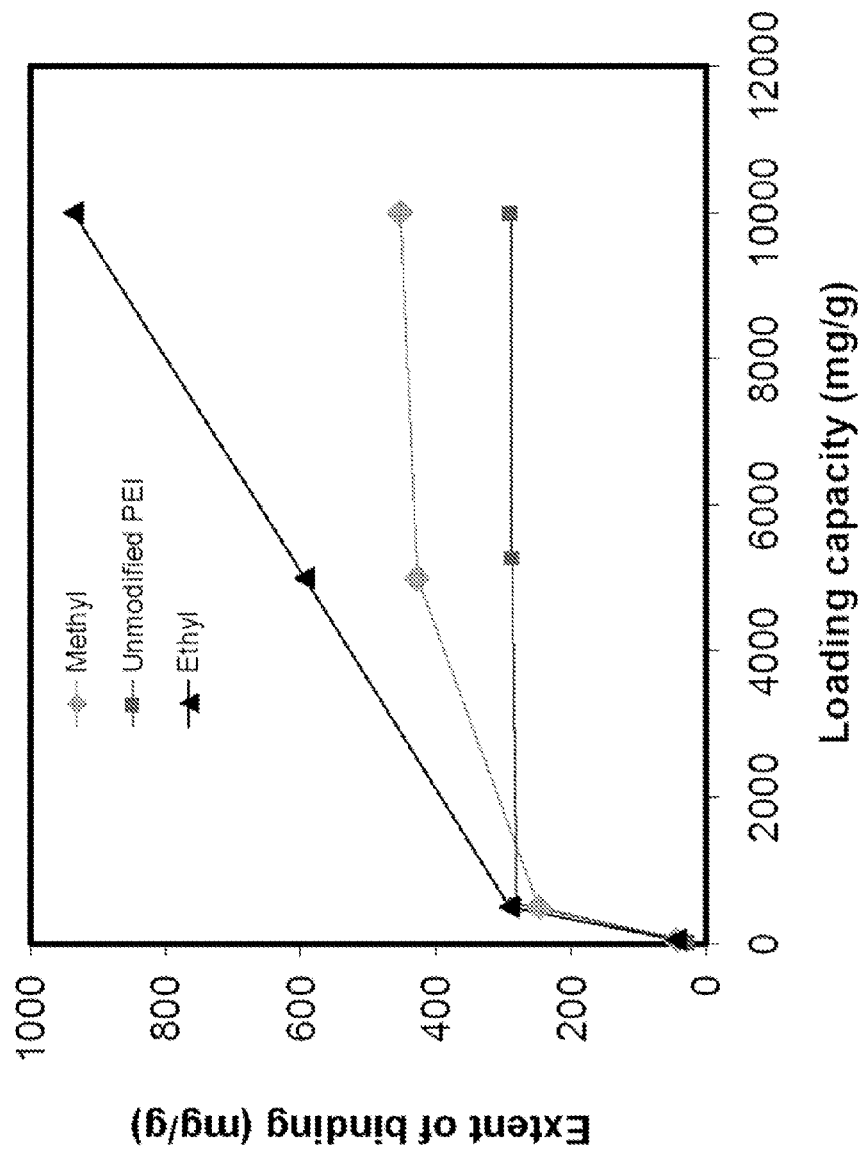
FIG. 14 shows a comparison of the extent of binding of nitrate at pH 4.0 of three hyperbranched molecules.
Figure 15:
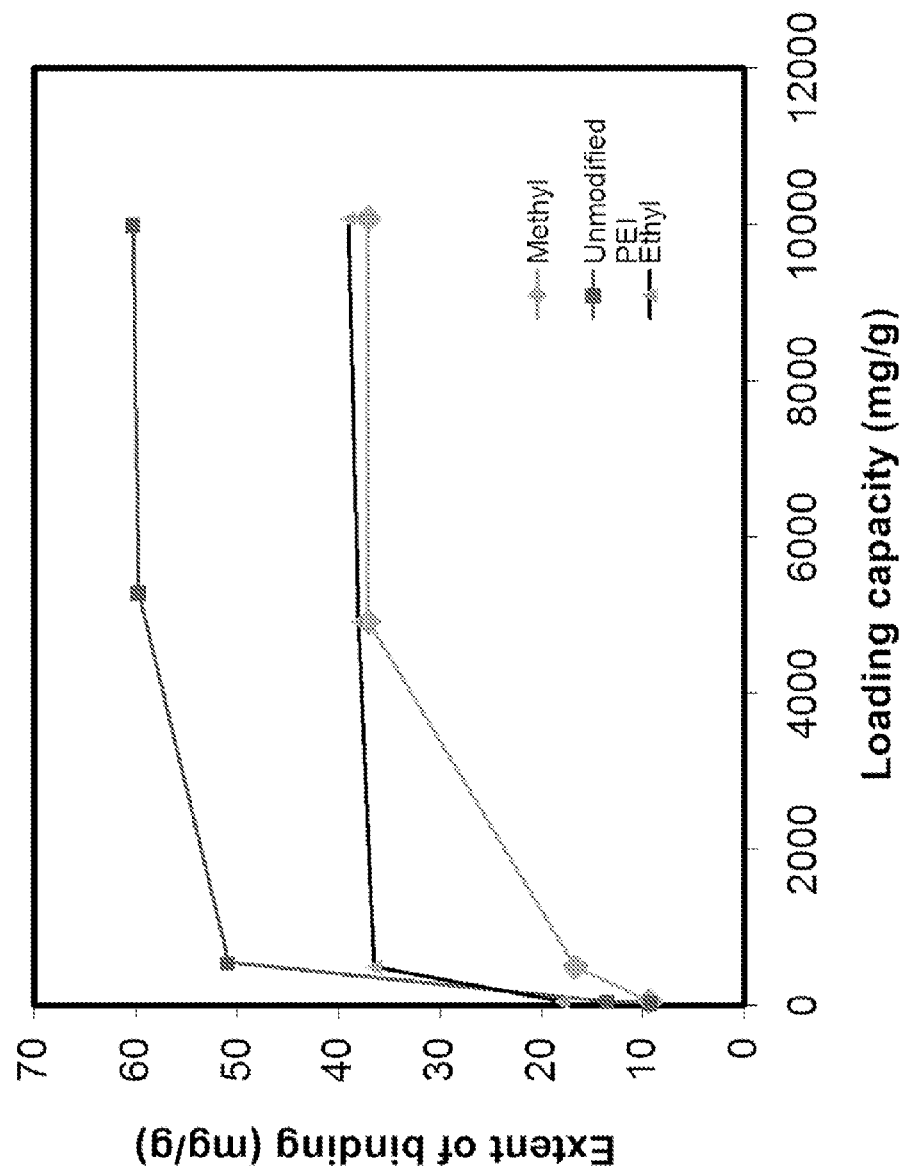
FIG. 15 shows a comparison of the extent of binding of nitrate at pH 8.0 of three hyperbranched molecules.

The comparative binding properties of formaldehyde-PEI versus acetaldehyde-PEI and unsubstituted PEI are illustrated in FIG. 14 (at pH 4) and FIG. 15 (at pH 8).

Figure 31:
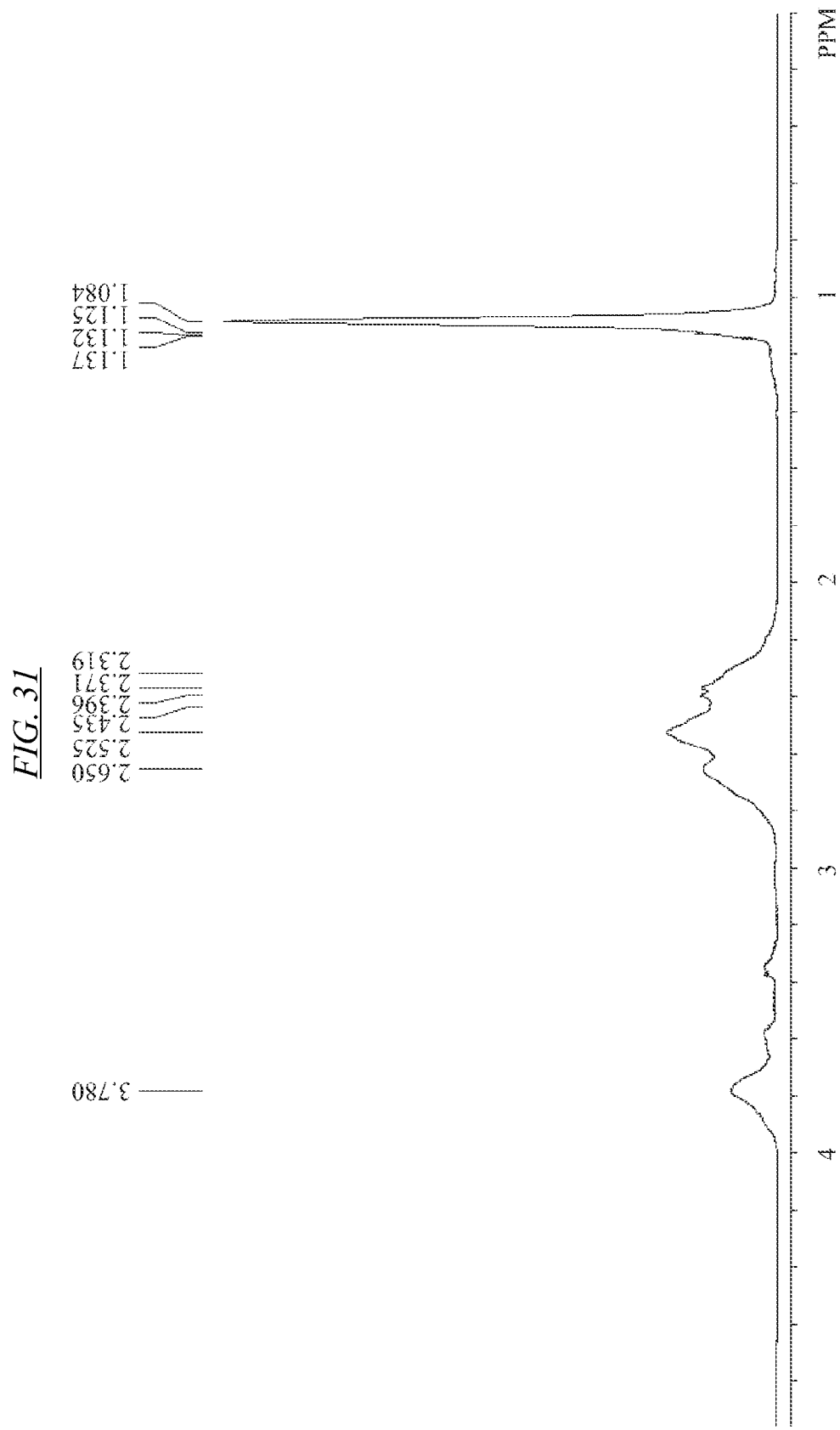
FIG. 31 shows a $^1H$ NMR spectrum of an example of propylene oxide-WF-PEI in $CDCl_3$.
Figure 32:
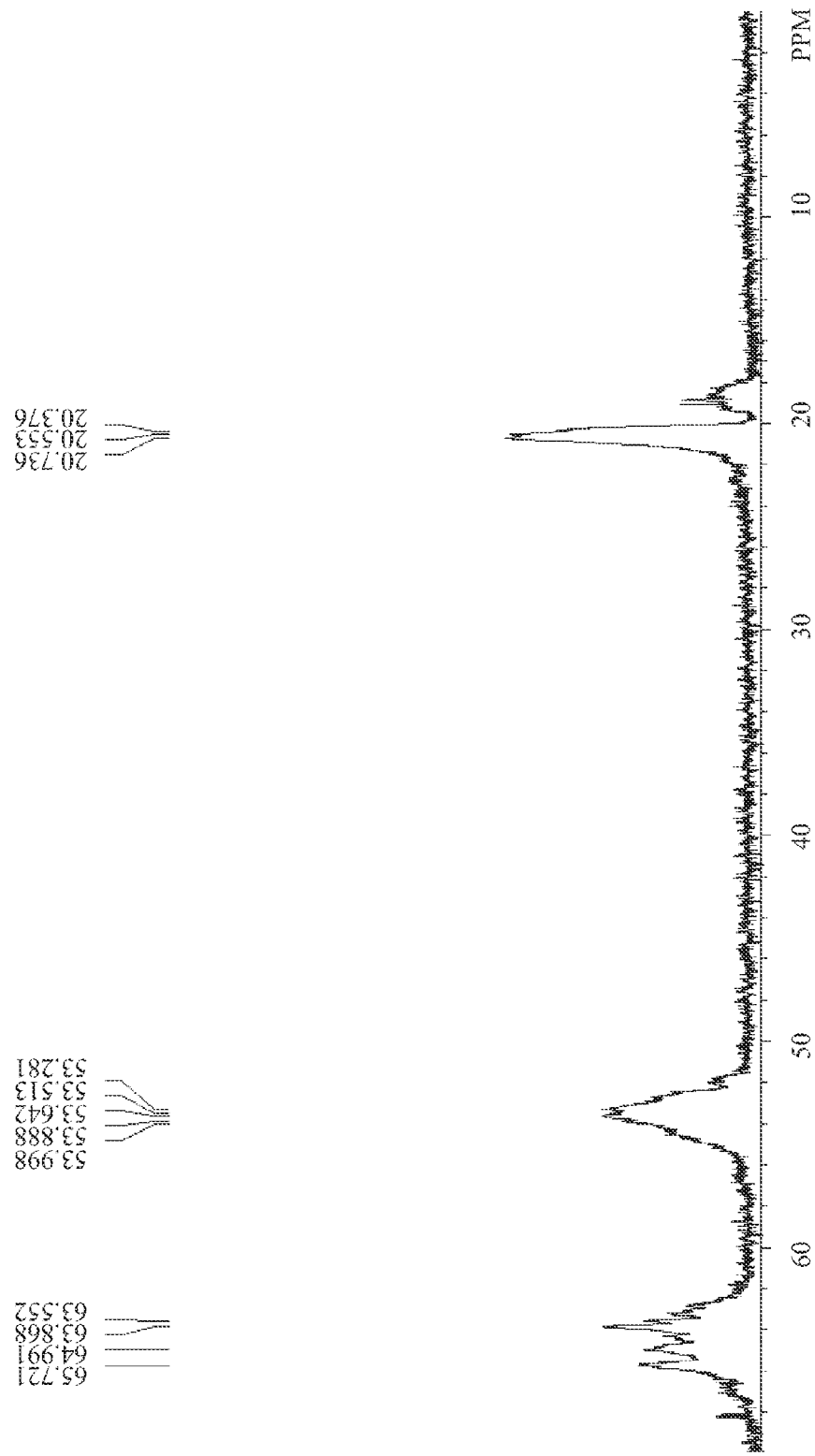
FIG. 32 shows a $^{13}C$ NMR spectrum of an example of propylene oxide-WF-PEI in $CDCl_3$.

In a further example, propylene oxide-WF-PEI may be created. In a sealed pressure tube, 6.6 g of WF-PEI (0.15 mol of amines), and 30 ml of propylene oxide (25 g, 0.89 mol) may be heated at 80° C. in the presence of 5 ml of methanol for three days. The reaction may then be cooled and excess propylene oxide and methanol may be removed under vacuum, to yield the water soluble product in quantitative yield. A resulting spectrum of $^1$H NMR may be, for example, as shown in FIG. 31, and the resulting $^{13}$C NMR spectrum as shown in FIG. 32. The composition may be determined to be as follows: C, 57.79; H, 11.73; N, 12.02.

In a further embodiment, propylene oxide-PS-PEI may be created. In a sealed pressure tube, 24 g of PS-PEI solution (8 g of polymer, 186 mmol of amines), and 50 ml of propylene oxide (41.5 g, 715 mmol, 3.8 eq) may be heated at 80° C. for three days. The reaction may then be cooled and excess propylene oxide and water may be removed under vacuum, to yield the water soluble product in quantitative yield. A resulting spectrum of $^1$H NMR (500 MHz CDCl$_3$) may show the following results: δ 4.0-3.8 (br), 2.8-2.2 (br m), 1.2-1.0 (br). $^{13}$C NMR (75 MHz CDCl$_3$) may show the following results: δ 65-63, 55-52, 22-20, 19-18. IR may show the following peaks: (cm$^{-1}$) 3440 (O—H bend), 2969 (CH$_3$⁻ asymmetric stretch), 2931 and 2873 (CH$_2$ stretch), 1457 (C—H bend), 1375 (CH$_3$ bend), 1092 (C-0 stretch, alcohol). The composition may be determined to be as follows: C, 56.45; H, 10.78; N, 5.28.

In a further embodiment, epoxybutane-WF-PEI may be created. In a sealed pressure tube, 5 g of WF-PEI (123 mmol of amines), and 53 ml of epoxybutane (44.2 g, 615 mmol, 5 eq) may be heated at 80° C. in the presence of 5 ml of methanol for three days. The reaction may then be cooled and excess epoxybutane and methanol may be removed under vacuum, to yield the product in quantitative yield. Acidification with HCl may yield the water soluble product. $^1$H NMR (500 MHz CDCl$_3$) may show the following results: δ 4.68 (br), 3.52 (br), 2.9-2.1 (br m), 1.36 (br), 1.0-0.8 (br). $^{13}$C NMR (75 MHz CDCl$_3$) may show the following results: δ 72-69, 65-60, 56-51, 28-27, 11-9. IR may show the following results: (cm$^{-1}$) 3440 (O—H bend), 2961 (CH$_3$⁻ asymmetric stretch), 2935, 2875, and 2818 (CH$_2$ stretch), 1460 (C—H bend), 1361 (CH$_3$ bend), 1065 (C-0 stretch, alcohol). The composition may be determined to be as follows: C, 62.20; H, 12.39; N, 11.09.

In a further embodiment, epoxybutane-PS-PEI may be created. In a sealed pressure tube, 30 g of PS-PEI solution (10 g of polymer, 233 mmol of amines), and 60 ml of epoxybutane (50.2 g, 696 mmol, 3 eq) may be heated at 80° C. for one day, at which time a precipitate may be observed to form. The reaction may then be cooled and precipitated into water and the solid may be isolated via decantation. The solid may then be mixed with 40 ml of epoxybutane and 10 ml methanol and the resulting homogenous solution may be heated in a sealed pressure tube for three days at 80° C. The reaction may then be cooled and excess epoxybutane and methanol removed under vacuum, preferably to yield the product in quantitative yield. Acidification with HCl may yield the water soluble product. $^1$H NMR (500 MHz CDCl$_3$) may show the following results: δ 5.0-4.4 (br), 4.0-3.8 (br), 2.8-2.1 (br m), 1.4-1.2 (br m), 0.9-0.7 (br). $^{13}$C NMR (75 MHz CDCl$_3$) may show the following results: δ 72-69, 63-60, 55-51, 28-27, 11-9. IR may show the following peaks: (cm$^{-1}$) 3475 (O—H bend), 2961 (CH$_3$ asymmetric stretch), 2935, 2875, and 2821 (CH$_2$ stretch), 1460 (C—H bend), 1353 (CH$_3$ bend), 1084 (C—O stretch, alcohol). The composition may be determined to be as follows: C, 59.21; H, 11.70; N, 5.27.

In a further example, epoxypentane-WF-PEI may be created. In a sealed pressure tube, 1.5 g of WF-PEI (38 mmol of amines), and 6 ml of epoxypentane (4.98 g, 60 mmol, 1.6 eq) may be heated at 80° C. in the presence of 5 ml of methanol for four days. The reaction may then be cooled and excess propylene oxide and methanol may be removed under vacuum, to yield the product in quantitative yield. Acidification with HCl may yield the water soluble product. $^1$H NMR (500 MHz CDCl$_3$) δ 5.1-4.3 (br), 3.7-3.5 (br), 2.9-2.1 (br m), 1.5-1.2 (br), 0.9-0.8 (br). $^{13}$C NMR (75 MHz CDCl$_3$) δ 70-66, 64-61, 55-52, 38-36, 20-19, 15-14. IR (cm$^{-1}$) 3421 (O—H bend), 2960 (CH$_3$ asymmetric stretch), 2931, 2861, and 2820 (CH$_2$ stretch), 1457 (C—H bend), 1363 (CH$_3$ bend), 1079 (C—O stretch, alcohol). Anal. Found: C, 63.57; H, 12.75; N, 9.89.

In a further example, epoxyhexane-WF-PEI may be created. In a round bottom flask, 10 g of WF-PEI (245 mmol of amines), and 148 ml of epoxyhexane (123 g, 1226 mmol, 5 eq) may be heated at 80° C. in the presence of 25 ml of methanol for four days. The reaction may then be cooled and precipitated via the addition of ether. The solid may then be isolated via decantation and dried under vacuum to yield the water insoluble product in quantitative yield. Acidification with HCl may preferably not yield a water soluble product. $^1$H NMR (500 MHz CDCl$_3$) δ 5.1-4.3 (br), 3.7-3.4 (br), 2.9-2.1 (br m), 1.5-1.1 (br), 0.9-0.8 (br). $^{13}$C NMR (75 MHz CDCl$_3$) δ 70-67, 64-61, 55-51, 35-34, 28-27, 23, 14. IR (cm$^{-1}$) 3460 (O—H bend), 2960 (CH$_3$ asymmetric stretch), 2901, 2810, and 2730 (CH$_2$ stretch), 1467 (C—H bend), 1360 (CH$_3$ bend), 1087 (C—O stretch, alcohol). Anal. Found: C, 66.75; H, 12.15; N, 9.89.

In a further example, dimethyloxirane-WF-PEI may be created. In a round bottom flask, 2.83 g of WF-PEI (69.3 mmol of amines), and 12.3 ml of dimethyloxirane (10 g, 139 mmol, 2 eq) may be heated at 80° C. in the presence of 10 ml of methanol for four days. The reaction may then be cooled and excess dimethyloxirane and methanol may be removed under vacuum, to yield the product in quantitative yield. Acidification with HCl may then yield the water soluble product.

In a further example, styrene oxide-WF-PEI may be created. In a round bottom flask, 5 g of WF-PEI (123 mmol of amines), and 70 ml of styrene oxide (74 g, 615 mmol, 5 eq) may be heated at 80° C. in the presence of 25 ml of methanol for four days. The reaction may then be cooled and precipitated via the addition of ether. The solid may then be isolated via decantation and dried under vacuum to yield the water insoluble product in quantitative yield. Acidification with HCl may not yield a water soluble product. $^1$H NMR (500 MHz CDCl$_3$) δ 7.5-6.9 (br), 4.8-4.4 (br), 2.9-2.0 (br m). $^{13}$C NMR (75 MHz CDCl$_3$) δ 144-142, 130-126, 55-50. IR (cm$^{-1}$) 3401 (O—H bend), 3061 and 3029 (C—H aromatic), 2947, and 2829 (CH$_2$ stretch), 1452 (C—H bend), 1063 (C—O stretch, alcohol). Anal. Found: C, 73.29; H, 8.28; N, 7.70.

In a further example, propylene oxide-epoxybutane-WF-PEI may be created. In a sealed pressure tube, 5.0 g of WF-PEI (45.8 mmol of primary amines and 36.6 mmol of secondary amines), and 2.2 ml of propylene oxide (2.66 g, 45.8 mmol) may be heated at 80° C. in the presence of 5 ml of methanol for one day. Then, the reaction may be cooled and 2.2 ml epoxybutane (2.64 g, 36.6 mmol) may be added and the reaction was heated at 80° C. for one more day. Then, the reaction may be cooled and 10 ml excess propylene oxide may be added and the reaction may be heated at 80° C. for one more day. The reaction may then be cooled and excess propylene oxide, epoxybutane and methanol may be removed under vacuum, to yield the water soluble product in quantitative yield. Anal. Found: C, 59.40; H, 11.94; N, 11.70.

In a further example, propylene oxide-epoxypentane-WF-PEI may be created. In a sealed pressure tube, 5.0 g of WF-PEI (45.8 mmol of primary amines and 36.6 mmol of secondary amines), and 2.2 ml of propylene oxide (2.66 g, 45.8 mmol) may be heated at 80° C. in the presence of 5 ml of methanol for one day. Then, the reaction may be cooled and 3.8 ml epoxypentane (3.15 g, 36.6 mmol) may be added and the reaction was heated at 80° C. for one more day. Then, the reaction may be cooled and 10 ml excess propylene oxide may be added and the reaction heated at 80° C. for one more day. The reaction may then be cooled and excess propylene oxide, epoxypentane and methanol may be removed under vacuum, to yield the water soluble product in quantitative yield. Anal. Found: C, 59.46; H, 11.70; N, 11.51.

In a further example propylene oxide-PPI may be created. G4-PPI (fourth generation polypropylamine dendrimer) may first be created, and analyzed with the following results: $^1$H NMR (500 MHz CDCl$_3$) δ 2.65-2.55 (br), 2.35-2.2. (br m), 1.75-1.55 (br), 1.50-1.40 (br). $^{13}$C NMR (75 MHz CDCl$_3$) δ 52.4, 52.2, 51.9, 40.8, 30.9, 24.5. IR (cm$^{-1}$) 3440 (N—H stretch), 2938, 2864, and 2800 (CH$_2$ stretch), 1576 (N—H bend), 1471 (CH$_2$ bend). Anal. Found: C, 60.65; H, 13.36; N, 23.35. Then, in a sealed pressure tube, 1.0 g of PPI (9.1 mmol of primary amines), and 12.8 ml of propylene oxide (10.63 g, 182 mmol, 20 eq) may be heated at 80° C. in the presence of 2 ml of methanol for three days. The reaction may then be cooled and excess propylene oxide and methanol may be removed under vacuum, to yield the water soluble product in quantitative yield. $^1$H NMR (500 MHz CDCl$_3$) δ 3.9-3.8 (br), 3.6-3.2 (br m), 2.6-2.1 (br m), 1.6-1.5 (br), 1.1-0.9 (br). $^{13}$C NMR (75 MHz CDCl$_3$) δ 66-60, 55-51, 25-24, 20-16. IR (cm$^{-1}$) 3433 (O—H stretch), 2960, (CH$_3$ stretch), 2932, 2894, 2871, and 2812 (CH$_2$ stretch), 1476 (CH$_2$ bend), 1374 (CH$_3$ bend), 1100 (C-0 stretch, alcohol). Anal. Found: C, 60.86; H, 11.72; N, 5.75.

In a further embodiment, epoxybutane-PPI may be created. In a sealed pressure tube, 1.0 g of PPI (9.1 mmol of primary amines), and 15.7 ml of butylene oxide (13.12 g, 182 mmol, 20 eq) may be heated at 80° C. in the presence of 2 ml of methanol for three days. The reaction may then be cooled and excess butlyene oxide and methanol may be removed under vacuum, to yield the water soluble product in quantitative yield. $^1$H NMR (500 MHz CDCl$_3$) δ 3.8-3.1 (br), 2.6-2.1 (br m), 1.7-1.3 (br, m), 0.9-0.8 (br). $^{13}$C NMR (75 MHz CDCl$_3$) δ 64-59, 55-51, 29-23, 10-9. IR (cm$^{-1}$) 3428 (O—H stretch), 2960, (CH$_3$ stretch), 2930, 2876, and 2810 (CH$_2$ stretch), 1463 (CH$_2$ bend), 1376 (CH$_3$ bend), 1085 (C-0 stretch, alcohol). Anal. Found: C, 64.32; H, 12.64; N, 7.50.

FIG. 31 shows an example $^1$H NMR of Propylene Oxide WF-PEI. Characteristic changes in the spectrum after reaction with propylene oxide, can be interpreted as indicating the example structure. For example, one might infer the structure from the disappearance of the broad singlet of an N—H at 1.72 ppm (see FIG. 20 for comparison). Second, one might infer the structure from the appearance of a sharp singlet of a methyl group at 1.13 ppm and a broad peak at 3.78 ppm, corresponding to a CH—O of an alcohol. The broad peak from 2.4-2.8 ppm in FIG. 20 corresponds to the methylene resonances between amines in the PEI structure. After reaction, a corresponding broad peak (2.2-2.8 ppm) may still be observed in the example of FIG. 31.

FIG. 21 and FIG. 32 are examples of the $^{13}$C NMR of PEI and Propylene Oxide WF-PEI, respectively. Characteristic changes in the spectrum after reaction with propylene oxide, may be interpreted as indicating the example structures. First, one might infer the example structures from the appearance of peaks at 20 ppm, corresponding to methyl groups of the attached propylene oxide. Second, one might infer the example structures from the disappearance of the peaks at ~40 and ~42 ppm, which might be interpreted as corresponding to CH$_2$ groups bonded to primary amines. Another possible indication of the example structures is the disappearance of the peak at ~58 ppm, corresponding to the CH$_2$ group alpha to a primary amine. Finally, an indication of the structures might include the appearance of a broad peak from 61-63 ppm, corresponding to a carbon of an alcohol.

Figure 33:
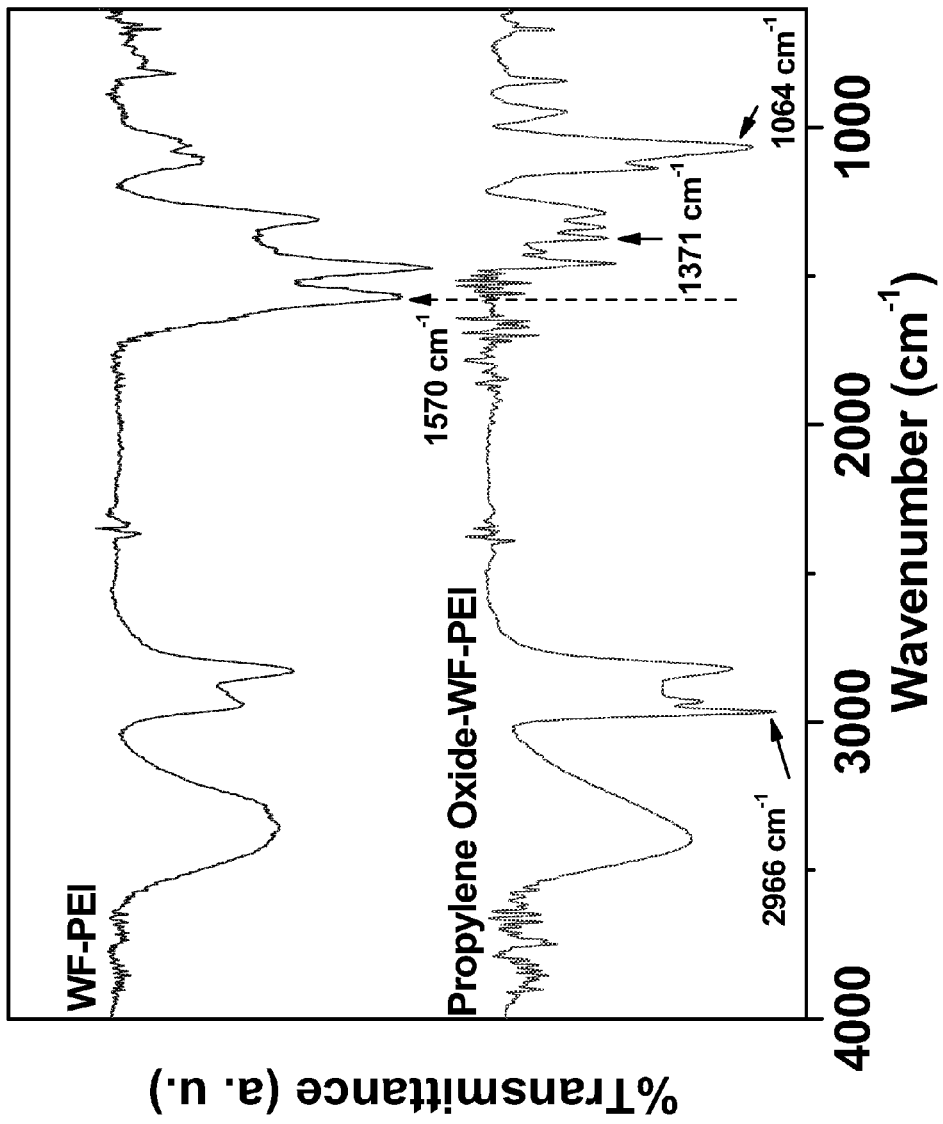
FIG. 33 shows an IR spectrum of examples of PEI and Propylene oxide-WF-PEI.

FIG. 33 shows an example of the comparison of IR spectra for PEI and Propylene Oxide WF-PEI. In the top spectrum for PEI, several characteristic IR peaks are observed. The strong broad peak at 3600-3000 cm$^{-1}$ may be interpreted as corresponding to the N—H stretching vibrations of amines, while the sharp peak at 1570 cm$^{-1}$ may be interpreted as corresponding to the N—H bending vibrations characteristic of primary amines. Peaks at 2939 and 2829 cm$^{-1}$ may be interpreted as corresponding to CH$_2$ stretching vibrations, while the strong, sharp peak at 1473 cm$^{-1}$ may be interpreted as corresponding to CH$_2$ in plane bending vibrations (scissoring). In the case of modified PEI, several characteristic changes may be observed relative to PEI. The disappearance of the peak at 1570 cm$^{-1}$ may be interpreted as corresponding to the removal of primary amines from the modified PEI structure. The appearance of a strong peak at 1064 cm$^{-1}$ may be interpreted as corresponding to the C—O stretching vibration of an alcohol, and as indicating the presence of the opened epoxide structure in the modified PEI. Further, the appearance of peaks at 2966 cm$^{-1}$ and 1371 cm$^{-1}$ might be interpreted as indicating the presence of methyl groups, derived from propylene oxide, as they may be interpreted as corresponding to the asymmetric stretch and the symmetric bend of a methyl, respectively. Although all NH groups are preferably removed after reaction with propylene oxide, the IR peak at 3600-3000 cm$^{-1}$ may still be observed, and now may be interpreted as corresponding to the O—H stretch of an alcohol.

In a further example, methylated-WF-PEI may be created. In 20 ml of water, 10 g of WF-PEI (245 mmol of primary and secondary amines) may be combined with formic acid (125 g, 2450 mmol, 10 eq) and paraformaldehyde (36.8 g, 1226 mmol, 5 eq) and the mixture may be heated to 80° C. for three days. The cloudy mixture should preferably became clear upon heating to 80° C. After the reaction is cooled to room temperature, precipitation into ether may preferably give a sticky yellow solid. Afterwards, ether may be removed via decantation. Then aqueous sodium hydroxide may be added until the pH of the mixture is 14. Then sufficient water may be added to dissolve all solids. Then dialysis with water may be performed to purify the polymer. The product may then be isolated by freeze drying to give 8.5 g of product. $^1$H NMR (500 MHz CDCl$_3$) δ 2.5-2.2 (br m), 2.1 (s). $^{13}$C NMR (75 MHz CDCl$_3$) δ 58-57, 57-56, 54-52, 46, 43. IR (cm$^{-1}$) 2945, 2815, and 2766 (CH$_2$ stretch), 1458 (CH$_2$ bend).

In a further example, methylated-PS-PEI may be created. A procedure analogous to that above may be followed for PS-PEI to give 5.7 g of product. $^1$H NMR (500 MHz CDCl$_3$)

δ 2.5-2.2 (br m), 2.1 (s). $^{13}$C NMR (75 MHz CDCl$_3$) δ 58-57, 57-56, 54-52, 46, 43. IR (cm$^{-1}$) 2945, 2815, and 2767 (CH$_2$ stretch), 1458 (CH$_2$ bend).

Example III

An example of the use of hyperbranched macromolecules in cross-flow filtration is described. In this particular example, PEI is bound to nitrate and sulfate, and the PEI is recovered by cross-flow filtration. This example is illustrative of the disclosed embodiments, but does not limit them in any way. In particular, hyperbranched molecules other than PEI (such as those described in this disclosure) may be used, and other anions or contaminants may be used:

Materials: Reagent-grade sodium sulfate (Na$_2$SO$_4$) and Potassium nitrate (KNO$_3$) from Sigma-Aldrich may be used, respectively as sources of SO$_4^{-2}$, and NO$_3^{-1}$. Polyethyleneimine (PEI), the hyperbranched polymer may be used as received from DSM, Germany. Table 13 gives the selected properties of PEI which would be used in this example.

TABLE 13

Selected properties of hyperbranched polyethyleneimine.

| Properties | |
|---|---|
| Molecular weight (g/mol) | 25000 |
| Polydispersity index | 2.5 |
| Degree of branching (%) | 65 |
| Degree of polymerization | 223 |
| pKa of tertiary amine groups | 6.3-6.85 |
| PKa of primary amine groups | 9.23-10 |
| Molecular weight (g/mol) | 25000 |
| Polydispersity index | 2.5 |

Figure 35:
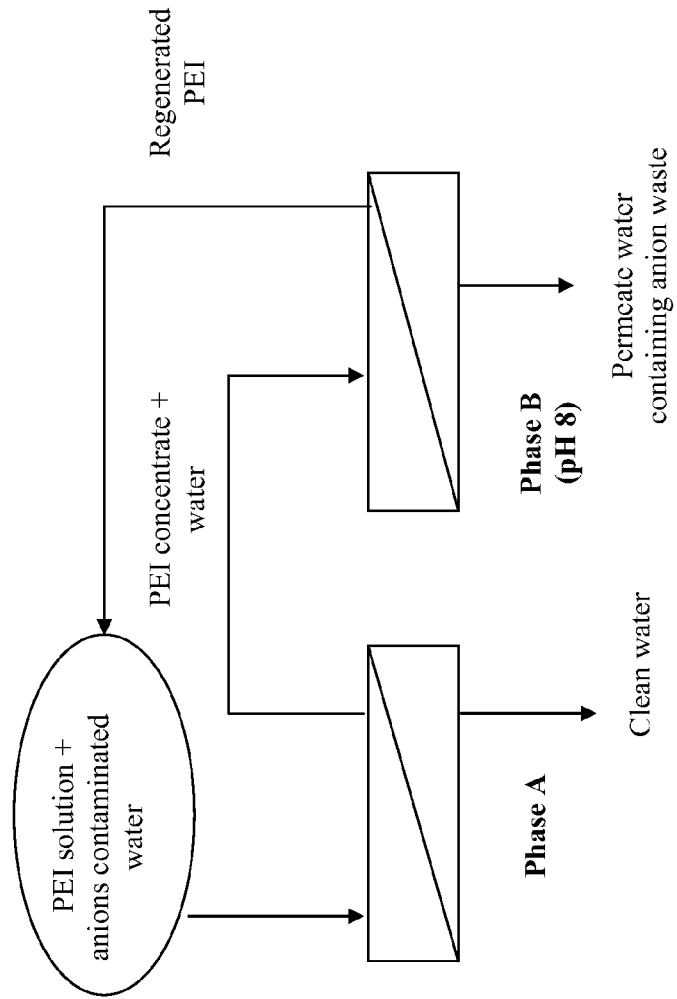
FIG. 35 shows an example of flow-path bench scale cross-flow filtration.

Cross-flow bench scale ultrafiltration experiments: Cross-flow ultrafiltration may performed in a bench scale ultrafiltration unit purchased from SciLog Inc. FIG. 35 shows the schematic flow path of the process. In phase A, clean water devoid of nitrate and sulfate is recovered as permeate. In phase B, the target anion is released at higher pH and the PEI is recyled back to Phase A. A fraction of PEI greater than 5000 g/mol may be separated from the poydispersed mixture (Avg. molecular weight 25,000 g/mol) using the cross-flow ultrafiltration system consisting of commercial OMEGA (Polyethersulfone) membrane of 10 KDa molecular weight cut-off. Constant volume diafiltration may be used simultaneously to remove all the small impurities (molecular weight <5000 g/mol).

The wastewater containing target anions may be processed through ultrafitration unit consisting of similar cut-off commercially available polyethersulfone membrane. The initial flow rate of the permeate stream can be maintained at 125 ml/min. The process may be continued until the concentration factor of 10 is obtained. The final retentate volume containing the PEI bound nitrate complex in this example would be about 100 ml. In phase A, PEI fraction may be added to the nitrate contaminated water (100 ppm, 1 liter) along with the hydrochloric acid (38% w/w) in the feed tank (retentate) to adjust the pH to 5. In phase B, the nitrate bound to the polymer is released at higher pH. The retentate from phase may be diluted with DI water to make up 3 L solution followed by adjusting the pH to 8 with addition of sodium hydroxide.

The above are exemplary modes of carrying out the invention and are not intended to be limiting. While embodiments and applications have been shown and described, it would be apparent to those skilled in the art having the benefit of this disclosure that many more modifications than mentioned above are possible without departing from the inventive concepts disclosed herein. The invention, therefore, and the scope of the appended claims, should not be limited to the embodiments described herein.

What is claimed is:

1. A hyperbranched macromolecule (A) comprising a plurality of branches and a plurality of terminal functional groups within the same molecular structure;
    wherein each branch comprises an N-substituted or N,N-substituted n-aminoalkyl moiety (B);
    wherein each substituent to moiety B comprises either:
    (a) another of said plurality of branches; or
    (b) one of the plurality of terminal functional groups;
    wherein A has a hyperbranched structure with a molecular weight of at least 1500 grams per mole;
    wherein A comprises essentially no primary amine moieties; and
    wherein each of the plurality of terminal functional groups is
    —CH$_2$C(CH$_3$)$_2$CH$_2$NR$^1$R$^2$, wherein R$^1$ and R$^2$ are hydrophobic functional groups.

2. The macromolecule of claim 1, wherein each of the plurality of terminal functional groups is —CH$_2$C(CH$_3$)$_2$CH$_2$NR$^1$R$^2$, wherein R$^1$ and R$^2$ are alkyl groups.

3. The macromolecule of claim 2, wherein moiety B is N-substituted.

4. The macromolecule of claim 1, wherein the degree of branching of A is in the range of about 65% to about 70%.

5. The macromolecule of claim 1, wherein A comprises essentially no secondary amine moieties.

6. The macromolecule of claim 1, wherein each of the plurality of terminal functional groups is a hydrophobic group.

7. The macromolecule of claim 1, wherein A is water soluble at standard temperature and pressure.

8. The macromolecule of claim 1, wherein A is water insoluble at standard temperature and pressure.

9. The macromolecule of claim 1, wherein the acidic binding capacity X is at least twice the basic binding capacity Y with respect to an anion,
    wherein X is the binding capacity that is measured after placing A and an excess amount of the anion in water at pH 7.0 at room temperature, and adding a sufficient amount of acid to achieve a pH of 5.0; and
    wherein Y is the binding capacity that is measured after placing A and an excess amount of the anion in water at pH 7.0 at room temperature, and adding a sufficient amount of base to achieve a pH of 9.0.

10. The macromolecule of claim 9, wherein X is at least 5 times greater than Y.

11. The macromolecule of claim 10, wherein X is at least 10 times greater than Y.

12. The macromolecule of claim 9, wherein the anion is selected from the group consisting of perchlorate and nitrate.

13. The macromolecule of claim 9, wherein the water is deionized water.

14. The macromolecule of claim 9, wherein the water contains 175 parts per million of sulfate ions.

15. A filtration method comprising:
    providing a solution containing a first quantity of a contaminant;
    contacting the solution with a first quantity of a hyperbranched macromolecule under conditions such that the first quantity of the contaminant is bound to the first quantity of the hyperbranched macromolecule to produce: (a) a composition comprising a contaminant-bound hyperbranched macromolecule, and (b) a composition comprising a relatively contaminant-depleted solution; and separating the quantity of contaminant-bound hyperbranched macromolecules from the quantity of relatively contaminant-depleted solution;

wherein the hyperbranched macromolecule is the hyperbranched molecule of claim 1.

16. The method of claim 15, wherein the solution is an aqueous solution, the hyperbranched macromolecule is water soluble, and the contaminant is an anion.

17. The method of claim 15, wherein the hyperbranched macromolecule is water insoluble.

18. The method of claim 15, wherein the solution is an aqueous solution, and the contaminant is an organic compound.

19. The method of claim 15, wherein the solution is a non-aqueous solution, and the contaminant is an anion.

20. The method of claim 15, further comprising the step of introducing the quantity of contaminant-bound hyperbranched macromolecules into an aqueous environment where the pH is greater than the pH of the aqueous environment, and wherein conditions are such that a portion of molecules of the contaminant dissociate from a portion of the hyperbranched macromolecules.

21. The method of claim 20, further comprising the step of providing a cross-flow filter wherein the mixture of said portion of molecules of the contaminant and said portion of the hyperbranched macromolecules pass transversely across the cross-flow filter while a portion of the contaminant passes through the filter.

* * * * *